(12) United States Patent
Koike

(10) Patent No.: US 7,287,884 B2
(45) Date of Patent: Oct. 30, 2007

(54) VEHICLE OPERATION SUPPORTING DEVICE AND VEHICLE OPERATION SUPPORTING SYSTEM

(75) Inventor: Shin Koike, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 281 days.

(21) Appl. No.: 10/350,205

(22) Filed: Jan. 24, 2003

(65) Prior Publication Data

US 2003/0147247 A1 Aug. 7, 2003

(30) Foreign Application Priority Data

| Feb. 7, 2002 | (JP) | ............................. 2002-031412 |
| Mar. 27, 2002 | (JP) | ............................. 2002-089269 |

(51) Int. Cl.

| B60Q 1/00 | (2006.01) |
| B60Q 1/14 | (2006.01) |
| F21V 21/28 | (2006.01) |
| F21V 21/29 | (2006.01) |
| F21V 1/00 | (2006.01) |
| F21V 11/00 | (2006.01) |
| G02F 1/153 | (2006.01) |
| G02B 5/08 | (2006.01) |
| G02B 27/00 | (2006.01) |
| G08B 23/00 | (2006.01) |
| G08G 1/00 | (2006.01) |
| G08G 1/01 | (2006.01) |
| G08G 1/04 | (2006.01) |
| G08G 1/095 | (2006.01) |
| G06K 9/00 | (2006.01) |
| H04N 9/47 | (2006.01) |

(52) U.S. Cl. .................. 362/464; 362/509; 362/510; 315/77; 359/275; 359/601; 359/609; 359/614; 340/435; 340/500; 340/576; 340/901; 340/933; 340/938; 340/942; 340/944; 382/103; 382/104; 348/148

(58) Field of Classification Search ................ 359/275, 359/601–614; 340/901, 435, 576, 944; 382/103; 348/148

See application file for complete search history.

(56) References Cited

U.S. PATENT DOCUMENTS 2,197,487 A * 4/1940 Smalley ...................... 356/121

(Continued)

FOREIGN PATENT DOCUMENTS

DE 4106019 A1 * 10/1991

(Continued)

*Primary Examiner*—Layla G. Lauchman
*Assistant Examiner*—Gordon J. Stock, Jr.
(74) *Attorney, Agent, or Firm*—Oliff & Berridge, PLC

(57) ABSTRACT

A beam radiator that radiates visible light beams having a predetermined wavelength onto a road surface to inform drivers of other vehicles of the existence of a self-owned vehicle or to let a driver of the self-owned vehicle confirm a traveling path thereof is disposed in a front portion of a body of the self-owned vehicle. An optical filter is disposed substantially all over a windshield in front of a driver seat. The filter is designed to have a characteristic of being more permeable to light having wavelengths close to a wavelength of visible light beams radiated from the beam radiator 24 than to light having a wavelength different from those wavelengths. In this construction, the driver is prevented from finding it difficult to visually recognize a visible light pattern resulting from visible light beams radiated from the self-owned vehicle or another vehicle owing to sunlight or the like, and visual recognizability of the visible light pattern is enhanced.

16 Claims, 32 Drawing Sheets

U.S. PATENT DOCUMENTS

| | | | |
|---|---|---|---|
| 3,049,962 A * | 8/1962 | Denecke | 359/229 |
| 3,081,415 A * | 3/1963 | Casselman et al. | 315/83 |
| 4,830,441 A * | 5/1989 | Chang | 359/15 |
| 4,846,555 A * | 7/1989 | Abe et al. | 359/601 |
| 4,858,080 A | 8/1989 | Oikawa | |
| 5,239,406 A * | 8/1993 | Lynam | 359/275 |
| 6,144,158 A * | 11/2000 | Beam | 315/82 |
| 6,239,898 B1 * | 5/2001 | Byker et al. | 359/265 |
| 6,285,778 B1 | 9/2001 | Nakajima et al. | |
| 6,305,797 B1 * | 10/2001 | Otto et al. | 359/220 |
| 6,786,610 B2 * | 9/2004 | Faris | 359/613 |
| 7,199,767 B2 * | 4/2007 | Spero | 345/7 |
| 2003/0128106 A1 | 7/2003 | Ross | |

FOREIGN PATENT DOCUMENTS

| | | |
|---|---|---|
| DE | 4109348 A * | 5/1992 |
| JP | A-62-024203 | 9/1987 |
| JP | U-62-24310 | 9/1987 |
| JP | A-01-184426 | 7/1989 |
| JP | 03144799 A * | 6/1991 |
| JP | A 5-238307 | 9/1993 |
| JP | A 6-270752 | 9/1994 |
| JP | 08101092 A * | 4/1996 |
| JP | A-10-079100 | 3/1998 |
| JP | A-2000-039321 | 2/2000 |
| JP | 2000180378 A * | 6/2000 |
| JP | A 2000-161941 | 6/2000 |

* cited by examiner

↕ : LONGITUDINAL POLARIZATION

• : LATERAL POLARIZATION

VISIBLE LIGHT
PATTERN

VISIBLE LIGHT
PATTERN

VISIBLE LIGHT PATTERN

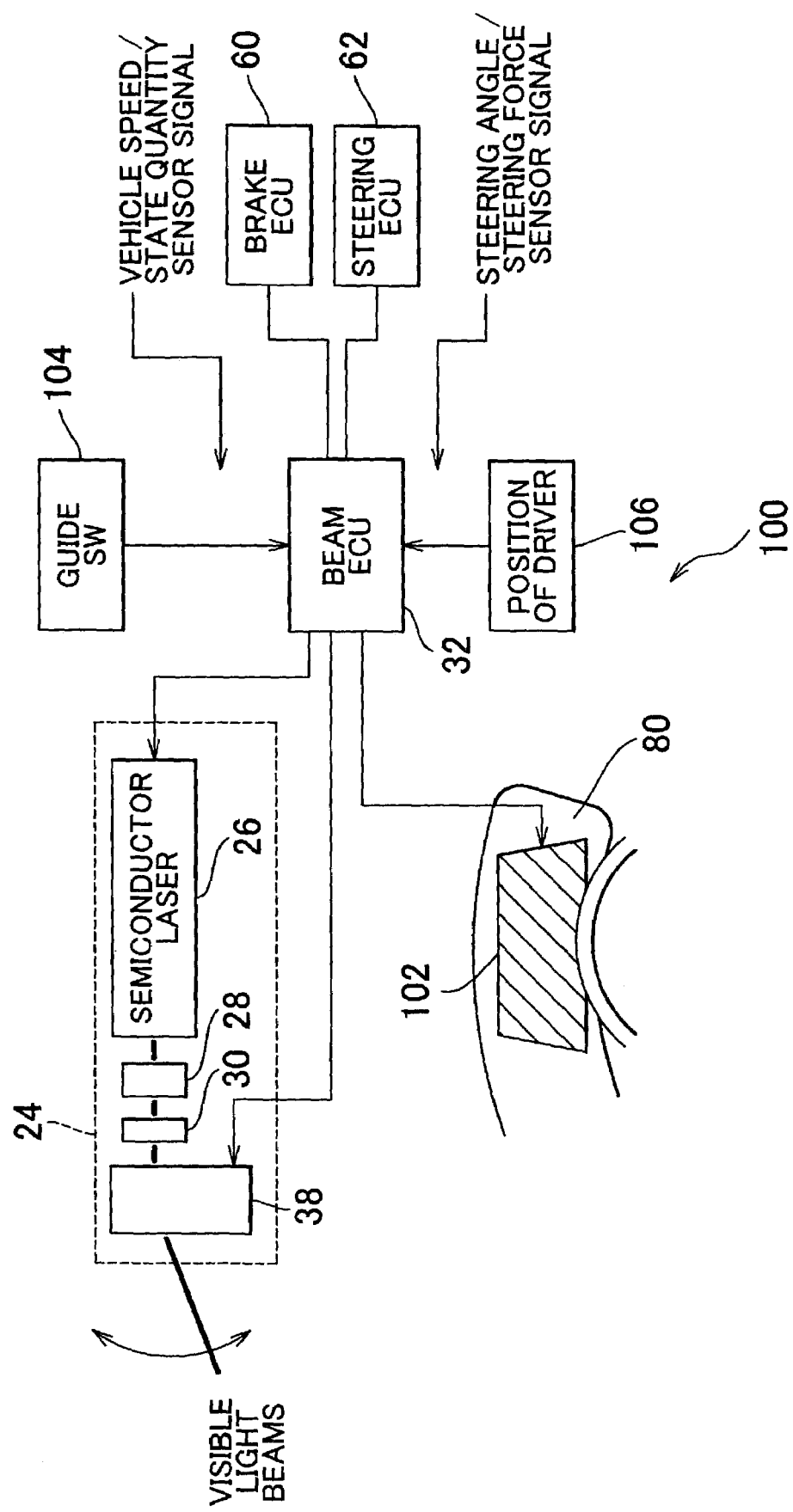

LESS PERMEABLE   MORE PERMEABLE

VISIBLE LIGHT PATTERN

VISIBLE LIGHT PATTERN

F I G . 31
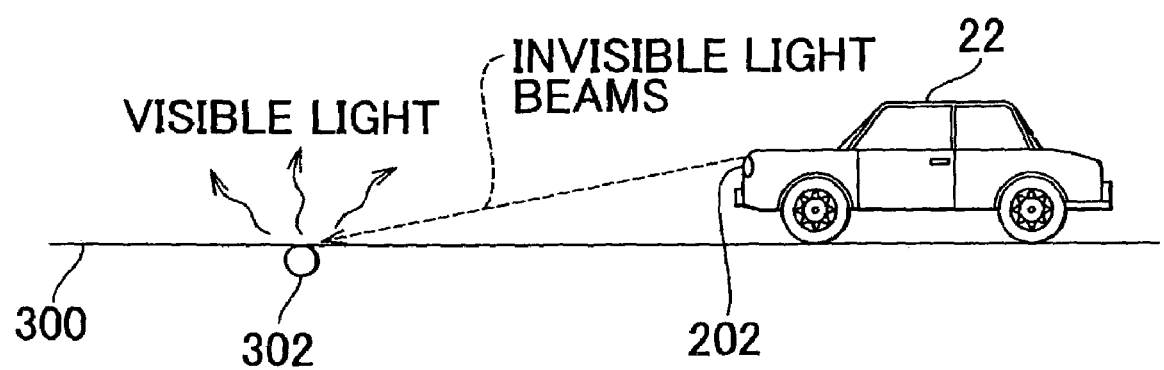

VEHICLE OPERATION SUPPORTING DEVICE AND VEHICLE OPERATION SUPPORTING SYSTEM

INCORPORATION BY REFERENCE

The disclosures of Japanese Patent Applications No. 2002-031412 filed on Feb. 7, 2002 and No. 2002-089269 filed on Mar. 27, 2002, each including the specification, drawings, and abstract, are incorporated herein by reference in their entirety.

BACKGROUND OF THE INVENTION

1. Field of the Invention

The invention relates to a vehicle operation supporting device and a vehicle operation supporting system. In particular, the invention relates to a vehicle operation supporting device and a vehicle operation supporting system which inform pedestrians, drivers of other vehicles, and the like of the existence of a self-owned vehicle and which radiate predetermined light beams onto a road surface so as to let a driver of the self-owned vehicle grasp a traveling path thereof as an actual image.

2. Description of the Related Art

As the related art, as disclosed in Japanese Patent Application Laid-Open No. 5-238307, there has been known a vehicle operation supporting device that radiates light beams that can be recognized by human eyes onto a road surface. If light beams are thus radiated onto a road surface in a running state, a driver of a self-owned vehicle can grasp a traveling path thereof as an actual image. Hence, the driver of the self-owned vehicle can acquire information that is useful in driving it. Also, others can visually recognize representation of the light beams radiated from the vehicle on the road surface. Thus, even if those who have seen representation of the light beams on the road surface cannot see the vehicle itself, they can be informed that the vehicle exists nearby. Accordingly, the above-mentioned device of the related art makes it possible to suitably assist a driver in driving and to swiftly inform others of the existence of a self-owned vehicle. Therefore, it becomes possible to enhance security in driving the vehicle.

Even if the light beams have been radiated onto the road surface, representation of a pattern that is formed on the road surface by the light beams may become difficult to visually recognize owing to brightness in an area surrounding the vehicle, a chromatic relationship with the road surface, and the like. If such an event occurs, the driver of the vehicle has difficulty in visually recognizing representation of the light beams on the road surface and ends up finding it difficult to recognize a traveling path of the self-owned vehicle or the existence of other vehicles. Because the above-mentioned device of the related art does not take this event into account in this respect, the driver suffers inconvenience in visually recognizing representation of light beams radiated from the vehicle on a road surface.

Further, in a construction wherein light beams that can be visually recognized by others are radiated onto a road surface as in the case of the above-mentioned device of the related art, if a pedestrian stands between a vehicle and a radiation range thereof, the light beams threaten to directly stream into the eyes of the pedestrian, drivers of other vehicles, and the like. Also, if light beams are radiated onto a road surface that is wet with rain or the like, high-level reflected light threatens to stream into the eyes of pedestrians and the like. However, since light beams are radiated without taking the above-mentioned circumstances into account in the above-mentioned device of the related art, there are some cases where pedestrians and the like are dazzled in visually recognizing representation of light beams radiated from the vehicle on a road surface.

SUMMARY OF THE INVENTION

The invention has been made in view of the above-mentioned circumstances. It is an object of the invention to provide a vehicle operation supporting device and a vehicle operation supporting system which are capable of ensuring visual recognizability of representation of a pattern formed on a road surface by light beams and suitably radiating light beams onto a road surface without dazzling anybody.

In order to achieve the above-mentioned object, a vehicle operation supporting device as one aspect of the invention comprises a beam radiating portion that radiates light beams having a predetermined optical characteristic onto a road surface around a vehicle, and a dimming portion that is more permeable to light having the predetermined optical characteristic than to light having optical characteristics other than the predetermined optical characteristic.

Further, a vehicle operation supporting device as another aspect of the invention comprises a beam radiating portion that intermittently radiates light beams having a predetermined optical characteristic onto a road surface around a vehicle, and a dimming portion that intermittently becomes less permeable to light having the predetermined optical characteristic than to light having optical characteristics other than the predetermined optical characteristic in synchronization with radiation of the light beams from the beam radiating portion.

Further, a vehicle operation supporting device as still another aspect of the invention comprises a beam radiating portion that radiates light beams having a predetermined optical characteristic onto a road surface around a vehicle, and a dimming portion that is less permeable to light having the predetermined optical characteristic than to light having optical characteristics other than the predetermined optical characteristic only in a range corresponding to a range of a pattern that is formed on the road surface by the light beams radiated from the beam radiating portion.

Further, a vehicle operation supporting device as still another aspect of the invention comprises a beam radiating portion that radiates visible light beams onto a road surface according to a predetermined pattern, and an obstacle detecting portion that detects an obstacle that exists between a vehicle and a road surface onto which visible light beams are to be radiated. In this vehicle operation supporting device, the beam radiating portion radiates visible light beams according to a pattern avoiding the obstacle if the obstacle has been detected.

Further, a vehicle operation supporting device as still another aspect of the invention comprises a beam radiating portion that radiates visible light beams having a predetermined polarization characteristic onto a road surface according to a predetermined pattern.

Further, a vehicle operation supporting device as still another aspect of the invention comprises a beam radiating portion that radiates visible light beams onto a road surface according to a predetermined pattern, an environmental state detecting portion that detects an environmental state of a road surface onto which visible light beams are radiated from the beam radiating portion, and a beam characteristic correcting portion that corrects an optical characteristic of visible light beams radiated from the beam radiating portion on the basis of a result of detection of the environmental state detecting portion such that representation projected onto a road surface by visible light beams becomes easy to visually recognize.

A vehicle operation supporting system comprises a vehicle that radiates visually less recognizable light beams of a predetermined frequency band onto a road surface according to a predetermined pattern, and a converter that is sensitive to a predetermined frequency band of visually less recognizable light beams radiated from the vehicle, that converts a pattern formed on a road surface by the visually less recognizable light beams into a pattern having a visually more recognizable frequency band, and that displays the converted pattern.

Further, a vehicle operation supporting system as another aspect of the invention comprises a vehicle that radiates visually less recognizable light beams of a predetermined frequency band onto a road surface according to a predetermined pattern, and a road which is sensitive to a predetermined frequency band of visually less recognizable light beams radiated from the vehicle and on which a material that emits light by converting the radiated visually less recognizable light beams into light beams having a visually more recognizable frequency band is disposed.

BRIEF DESCRIPTION OF THE DRAWINGS

FIG. 12 is a block diagram of a vehicle operation supporting system in accordance with a second embodiment as another aspect of the invention.

FIG. 31 is an explanatory view of a vehicle operation supporting system in accordance with a sixth embodiment as another aspect of the invention.

DETAILED DESCRIPTION OF PREFERRED EMBODIMENTS

First Embodiment

The vehicle operation supporting device in accordance with the first embodiment as one aspect of the invention will be described hereinafter.

Figure 1:
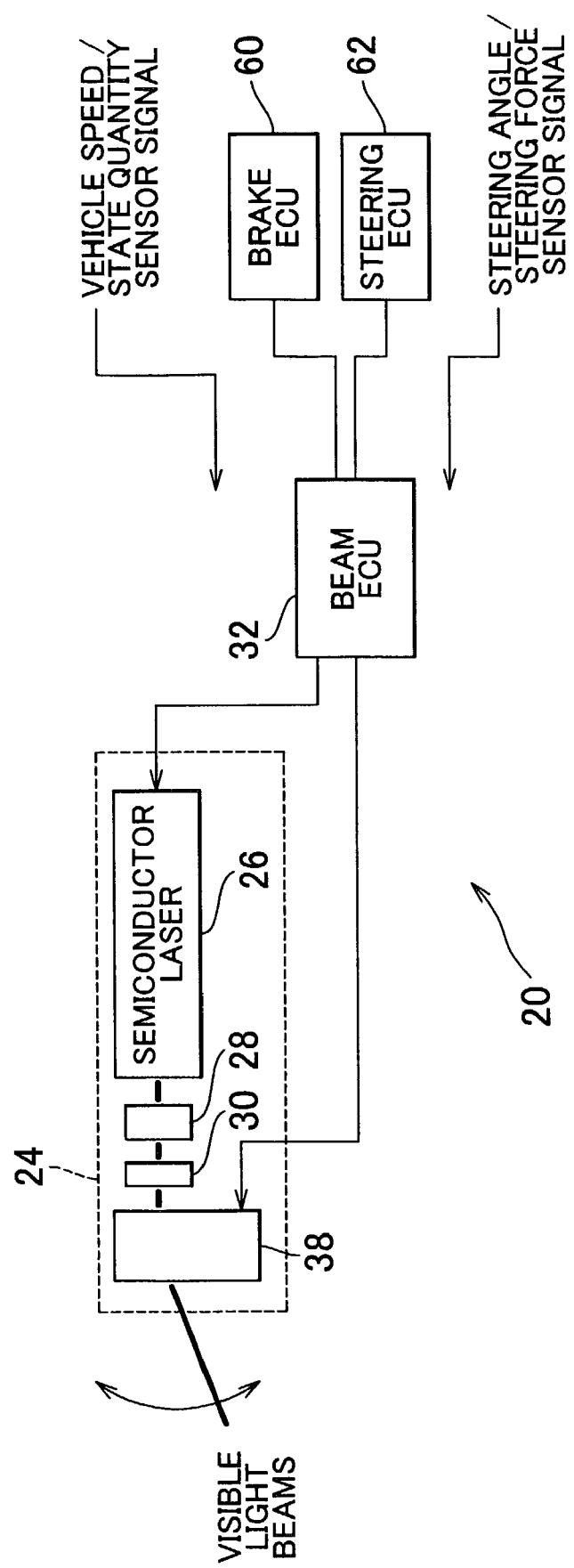
FIG. 1 is a block diagram of a vehicle operation supporting device in accordance with a first embodiment as one aspect of the invention.
Figure 2:
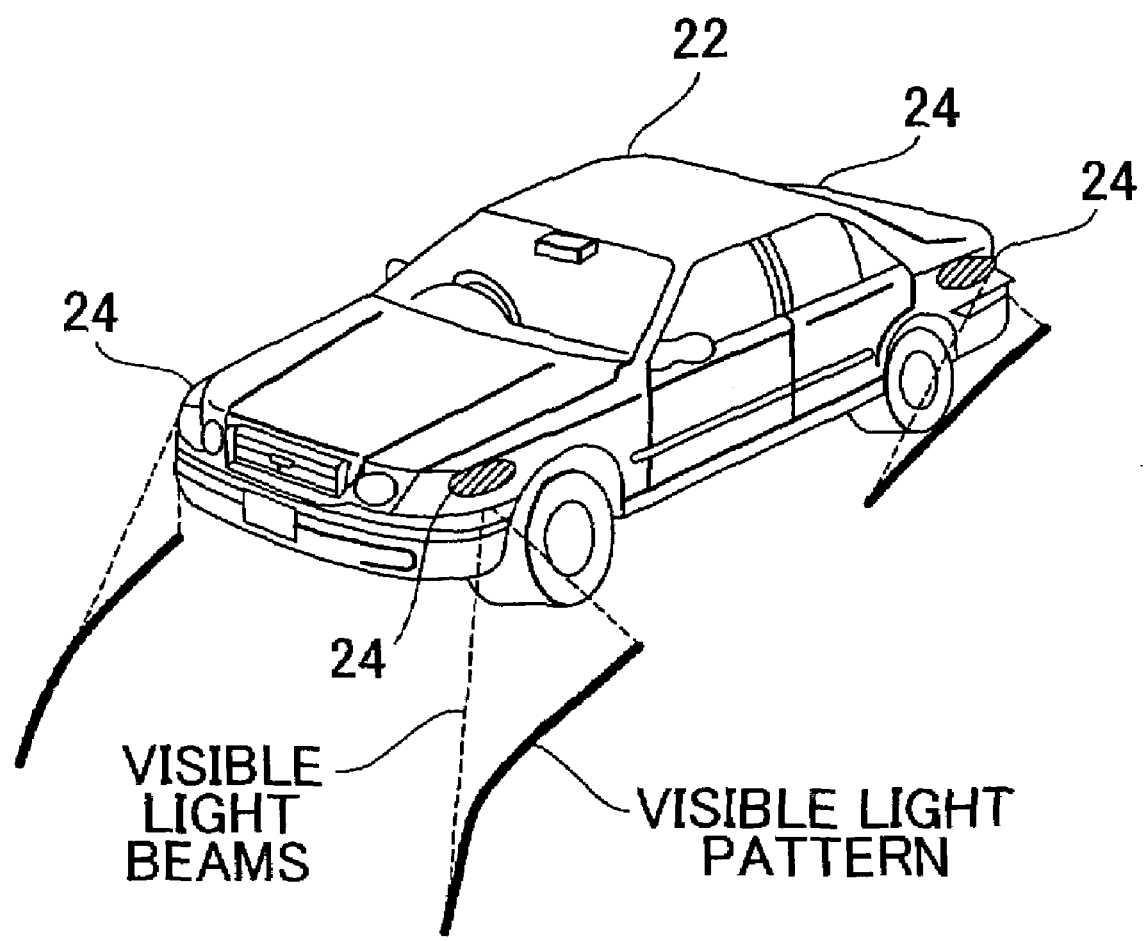
FIG. 2 is an explanatory view showing where in a vehicle components constituting the vehicle operation supporting device of the first embodiment are installed.

FIG. 1 is a block diagram of a vehicle operation supporting device 20 of the first embodiment of the invention. FIG. 2 is an explanatory view showing where in a vehicle 22 components constituting the vehicle operation supporting device 20 of the first embodiment are installed. As shown in FIG. 1, the vehicle operation supporting device 20 of the first embodiment has four beam radiators 24. As shown in FIG. 2, the beam radiators 24 are disposed in front-left, front-right, rear-left, and rear-right portions of the vehicle respectively. The beam radiator 24 in the front-left portion of a vehicle body radiates light beams onto a road surface in front of and to the left of the vehicle. The beam radiator 24 in the front-right portion of the vehicle body radiates light beams onto a road surface in front of and to the right of the vehicle. The beam radiator 24 in the rear-left portion of the vehicle body radiates light beams onto a road surface behind and to the left of the vehicle. The beam radiator 24 in the rear-right portion of the vehicle body radiates light beams onto a road surface behind and to the right of the vehicle. These beam radiators 24 radiate light beams according to a rule that will be described later in detail.

Each of the beam radiators 24 has a beam generator 26 constructed of a semiconductor laser, a beam shaping lens 28, and a polarizing shaper 30. The beam generator 26 generates light beams (hereinafter referred to as visible light beams) having a wavelength of e.g. 0.55 μm that belongs to a visible light range. An electronic control unit (hereinafter referred to as a beam ECU) 32 is connected to the beam generator 26. The beam generator 26 is designed to be able to change a brightness and a hue of generated visible light beams on the basis of a command signal from the beam ECU 32. The beam shaping lens 28 has a function of shaping visible light beams generated by the beam generator 26. The polarizing shaper 30 has a function of polarizing visible light beams output from the beam shaping lens 28.

Figure 3A:
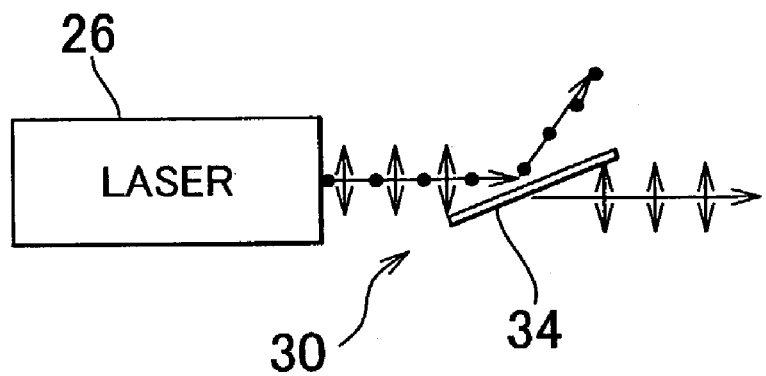
FIGS. 3A-3B are concrete structural views of a polarizing shaper of the vehicle operation supporting device of the first embodiment.
Figure 3B:
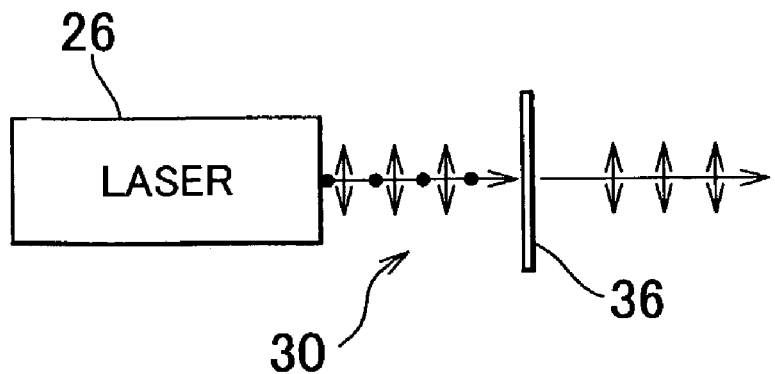

FIG. 3 is a concrete structural view of the polarizing shaper 30 of the first embodiment. In the first embodiment, as shown in FIG. 3A, the polarizing shaper 30 is constructed of a glass plate 34. The glass plate 34 is disposed such that a normal of a glass surface thereof and an optical axis form a Brewster angle. In this construction, some components of visible light beams that are perpendicular to a plane of incidence (i.e., components that are parallel to a boundary surface (road surface); laterally polarized components) are reflected by the glass plate 34. On the other hand, components of visible light beams that are parallel to the plane of incidence (i.e., components that are perpendicular to the boundary surface; longitudinally polarized components) penetrate the glass plate 34 without being reflected thereby. The polarizing shaper 30 may not be constructed of the glass plate 34. That is, as shown in FIG. 3B, it is also appropriate that the polarizing shaper 30 be constructed of a polarizer 36 that reflects laterally polarized components of visible light beams and that is penetrated by longitudinally polarized components of the visible light beams.

If visible light beams are radiated onto a road surface that is wet with rain or the like, incident light thereof becomes likely to be reflected. Therefore, high-level reflected waves threaten to stream into the eyes of pedestrians, drivers of other vehicles, and the like who exist on a plane of incidence. Accordingly, it is necessary to take care that high-level reflected waves of visible light beams do not stream into the eyes of anyone. It is to be noted herein that reflected light of visible light beams has an optical characteristic of containing a large number of laterally polarized components that are perpendicular to a plane of incidence (i.e., parallel to a road surface) and that are likely to be reflected.

As described above, the beam radiator 24 has the polarizing shaper 30 that polarizes visible light beams output from the beam shaping lens 28. In this construction, since some of laterally polarized components of visible light beams that are parallel to a road surface are reflected by the glass plate 34, the laterally polarized components that propagate in a traveling direction of the visible light beams are damped. Hence, even if the visible light beams are reflected by the road surface, reflected waves of the visible light beams have a reduced intensity and do not reach a high level. Thus, in the first embodiment, it is possible to inhibit the occurrence of an event in which somebody is dazzled by high-level reflected waves of visible light beams streaming into his or her eyes. Even in the case where there is somebody in a traveling direction of visible light beams, it is possible to suitably inform him or her of the existence of the vehicle 22 concerned without dazzling him or her.

As shown in FIG. 1, each of the beam radiators 24 also has a scan actuator 38 that is composed, for example, of an ultrasonic polarizer or a galvano-mirror. The scan actuator 38 has a function of scanning visible light beams polarized by the polarizing shaper 30. The above-mentioned beam ECU 32 is connected to the scan actuator 38. The beam ECU 32 drives the scan actuator 38 such that a pattern of an encircling shape or the like is created on a road surface by visible light beams. In accordance with a command from the beam ECU 32, the scan actuator 38 scans visible light beams polarized by the polarizing shaper 30. If visible light beams are radiated from the beam radiators 24 onto a road surface around the vehicle, an indication resulting from the visible light beams (hereinafter referred to as a visible light pattern) is projected on the road surface in such a manner as to be recognizable to human eyes.

A brake ECU 60 and a steering ECU 62 are also connected to the beam ECU 32.

The brake ECU 60 detects a speed of the vehicle 22 by means of a vehicle speed sensor or the like, detects kinetic state quantities of the vehicle 22 by means of a yaw rate sensor, a longitudinal acceleration sensor, a lateral acceleration sensor, and the like, and detects a braking force applied to the vehicle 22 by means of a brake actuator (not shown). The steering ECU 62 detects a steering angle of the vehicle 22 by means of a steering angle sensor or the like, detects a steering force applied to the vehicle 22 by means of a steering torque sensor or the like, and controls a steering force required in steering the vehicle 22 by means of a steering actuator. Detection signals from the brake ECU 60 and the steering ECU 62 are all supplied to the beam ECU 32. The beam ECU 32 detects a vehicle speed, kinetic state quantities, a steering angle, a steering force, and the like on the basis of sensor signals from the brake ECU 60 and the steering ECU 62.

Next, an area on a road surface to be irradiated with visible light beams by the beam radiators 24 of the vehicle operation supporting device 20 of the first embodiment, that is, representation of a pattern to be projected onto the road surface by the visible light beams will be described.

In the first embodiment, the beam ECU 32 first calculates, on the basis of a vehicle speed, kinetic state quantities, a steering angle, a steering force, and the like that have been detected, a traveling locus along which the vehicle 22 is estimated to run. In the case where the vehicle 22 has run along the traveling locus, the beam ECU 32 calculates left and right boundaries each of which distinguishes a portion that is passed by the vehicle body and a portion that is not passed by the vehicle body from each other. That is, the beam ECU 32 calculates lines (hereinafter referred to as vehicle-body circumscribed lines) that are in contact with outermost portions of the vehicle body. The beam ECU 32 assigns both the vehicle-body circumscribed lines as lines that are to be projected onto a road surface by visible light beams, and extracts sections having a length corresponding to a vehicle speed, an acceleration, or a deceleration of the self-owned vehicle from both the vehicle-body circumscribed lines respectively. The beam ECU 32 respectively drives scan actuators 38 of the two left and right beam radiators 24 such that the extracted sections are both projected onto the road surface at suitable positions as a visible light pattern.

Figure 4:
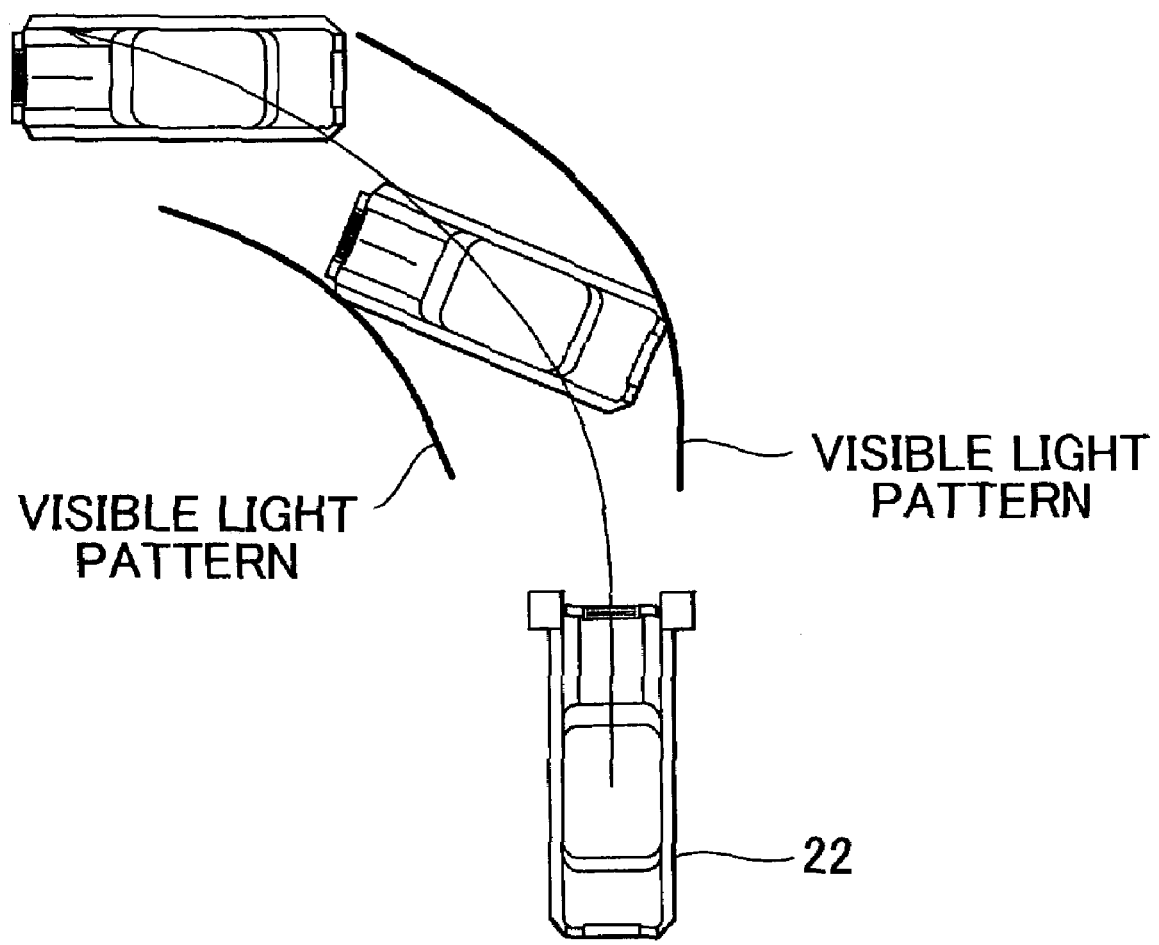
FIG. 4 is a schematic view of patterns that are projected onto a road surface by visible light beams under a situation in which a vehicle slips in the first embodiment.

FIG. 4 is a schematic view of visible light patterns that are projected onto a road surface by visible light beams under a situation in which the vehicle 22 slips in the first embodiment. In the case where the vehicle 22 moves straight, visible light patterns that are projected onto the road surface by visible light beams substantially extend along lateral surfaces of the vehicle body respectively. In the case where the vehicle 22 moves forwards while making a turn without slipping, visible light patterns extend along an inner rear portion of the vehicle body as to a turn-wise inner side, and visible light patterns extend along an outer front portion of the vehicle body as to a turn-wise outer side. On the other hand, in the case where the vehicle 22 slips, visible light patterns extend along the vehicle-body circumscribed lines based on a kinetic state of the vehicle 22 as shown in FIG. 4.

Thus, according to the first embodiment, visible light patterns conforming to a locus along which the vehicle 22 is estimated to run can be projected onto a road surface by visible light beams that are radiated in a visible light range that is recognizable to human eyes. In the case where visible light patterns are thus displayed, pedestrians, drivers of other vehicles, and the like can be informed, by visually recognizing the displayed visible light patterns on the road surface, that the vehicle exists nearby, even if they cannot see the vehicle itself with their own eyes. Thus, the vehicle operation supporting device 20 of the first embodiment can draw others' attention to the self-owned vehicle and inform them of the existence of the self-owned vehicle through visually recognizable display on the road surface. At the same time, the vehicle operation supporting device 20 allows the driver to grasp a traveling path to be covered by the self-owned vehicle. Thus, it becomes possible to enhance security in driving the vehicle 22.

In this case, visible light patterns that are projected onto a road surface conform to a vehicle behavior that is derived from a kinetic state of the vehicle 22. More specifically, the visible light patterns are vehicle-body circumscribed lines of a traveling locus along which the vehicle 22 is estimated to run. Pedestrians, drivers of other vehicles, and the like can be informed that the vehicle exists nearby. In addition, not only they but also the driver of the self-owned vehicle can grasp an area in which the vehicle is estimated to run. Thus, in the first embodiment, it is possible to inform others of the existence of the self-owned vehicle and vehicle behavior thereof, and to let the driver confirm the vehicle behavior. Thus, it becomes possible to further enhance security in driving the vehicle.

Figure 5A:
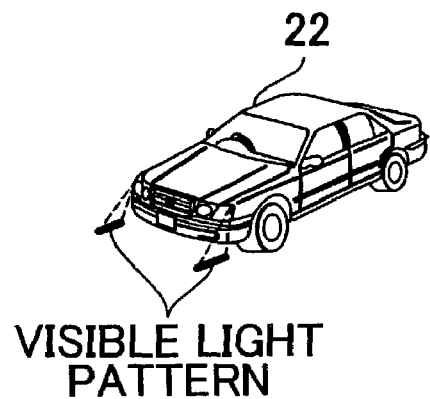
FIGS. 5A-5B are explanatory views showing how to set a position and a length of a pattern resulting from visible light beams radiated by beam radiators in a front portion of a vehicle body in the first embodiment.
Figure 5B:
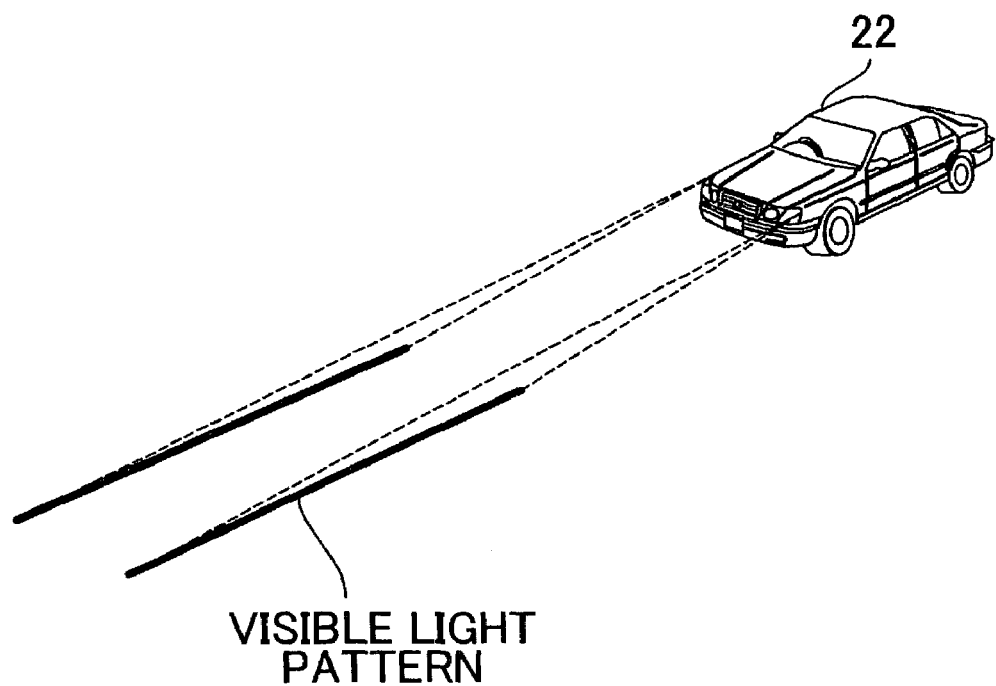

FIG. 5 is an explanatory view showing how to set a position of a visible light pattern resulting from visible light beams radiated from each of the beam radiators 24 that are provided in the front-left and front-right portions of the vehicle body in the first embodiment, and how to set a length of the visible light pattern in a traveling direction of the vehicle. FIG. 5A shows a case where the vehicle 22 is stopped or runs at an extremely low speed. FIG. 5B shows a case where the vehicle 22 runs at a high speed or takes off through acceleration.

In the case where the vehicle 22 is stopped or runs at an extremely low speed, the vehicle 22 can be stopped by braking after having covered a relatively short distance. Thus, even if people and the like far ahead of the vehicle 22 are not informed of the existence thereof, driving safety can be sufficiently ensured. On the other hand, in the case where the vehicle 22 runs at a high speed or takes off through acceleration, the vehicle 22 can be stopped by braking only after having covered a relatively long distance. Therefore, from the standpoint of driving safety of the vehicle 22, people and the like far ahead of the vehicle 22 need to be informed of the existence thereof.

Thus, as shown in FIG. 5A, in the case where the vehicle 22 is stopped or runs at an extremely low speed, visible light beams are radiated from the beam radiators 24 in the front portions of the vehicle body such that visible light patterns having a short length in a traveling direction of the vehicle are projected onto a road surface close to the vehicle. On the other hand, as shown in FIG. 5B, in the case where the vehicle 22 runs at a high speed or takes off through acceleration, visible light beams are radiated such that visible light patterns having a long length in a traveling direction of the vehicle are projected onto a road surface far from the vehicle. That is, in the first embodiment, visible light patterns resulting from visible light beams radiated from the beam radiators 24 in the front portion of the vehicle body are changed in position forward of the vehicle and in length in accordance with a forward speed and a forward acceleration of the vehicle 22. Thus, in the first embodiment, visible light patterns corresponding to a forward speed and a forward acceleration of the vehicle 22 are projected onto a road surface in front of the vehicle. Accordingly, it is possible to let pedestrians in the surroundings, drivers of other vehicles, and the like grasp a state of speed and acceleration of the vehicle 22 to a certain extent, and to inform others of the existence of the self-owned vehicle exactly to a required degree.

Figure 6A:
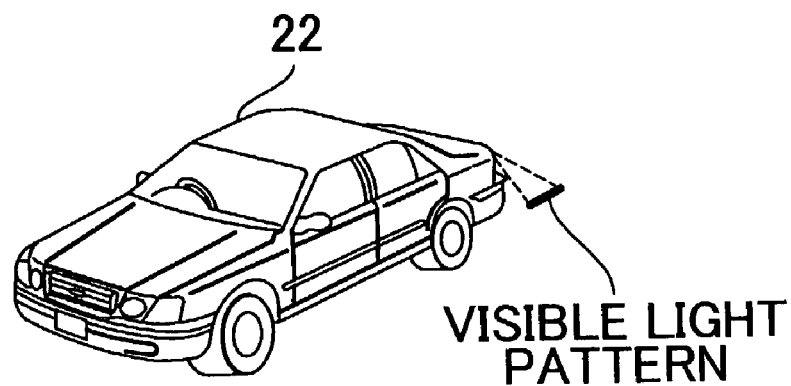
FIGS. 6A-6B are explanatory views showing how to set a position and a length of a pattern resulting from visible light beams radiated by beam radiators in a rear portion of a vehicle body in the first embodiment.
Figure 6B:
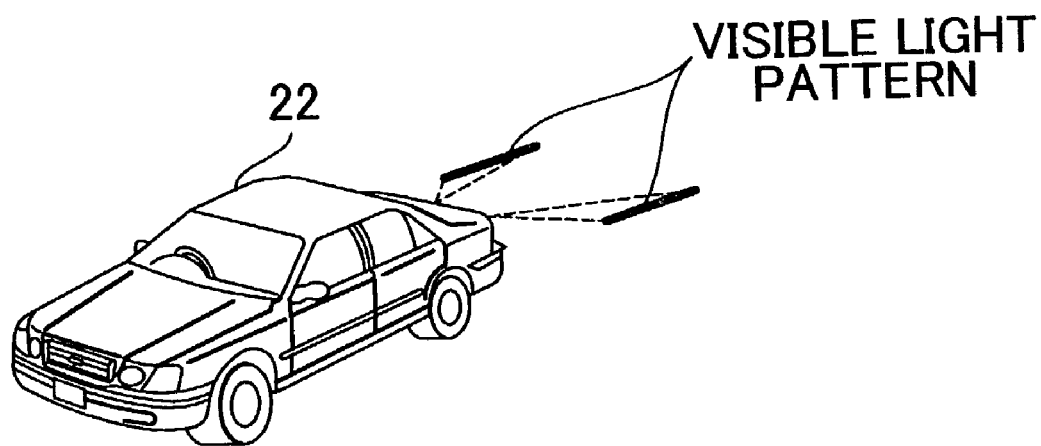

FIG. 6 is an explanatory view showing how to set a position of a visible light pattern resulting from visible light beams radiated from each of the beam radiators 24 that are provided in the rear-left and rear-right portions of the vehicle body in the first embodiment, and how to set a length of the visible light pattern in a traveling direction of the vehicle. FIG. 6A shows a case where the vehicle 22 moves forwards at a constant speed. FIG. 6B shows a case where the vehicle 22 is decelerated or moves backwards.

In the case where the vehicle 22 runs at a constant speed, running of the vehicle 22 does not affect running of other vehicles following the vehicle 22. Therefore, there is no need to inform drivers of those vehicles running behind and the like of a running state of the vehicle 22 concerned. On the other hand, in the case where the vehicle 22 is decelerated or moves backwards, running of the vehicle 22 affects running of other vehicles following the vehicle 22. Therefore, there is a need to swiftly inform drivers of those vehicles running behind and the like of a running state of the vehicle 22 concerned (i.e., deceleration or a state of moving backwards).

Thus, as shown in FIG. 6A, in the case where the vehicle 22 runs at a constant speed, visible light beams are radiated from the beam radiators 24 in the rear portion of the vehicle body such that visible light patterns having a short length in a traveling direction of the vehicle are projected onto a road surface close to the vehicle. On the other hand, as shown in FIG. 6B, in the case where the vehicle 22 is decelerated or moves backwards, visible light beams are radiated such that visible light patterns having an intermediate length in a traveling direction of the vehicle are projected onto a road surface relatively far from the vehicle. That is, in the first embodiment, visible light patterns resulting from visible light beams radiated from the beam radiators 24 in the rear portion of the vehicle body are changed in position behind the vehicle and in length depending on a backward deceleration of the vehicle 22 and on whether or not the vehicle 22 is moving backwards. Accordingly, in the first embodiment, visible light patterns that are changed depending on a backward deceleration of the vehicle 22 and on whether or not the vehicle 22 is moving backwards are projected behind the vehicle. Therefore, it is possible to let pedestrians in the surroundings, drivers of other vehicles, and the like grasp a state of deceleration of the vehicle 22 and whether or not the vehicle 22 is moving backwards. In particular, it is possible to let drivers of vehicles following the vehicle 22 pay attention to deceleration of the vehicle 22.

Figure 7:
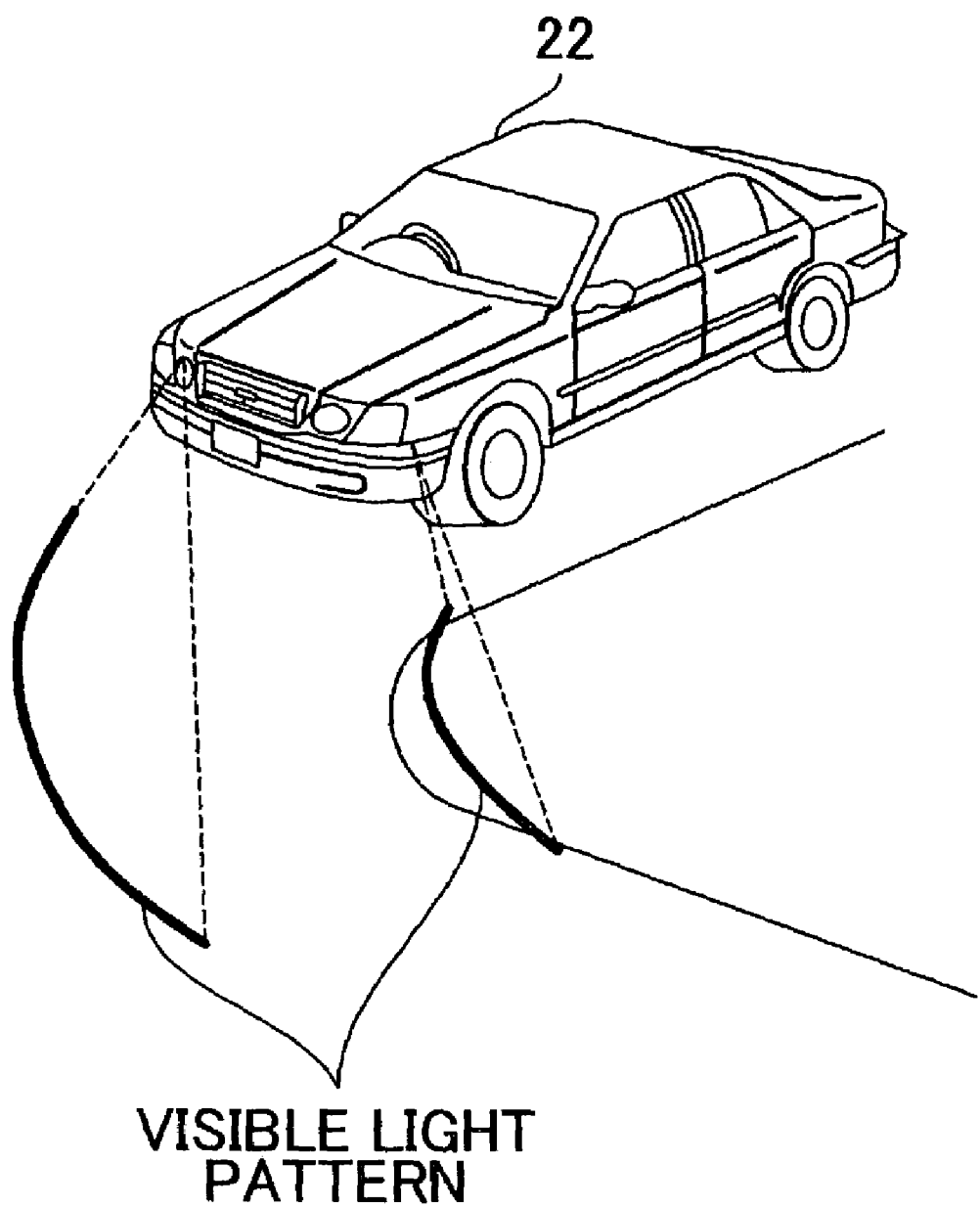
FIG. 7 is an explanatory view showing how to set a position of a pattern resulting from visible light beams that are radiated by the beam radiators when the vehicle turns in the first embodiment.

FIG. 7 is an explanatory view showing how to set a visible light pattern that is radiated from each of the beam radiators 24 when the vehicle 22 makes a turn in the first embodiment. As shown in FIG. 7, in the case where the vehicle 22 runs while making a turn, visible light beams are radiated from the beam radiators 24 such that visible light patterns are projected onto a road surface along a traveling locus along which the vehicle 22 is estimated to run on the basis of a vehicle kinetic state such as a vehicle speed, a steering angle, a yaw rate, or the like.

That is, visible light patterns resulting from visible light beams radiated from the beam radiators 24 are changed in position in accordance with a vehicle kinetic state in the first embodiment. That is, in the first embodiment, since visible light patterns corresponding to a kinetic state of the vehicle 22 are projected onto a road surface, it is possible to inform pedestrians in the surroundings, drivers of other vehicles, and the like, especially pedestrians on a zebra crossing at an intersection or the like and motorists, bicyclists, and the like who follow the vehicle 22 and who are at the risk of being hit thereby of a traveling locus along which the vehicle 22 is estimated to run. Hence, the first embodiment makes it possible to enhance security in driving the vehicle 22.

Figure 8:
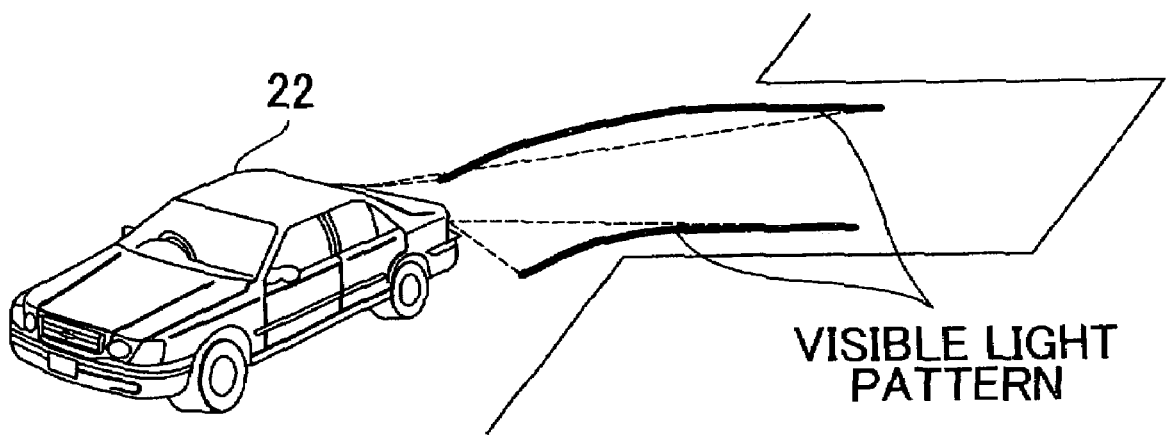
FIG. 8 is an explanatory view showing how to set a position of a pattern resulting from visible light beams that are radiated by the beam radiators in the rear portion of the vehicle body when the vehicle moves backwards to be parked in the first embodiment.

FIG. 8 is an explanatory view showing how to set a position of a visible light pattern resulting from visible light beams radiated from each of the beam radiators 24 that are provided in the rear-left and rear-right portions of the vehicle body when the vehicle 22 moves backwards to be parked in the first embodiment. As shown in FIG. 8, in the case where the driver shifts a shift lever into a parking position so that the vehicle 22 moves backwards to be parked, visible light beams are radiated from the beam radiators in the rear portion of the vehicle body such that visible light patterns having a constant length along a traveling locus along which the vehicle 22 is estimated to run are projected onto a road surface behind the vehicle 22.

That is, in the first embodiment, visible light patterns resulting from visible light beams radiated from the beam radiators 24 in the rear portion of the vehicle are changed in position in accordance with a vehicle kinetic state. Thus, in the first embodiment, since visible light patterns corresponding to a vehicle kinetic state are projected onto a road surface behind the vehicle when the vehicle moves backwards to be parked, it is possible to inform people in the surroundings, drivers of other vehicles, and the like, especially people in a parking space that the vehicle 22 is moving backwards and of a traveling locus along which the vehicle 22 is estimated to run. Further, the driver of the vehicle 22 can look at the visible light patterns projected onto the road surface as an actual image. Hence, the first embodiment makes it possible to enhance security at the time of parking and to assist the driver in performing a parking operation.

In the case where the driver intently concentrates on driving, the driver can swiftly perform a circumventing operation even if the vehicle 22 has been plunged into a situation that constitutes an obstacle to driving of the vehicle 22. Therefore, even if the area of a road surface to be monitored by the vehicle operation supporting device 20 is small, a sufficient effect can be achieved. It is also appropriate that the area where pedestrians and the like are to be informed of the existence of the vehicle 22 concerned be small. On the other hand, in the case where the driver looks aside and cannot intently concentrate on driving, the driver may fall behind in performing a circumventing operation if the vehicle 22 has been plunged into a situation that constitutes an obstacle to driving. Thus, the area of a road surface to be monitored by the vehicle operation supporting device 20 needs to be enlarged, and it is appropriate that others be informed of the existence of the vehicle 22 concerned at an early stage.

Thus, in the first embodiment, visible light patterns having a length corresponding to a degree of concentration of the driver on driving in a traveling direction of the vehicle are projected onto a road surface. More specifically, in the case where the driver demonstrates a relatively high degree of concentration on driving, visible light beams are radiated from the beam radiators 24 such that visible light patterns having a short length are projected onto a road surface. In the case where the driver demonstrates a relatively low concentration on driving, visible light beams are radiated from the beam radiators 24 such that visible light patterns that are increased in length in the traveling direction of the vehicle are projected onto a road surface. That is, visible light patterns resulting from visible light beams radiated from the beam radiators 24 are increased or reduced in length in a traveling direction of the vehicle in accordance with a degree of concentration of the driver on driving.

Thus, in the first embodiment, visible light patterns having a length corresponding to a degree of concentration of the driver on driving in a traveling direction of the vehicle are projected onto a road surface. Therefore, in the case where the driver demonstrates a low concentration on driving, it is possible to inform others of the existence of the vehicle 22 at an early stage. Thus, it becomes possible to let others recognize the existence of the vehicle 22 concerned at a suitable timing corresponding to a degree of concentration of the driver on driving. A degree of concentration of the driver on driving can be detected, for example, on the basis of an image captured by a camera as described later.

Figure 9A:
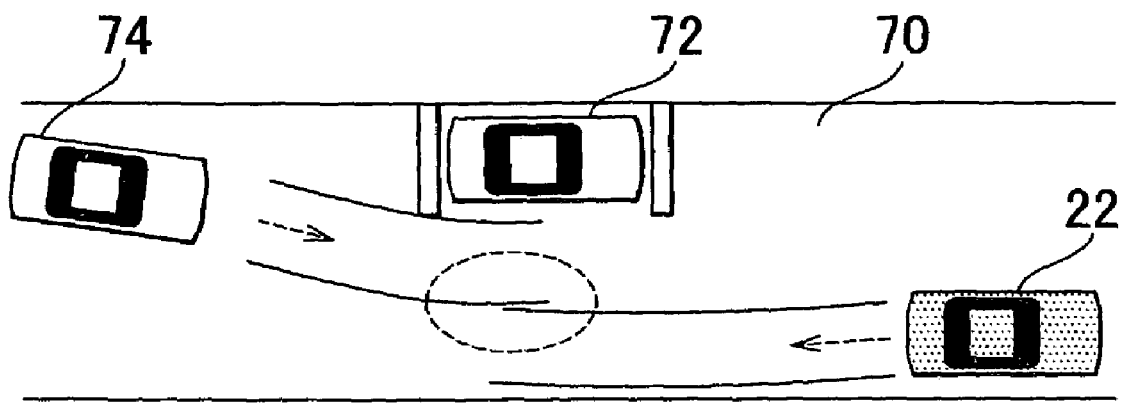
FIGS. 9A-9B are schematic views of a situation in which two vehicles equipped with the vehicle operation supporting device of the first embodiment cross each other.
Figure 9B:
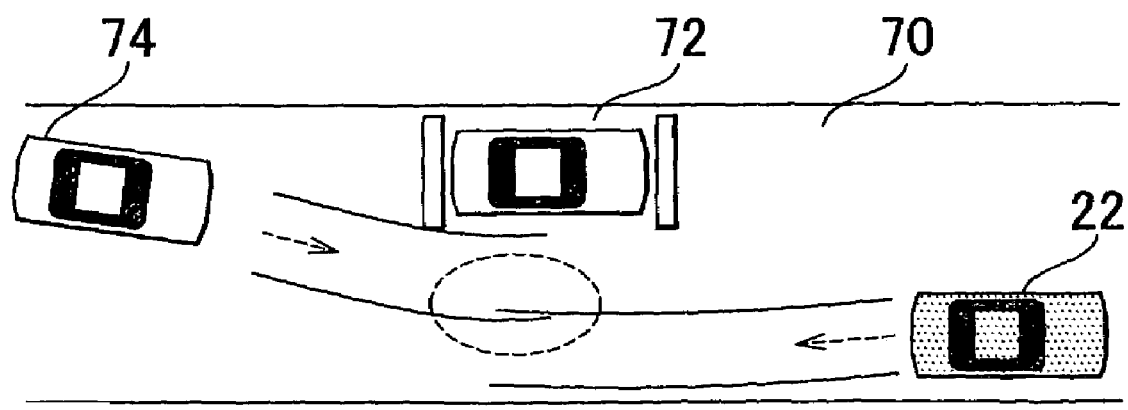

FIGS. 9A and 9B are schematic views of situations in which two vehicles equipped with the vehicle operation supporting device 20 of the first embodiment, that is, the vehicle 22 and a vehicle 74 cross each other. In the situation shown in FIG. 9A, visible light patterns of the vehicles 22, 74 do not intersect with each other. In the situation shown in FIG. 9B, visible light patterns of the vehicles 22, 74 intersect with each other. As shown in FIG. 9, a situation in which the vehicle 22 and the oncoming vehicle 74 cross each other when the width of a road 70 where the vehicle 22 can run has been reduced, for example, due to a vehicle 72 is stopped on the road 70 is considered.

Each of the vehicles 22, 74 radiates visible light beams from the beam radiators 24 such that a visible light pattern corresponding to an estimated traveling locus is projected onto a road surface. Thus, the visible light pattern corresponding to the vehicle 22 and the visible light pattern corresponding to the vehicle 74 are projected onto the road surface respectively. Hence, a driver of each of the vehicles 22, 74 can visually confirm the visible light pattern of the oncoming vehicle projected onto the road surface as well as the visible light pattern of his or her own vehicle projected onto the road surface. The drivers can visually recognize a positional relationship between both the patterns. Thus, according to the first embodiment, when the self-owned vehicle crosses an oncoming vehicle radiating visible light beams, a driver of the self-owned vehicle is allowed to confirm whether or not the self-owned vehicle can or can afford to cross the oncoming vehicle.

In this case, it is also appropriate that a visible light pattern resulting from visible light beams of the self-owned vehicle be further displayed in an additionally connected manner in an area in front of the vehicle or be displayed in an additionally connected manner in such a direction as to move away from an obstacle that is obtained on the basis of another pattern or an image captured by an image-capturing device. In this construction, it is possible to let the driver more easily confirm whether or not the self-owned vehicle can or can afford to cross the oncoming vehicle.

Despite radiation of visible light beams onto a road surface, representation of a visible light pattern projected onto the road surface by the visible light beams may become difficult to visually recognize due to sunlight or the like and a relationship in brightness, color, or the like between the surroundings and the road surface. If such an event occurs, the driver of the vehicle has difficulty in visually recognizing display on the road surface resulting from visible light beams. As a result, the driver has difficulty in recognizing a traveling path of the self-owned vehicle or the existence of other vehicles. Thus, the vehicle operation supporting device 20 of the first embodiment is characterized in making it easy to visually recognize representation of a pattern on a road surface resulting from visible light beams radiated from the self-owned vehicle or other vehicles equipped with the vehicle operation supporting device 20 of the first embodiment. The characteristic part of the first embodiment will be described hereinafter with reference to FIGS. 10 and 11.

Figure 10A:
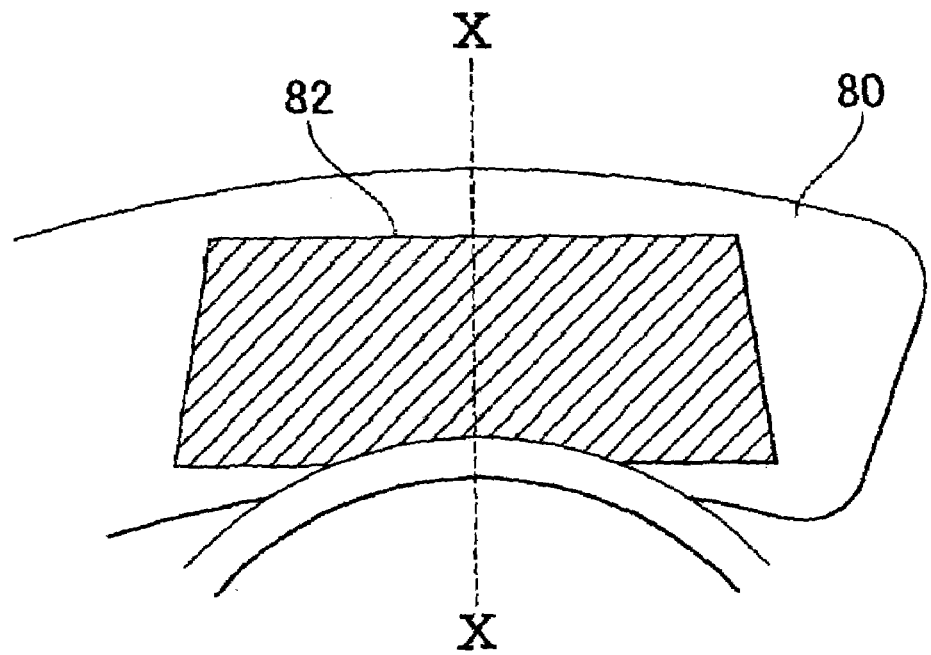
FIGS. 10A-10C are explanatory views of a construction of a vehicle operation supporting system in accordance with the first embodiment.
Figure 10B:
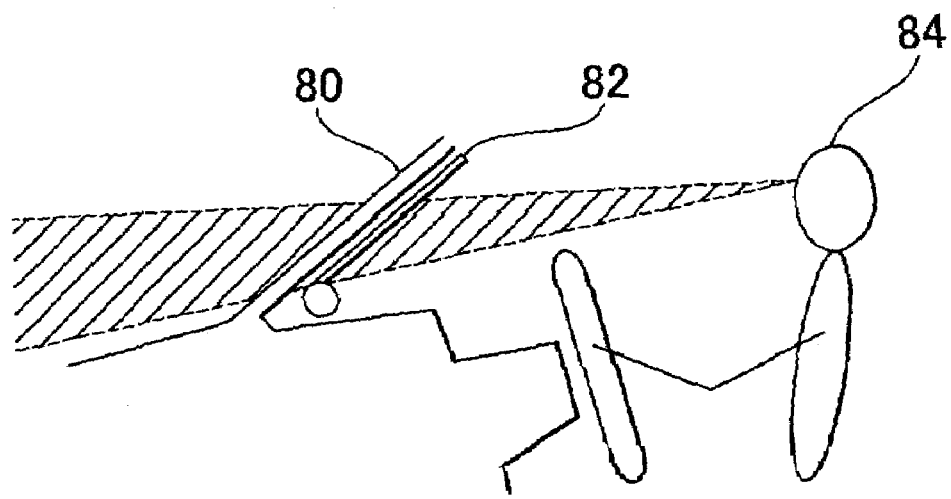
Figure 10:
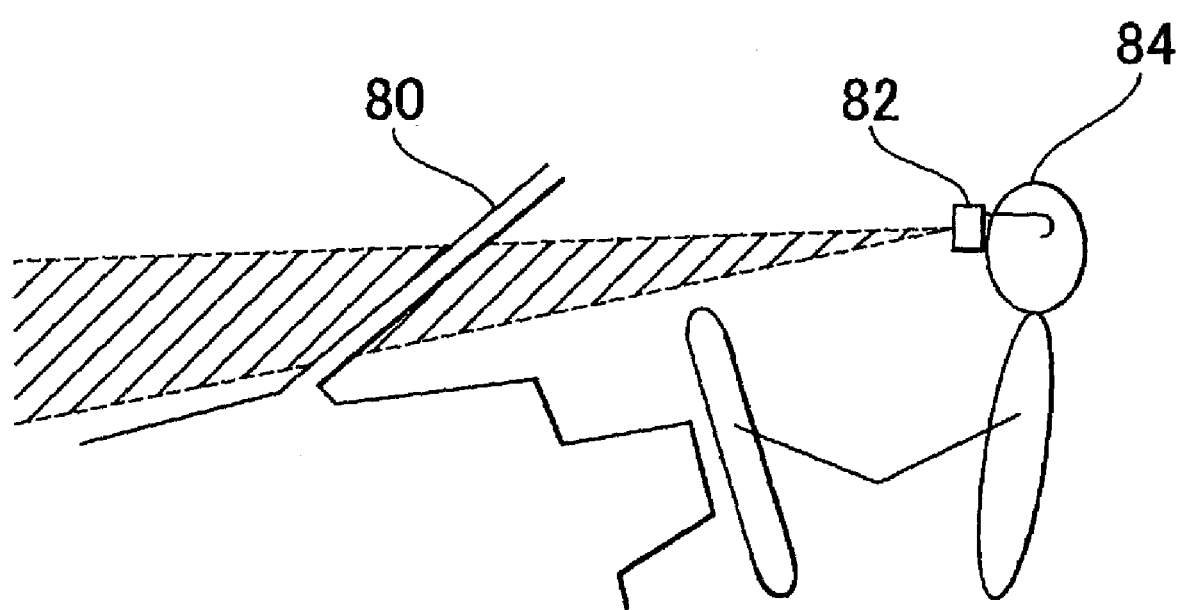

FIG. 10 is an explanatory view of the construction of the vehicle operation supporting system 20 of the first embodiment. FIG. 10A shows a situation in which an area in front of the vehicle 22 is viewed from a driver seat of the vehicle 22. FIG. 10B is a side view that is taken along an X-X cross-section shown in FIG. 10A.

In the first embodiment, the vehicle operation supporting device 20 has an optical filter 82 disposed on a windshield 80 in front of a driver seat. The filter 82 is provided substantially all over the windshield 80 so that the filter 82 is included in a field of view (a range indicated by diagonal lines in FIG. 10B) when a driver 84 in the vehicle 22 looks at an outside area in front of the vehicle through the windshield 80. The filter 82 may either be stuck on the windshield 80 or be disposed along an inner surface of the windshield 80.

Figure 11A:
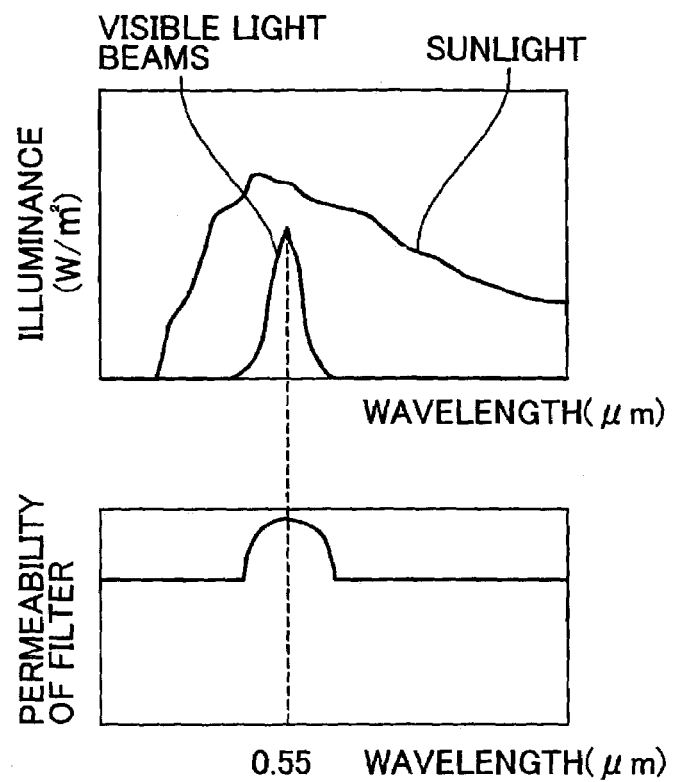
FIGS. 11A-11B explanatory views of a function of a filter included in the vehicle operation supporting system of the first embodiment.
Figure 11B:
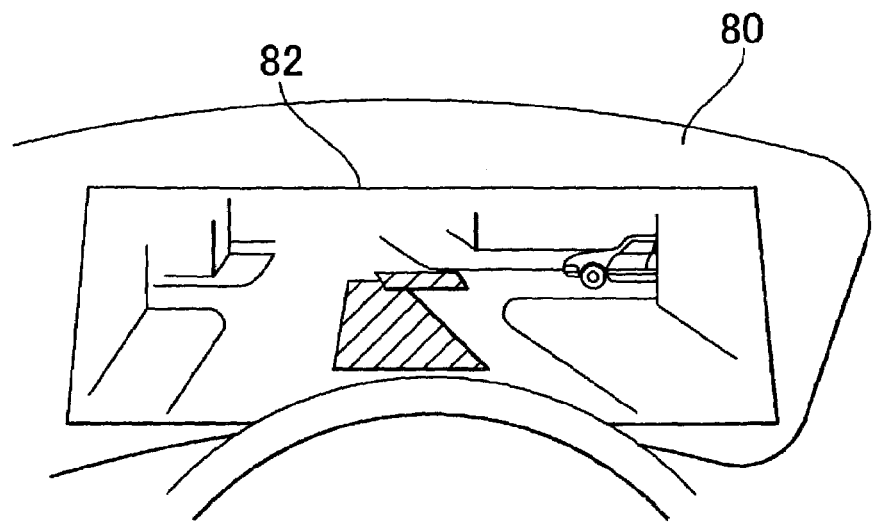

FIG. 11 is an explanatory view of a function of the filter 82 of the first embodiment. An upper chart in FIG. 11A shows a relation between wavelength and illuminance as to sunlight and visible light beams radiated from the beam radiators 24 respectively. A lower chart in FIG. 11A shows a relationship between wavelength and permeability in the filter 82 of the first embodiment. FIG. 11B shows a situation in which an area in front of the vehicle 22 is viewed from the driver seat of the vehicle 22 while the vehicle 22 is running.

As described above, the beam radiators 24 generate visible light beams having a wavelength of approximately 0.55 µm in the first embodiment. In this case, a visible light pattern projected onto a road surface by visible light beams radiated from the beam radiators 24 has a high intensity at a wavelength of the visible light beams. As shown in FIG. 11A, the filter 82 of the first embodiment has a characteristic in which light beams having wavelengths close to the wavelength (approximately 0.55 µm) of visible light beams radiated from the beam radiators 24 of the vehicle 22 are high in permeability than light beams having other wavelengths. That is, light beams having wavelengths substantially equal to the wavelength of visible light beams radiated from the beam radiators 24 are likely to penetrate the filter 82, whereas light beams having other wavelengths are unlikely to penetrate the filter 82.

In this construction, light beams having wavelengths substantially equal to the wavelength of visible light beams generated by a visible light pattern on a road surface are more likely to penetrate the filter 82 than light beams having other wavelengths. Hence, the system of the first embodiment makes it easy to visually recognize display (outer frame portions of areas indicated by diagonal lines in FIG. 11B) of a visible light pattern projected onto a road surface by light beams radiated from the self-owned vehicle or other vehicles due to the intervention of the filter 82. Accordingly, the driver of the vehicle 22 can be ensured of improved visual recognizability of representation of a visible light pattern resulting from light beams radiated from the self-owned vehicle or other vehicles equipped with the system of the first embodiment.

Thus, in the system of the first embodiment, when a visible light pattern is displayed so as to inform a driver of the self-owned vehicle of a traveling path of the self-owned vehicle, the driver can easily grasp the traveling path of the self-owned vehicle. At the same time, when a visible light pattern is displayed so as to inform drivers of other vehicles equipped with the system of the first embodiment of the existence of the self-owned vehicle, the drivers of those vehicles can easily recognize the existence of the self-owned vehicle.

It is to be noted in the above-mentioned first embodiment that the beam radiators 24 as beam radiating means correspond to "a beam radiating portion" in the claims, that the filter 82 as dimming means corresponds to "a dimming portion" in the claims, and that the wavelength of 0.55 µm corresponds to "a predetermined optical characteristic" in the claims.

In the above-mentioned first embodiment, the filter 82 is disposed on the windshield 80. However, only in case of necessity, the filter 82 may be disposed between the windshield 80 and the eyes of the driver of the vehicle. In this case, the filter 82 may either be manually deployed by the driver of the vehicle or be automatically deployed only when a visible light pattern on a road surface is difficult to visually recognize. Furthermore, the filter 82 may be designed as a goggle worn by the driver as shown in FIG. 10C.

In the above-mentioned first embodiment, the pattern projected onto the road surface through radiation of visible light beams from the beam radiators 24 is formed in an encircling shape. However, this pattern may also assume a linear shape, a lattice shape, or the like. In the above-mentioned first embodiment, the pattern projected onto the road surface through radiation of visible light beams from the beam radiators 24 is the vehicle-body circumscribed line of the traveling locus along which the vehicle 22 is estimated to run on the basis of a kinetic state of the vehicle 22. However, when the pattern is projected, it may be a margin line of an area where the vehicle 22 can stably make a left or right turn. In this construction, since visible light beams are displayed on a road surface according to a pattern corresponding to the margin line of the turn, it is possible to inform others of the existence of the vehicle 22 concerned, and to inform a driver of the vehicle 22 concerned of an area where the vehicle 22 can suitably make a turn. As a result, security in driving the vehicle is improved.

In the above-mentioned first embodiment, the visible light pattern projected onto the road surface through radiation of visible light beams from the beam radiators 24 is changed in position in accordance with a kinetic state of the vehicle. However, it is also appropriate that the visible light pattern be changed in position in conformity with a turn signal switch operated by the driver when making a left or right turn or the like or be changed in position in accordance with a route determined in advance on the basis of route information obtained from a navigation device.

Next, the second embodiment of the invention will be described with reference to FIGS. 12 to 15 as well as FIGS. 1 and 10.

In the above-mentioned first embodiment, the filter 82 having the characteristic of being more permeable to light beams having wavelengths close to the wavelength (approximately 0.55 µm) of visible light beams radiated from the beam radiators 24 of the vehicle 22 than light beams having other wavelengths is disposed on the windshield 80 in front of the driver seat. On the other hand, in the second embodiment, a filter whose characteristic can change is provided, and the characteristic of the filter is temporally controlled. That is, in the second embodiment, a vehicle operation supporting device 100 is realized by replacing the filter 82 with an optical filter 102 in the above-mentioned construction shown in FIGS. 1 and 10.

FIG. 12 is a block diagram of the vehicle operation supporting device 100 of the second embodiment. The vehicle operation supporting device 100 has the filter 102. As in the case of the filter 82 mentioned above, the filter 102 is disposed substantially all over the windshield 80 so that the filter 102 is included in a field of view when a driver in the vehicle 22 looks at an outside area in front of the vehicle through the windshield 80. The filter 102 functions as an optical shutter composed of a plurality of liquid-crystal cells. The beam ECU 32 mentioned above is connected to the filter 102. A voltage is applied to the filter 102 in accordance with a command from the beam ECU 32, whereby the filter 102 has a characteristic of being less permeable to light beams having wavelengths close to the wavelength (approximately 0.55 µm) of visible light beams radiated from the beam radiators 24 of the vehicle 22 than to light beams having other wavelengths.

In the second embodiment, the beam ECU 32 causes the beam generator 26 to generate visible light beams for a certain period (e.g., several milliseconds, 100 ms, 1 s, etc) at intervals of a certain period (e.g., several tens of milliseconds, 100 ms, 1 s, etc). These periods may be changed in accordance with a running state of the vehicle or the like. That is, in the second embodiment, the beam radiators 24 intermittently radiate visible light beams.

A guide line switch 104 that is disposed in the driver seat of the vehicle 22 and that can be operated by the driver is also connected to the beam ECU 32. The guide line switch 104 is designed as a switch for determining whether to let the driver grasp a visible light pattern resulting from visible light beams radiated from the self-owned vehicle as a traveling path thereof. The guide line switch 104 is switched by being operated by the driver. The beam ECU 32 determines, on the basis of a state of the guide line switch 104, whether or not a visible light pattern of the self-owned vehicle is utilized as a traveling path of the self-owned vehicle.

A driver position sensor 106 is further connected to the beam ECU 32. The driver position sensor 106 is designed as a sensor for detecting a position of the eyes of a driver in the vehicle 22 relative to the filter 102 disposed on the windshield 80. The beam ECU 32 detects a position of the eyes of the driver relative to the filter 102 on the basis of an output signal from the driver position sensor 106. Further, the beam ECU 32 drives the scan actuators 38 of the beam radiators 24 and thus can detect a position of a visible light pattern projected onto a road surface by visible light beams radiated from the beam radiators 24 relative to the vehicle 22.

In a situation where the guide line switch 104 has been turned on and where the driver must grasp a visible light pattern resulting from visible light beams radiated from the self-owned vehicle as a traveling path thereof, it is desirable that light beams generated by the visible light pattern be likely to reach the driver without becoming unlikely to penetrate the filter 102. In a situation where the guide line switch 104 has been turned off and where the driver does not have to grasp a visible light pattern resulting from visible light beams radiated from the self-owned vehicle as a traveling path thereof, no inconvenience is caused even if light beams generated by the visible light pattern have become unlikely to penetrate the filter 102. On the other hand, even in such a situation, the driver must grasp a visible light pattern resulting from visible light beams radiated from another vehicle from the standpoint of recognizing the existence of that vehicle. It is important that light beams generated by the visible light pattern be likely to reach the driver without becoming unlikely to penetrate the filter 102. Thus, the vehicle operation supporting device 100 of the second embodiment takes this respect into account and is characterized in temporally controlling the characteristic of the filter 102.

Figure 13:
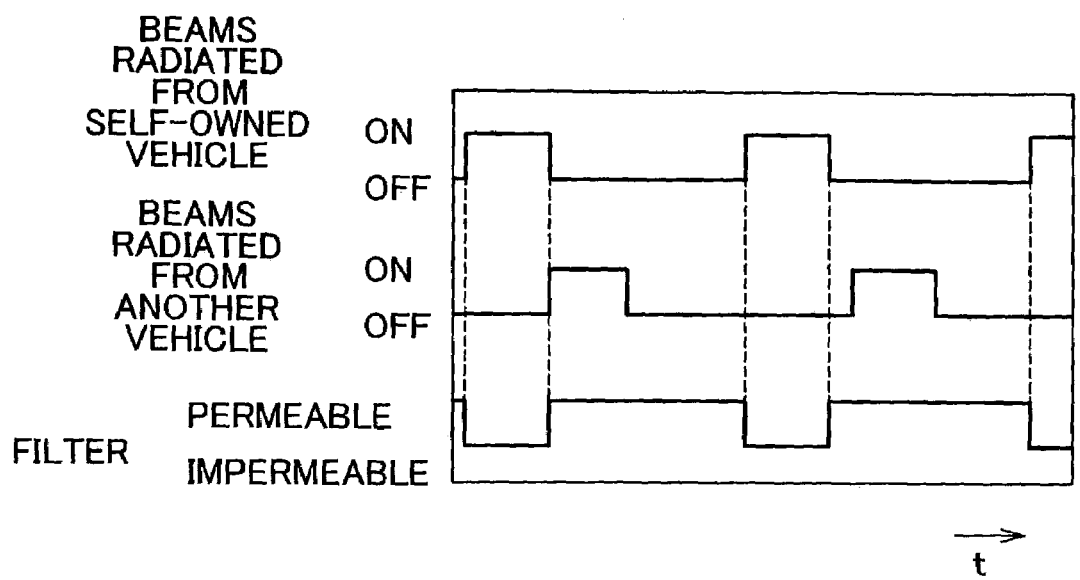
FIG. 13 is a time chart of an example in which a characteristic of a filter is temporally changed in the second embodiment.
Figure 14:
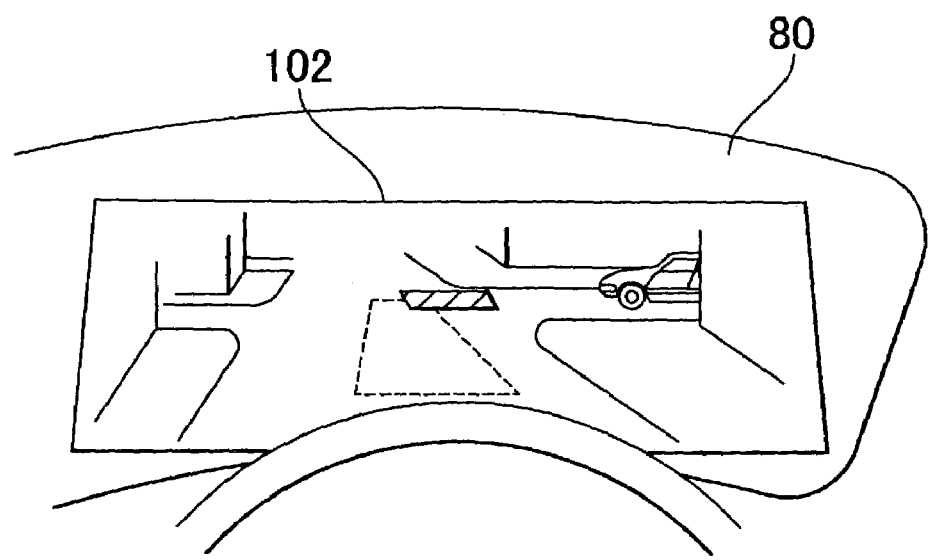
FIG. 14 is a schematic view of a situation in which an area in front of a self-owned vehicle is viewed from a driver seat when the vehicle radiates visible light beams in the second embodiment.

FIG. 13 is a time chart of an example in which the characteristic of the filter 102 is temporally changed in the second embodiment. FIG. 14 is a schematic view of a situation in which an area in front of the vehicle is viewed from the driver seat when visible light beams are radiated from the self-owned vehicle in the second embodiment. As described above, the beam ECU 32 causes the beam generator 26 to generate visible light beams for a certain period at intervals of a certain period, and the beam radiators 24 intermittently radiate visible light beams. That is, the beam ECU 32 can grasp a timing when a visible light pattern projected onto a road surface by visible light beams is displayed.

In the second embodiment, under a situation in which the guide line switch 104 has been turned on, that is, under a situation in which the driver must grasp a visible light pattern resulting from visible light beams radiated from the self-owned vehicle as a traveling path thereof, the beam ECU 32 applies no voltage to the filter 102. On the other hand, under a situation in which the guide line switch 104 has been turned off, that is, under a situation in which the driver does not have to grasp a visible light pattern resulting from visible light beams of the self-owned vehicle as a traveling path thereof, the beam ECU 32 applies a voltage to all the liquid-crystal cells of the filter 102 in synchronization with a timing when visible light beams are radiated from the self-owned vehicle, that is, a timing when the visible light pattern of the self-owned vehicle is displayed.

As described above, due to application of a voltage, the filter 102 has a characteristic of being less permeable to light beams having wavelengths close to the wavelength of visible light beams of the vehicle 22 than to light beams having other wavelengths. Thus, as shown in FIG. 13, under a situation in which a visible light pattern resulting from visible light beams radiated from the self-owned vehicle is not utilized as a traveling path thereof, light beams having wavelengths close to the wavelength of the visible light beams radiated from the vehicle 22 are unlikely to penetrate the filter 102 for a period in which visible light beams are radiated from the self-owned vehicle. That is, light beams having wavelengths close to the wavelength of the visible light beams radiated from the vehicle 22 do not become unlikely to penetrate the filter 102 in a period other than the above-mentioned period.

Visible light beams are intermittently radiated for a certain period (e.g., several milliseconds, 100 ms, 1 s, etc) in a certain period (e.g., several tens of milliseconds, 1 s, 10 s, etc). Representation of a visible light pattern resulting from visible light beams radiated from another vehicle randomly occurs with respect to the self-owned vehicle. Hence, according to the above-mentioned construction, under a situation in which a visible light pattern resulting from visible light beams radiated from the self-owned vehicle is not utilized as a traveling path of the self-owned vehicle, light beams of the visible light pattern (indicated by a dotted line in FIG. 14) resulting from the visible light beams are unlikely to reach the driver of the self-owned vehicle for a period in which the visible light beams are radiated from the self-owned vehicle, whereas light beams of a visible light pattern (an outer frame portion-of a range indicated by diagonal lines in FIG. 14) resulting from visible light beams radiated from another vehicle are likely to reach the driver of the self-owned vehicle for a period in which visible light beams are not radiated from the self-owned vehicle. Thus, under a predetermined situation, the driver of the self-owned vehicle finds it easier to visually recognize representation of a visible light pattern projected onto a road surface by visible light beams radiated from another vehicle than representation of a visible light pattern of the self-owned vehicle.

Figure 15:
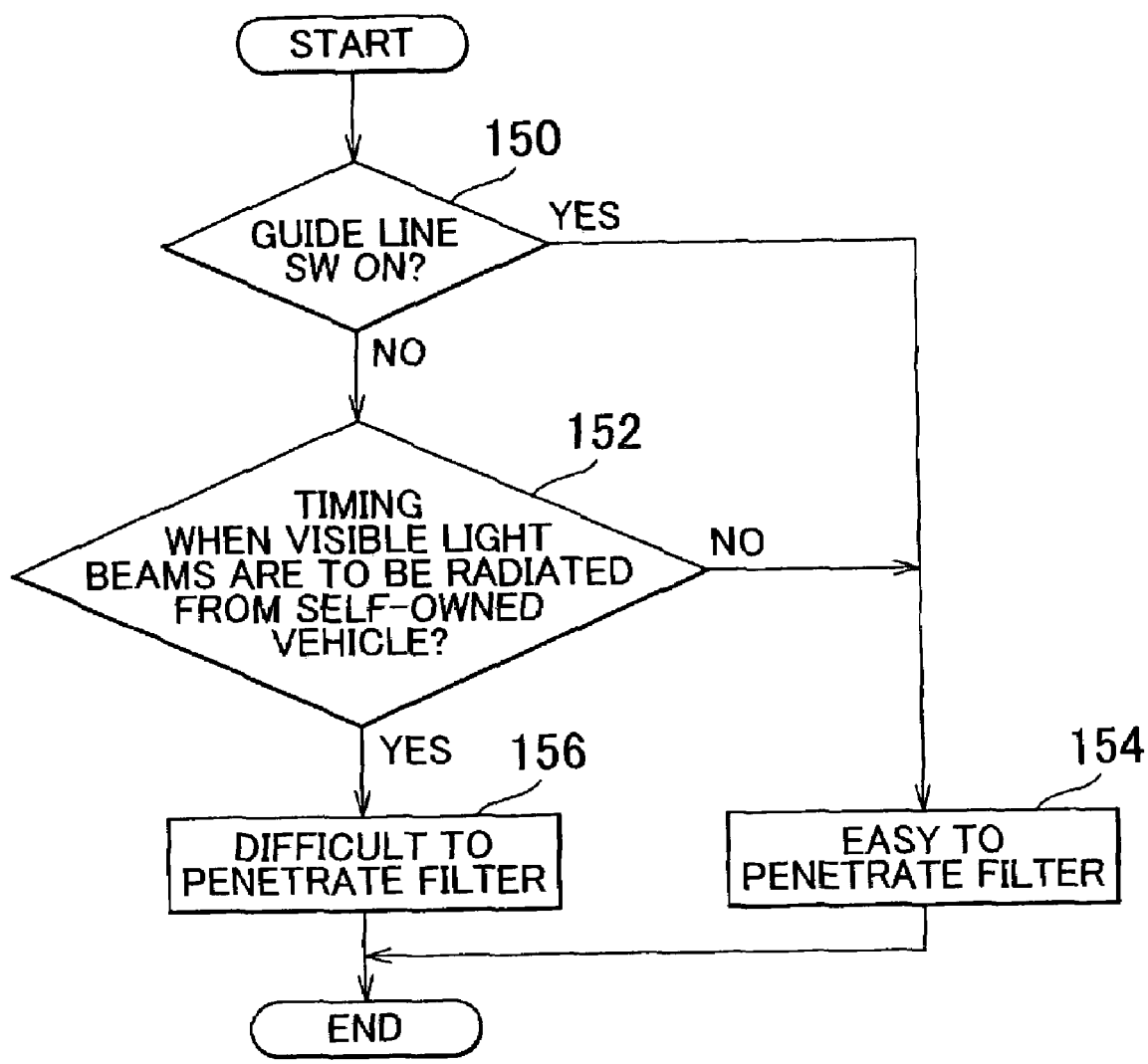
FIG. 15 is a flowchart of a control routine that is executed to temporally change the characteristic of the filter in the second embodiment.

FIG. 15 is a flowchart of an exemplary control routine that is executed by the beam ECU 32 in the second embodiment to perform the above-mentioned function. A routine shown in FIG. 15 is repeatedly activated at intervals of a predetermined period. If the routine shown in FIG. 15 is activated, a processing in step 150 is first of all performed.

In step 150, it is determined whether or not the guide line switch 104 has been turned on, that is, whether or not the driver of the self-owned vehicle intends to utilize a visible light pattern thereof as a traveling path thereof. If it is determined as a result that the visible light pattern of the self-owned vehicle is utilized as a traveling path thereof, a processing in step 154 is then performed. On the other hand, if it is determined that the visible light pattern is not utilized as a traveling path of the self-owned vehicle, namely, that the visible light pattern is utilized to inform drivers of other vehicles of the existence of the self-owned vehicle, a processing in step 152 is then performed.

In step 152, it is determined whether or not the beam radiators 24 of the self-owned vehicle are at a timing of radiation of visible light beams. If it is determined as a result that the visible light beams are not at a timing of radiation of visible light beams, a processing in step 154 is then performed. On the other hand, if it is determined that the beam radiators 24 are at a timing of radiation of visible light beams, a processing in step 156 is then performed.

In step 154, no voltage is applied to the filter 102, and a processing of preventing light beams having wavelengths close to the wavelength of visible light beams radiated from the vehicle 22 from becoming unlikely to penetrate the filter 102 is prevented. If the processing in this step 154 is performed, visible light beams radiated from the vehicle 22 can thereafter penetrate the filter 102 easily. If the processing in step 154 is terminated, the present routine is terminated.

In step 156, a voltage is applied to the filter 102, whereby a processing of making it difficult for light beams having wavelengths close to the wavelength of visible light beams radiated from the vehicle 22 to penetrate the filter 102 is performed. If the processing in this step 156 is performed, visible light beams radiated from the vehicle 22 are thereafter unlikely to penetrate the filter 102. If the processing in this step 156 is terminated, the present routine is terminated.

According to the routine shown in FIG. 15, under a situation in which a visible light pattern resulting from visible light beams of the self-owned vehicle is not utilized as a traveling path thereof, light beams of a visible light pattern resulting from visible light beams radiated from the vehicle 22 are unlikely to reach the driver of the self-owned vehicle for a period in which visible light beams are radiated from the self-owned vehicle, whereas light beams of a visible light pattern resulting from visible light beams resulting from the vehicle 22 are likely to reach the driver of the self-owned vehicle for a period in which visible light beams are not radiated from the self-owned vehicle.

Visible light beams are intermittently radiated from vehicles. A timing when visible light beams are radiated from other vehicles seldom coincides with a timing when visible light beams are radiated from the self-owned vehicle. Thus, according to the system of the second embodiment, the driver of the vehicle can visually recognize representation of a visible light pattern projected onto a road surface by visible light beams radiated from another vehicle more easily than representation of a visible light pattern of the self-owned vehicle, and it is possible to enhance visual recognizability of the visible light pattern of that vehicle. Hence, according to the system of the second embodiment, a visible light pattern resulting from visible light beams radiated from another vehicle is displayed toward the driver of the self-owned vehicle in an emphasized manner. Therefore, when the self-owned vehicle runs, it is possible to inform the driver thereof of a hazardous situation in which another vehicle is approaching as early as possible.

It is to be noted in the above-mentioned second embodiment that the filter 102 corresponds to "the dimming portion" in the claims as dimming means, and that the condition in step 150 in the above-mentioned routine shown in FIG. 15 corresponds to "the predetermined condition" in the claims. At the same time, the beam ECU 32 performs the processings in step 150 and step 154, whereby "a penetration control portion" in the claims as penetration control means is realized.

In the above-mentioned second embodiment, visible light beams are generated by the beam generator 26 for a certain period at intervals of a certain period, and visible light beams are intermittently radiated from the beam radiators 24. However, the invention is not limited to this construction. It is also appropriate to cause the beam generator 26 to generate visible light beams and to cause the beam radiators 24 to intermittently radiate visible light beams only in the case where representation of a visible light pattern resulting from light beams radiated from the self-owned vehicle needs to be recognized by the driver of the self-owned vehicle or drivers of other vehicles, for example, when the vehicle 22 is in a predetermined running state.

In the above-mentioned second embodiment, if the guide line switch 104 has been turned on, visible light beams radiated from the vehicle 22 are prevented from becoming unlikely to penetrate the filter 102. However, the invention is not limited to this construction. It is also appropriate to prevent visible light beams radiated from the vehicle 22 from becoming unlikely to penetrate the filter 102 when the vehicle 22 is in a predetermined running state without requiring the driver to perform any operation.

Next, the third embodiment of the invention will be described with reference to FIGS. 16 and 17 as well as FIG. 12.

In the above-mentioned second embodiment, the characteristic of the filter 102 is temporally changed. On the other hand, in the third embodiment, the characteristic of the filter 102 is changed according to its ranges. That is, in the third embodiment, the vehicle operation supporting system is realized by causing the beam ECU 32 to execute a routine shown in FIG. 17 in the above-mentioned construction shown in FIG. 12.

Figure 16A:
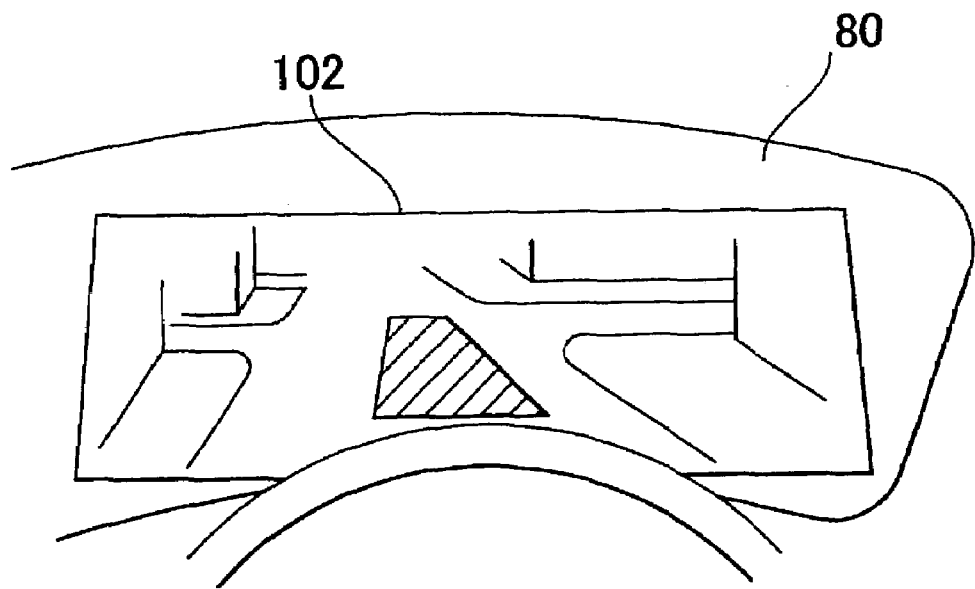
FIGS. 16A-16B are explanatory views of a function of a filter in accordance with a third embodiment as another aspect of the invention.
Figure 16B:
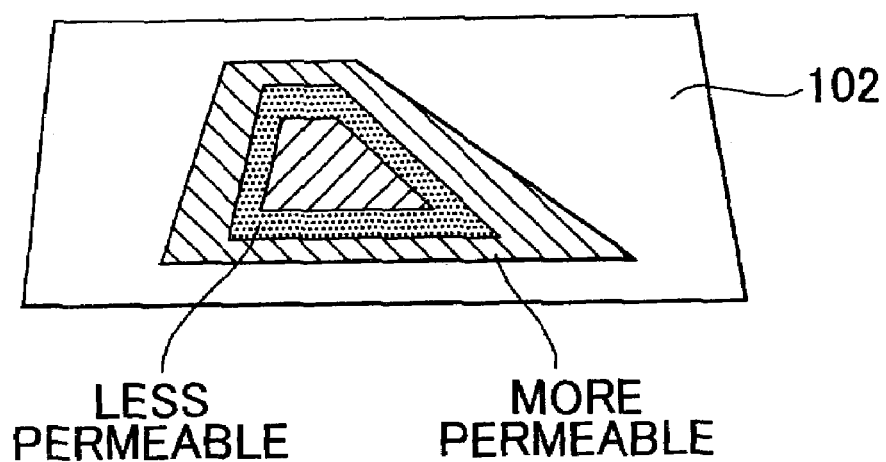

FIG. 16 is an explanatory view of a function of the filter 102 in the third embodiment. FIG. 16A is a schematic view of a situation in which an area in front of the vehicle 22 is viewed from the driver seat thereof when the vehicle 22 is running. FIG. 16B is a schematic view of a range in which the characteristic of the filter 102 is changed in the situation shown in FIG. 16A.

As described above, in the situation in which the driver must grasp a visible light pattern resulting from visible light beams radiated from the self-owned vehicle as a traveling path thereof, it is desirable that light beams of the visible light pattern be likely to reach the driver of the self-owned vehicle. In the situation in which the driver does not have to grasp a visible light pattern resulting from visible light beams radiated from the self-owned vehicle as a traveling path thereof, no inconvenience is caused even if light beams of the visible light pattern of the self-owned vehicle have become unlikely to reach the driver thereof. On the other hand, it is desirable that light beams of a visible light pattern of another vehicle be likely to reach the driver of the self-owned vehicle.

In the vehicle operation supporting system of the third embodiment, the beam ECU 32 causes the beam radiators 24 to radiate visible light beams while driving the scan actuators 38. Thus, it is possible to detect a position of a visible light pattern projected onto a road surface by visible light beams radiated from the beam radiators 24 of the self-owned vehicle relative to the filter 102 thereof. The beam ECU 32 also detects a position of the eyes of the driver relative to the filter 102 by means of the driver position sensor 106. Thus, under a situation in which the beam radiators 24 of the self-owned vehicle radiate visible light beams, the beam ECU 32 can grasp a positional relationship between the eyes of the driver and the visible light pattern. The beam ECU 32 can detect a position of a visible light pattern projected onto the filter 102 when the driver of the self-owned vehicle looks at the visible light pattern resulting from the visible light beams.

As described above, the filter 102 is an optical shutter composed of a plurality of liquid-crystal cells, and can individually apply a voltage to each of the liquid-crystal cells. In the third embodiment, in the case where the guide line switch 104 has been turned on and where a visible light pattern resulting from visible light beams radiated from the self-owned vehicle is utilized as a traveling path thereof, the beam ECU 32 applies no voltage to the filter 102. On the other hand, in the case where the guide line switch 104 has been turned off and where a visible light pattern resulting from visible light beams radiated from the self-owned vehicle is not utilized as a traveling path thereof, the beam ECU 32 applies a voltage only to the liquid-crystal cells that are close to the position of the visible light pattern on the filter 102 (e.g., within a predetermined distance from the position).

Thus, according to the third embodiment, in the case where a visible light pattern (indicated by diagonal lines in FIG. 16A) resulting from the self-owned vehicle is not utilized as a traveling path thereof, light beams of the visible light pattern are unlikely to penetrate the filter 102 only in a range (indicated by dots in FIG. 16B) where the visible light pattern is projected when the driver of the self-owned vehicle looks at it, whereas light beams of the visible light pattern are not unlikely to penetrate the filter 102 in other ranges (indicated by diagonal lines in FIG. 16B) In this case, it is also appropriate that the range where light beams of the visible light pattern are not unlikely to penetrate the filter 102 be limited as a certain range as shown in FIG. 16B, and that light beams of the visible light pattern be unlikely to penetrate the filter 102 also in a range (indicated as a plain range in FIG. 16B) other than the range where the visible light pattern is projected.

Hence, according to this construction, in the case where a visible light pattern resulting from visible light beams radiated from the self-owned vehicle is not utilized as a traveling path thereof, light beams of the visible light pattern of the self-owned vehicle are unlikely to reach the driver thereof. On the other hand, light beams of a visible light pattern that is produced by another vehicle and that is different from the visible light pattern of the self-owned vehicle are likely to reach the driver of the self-owned vehicle. Thus, under a predetermined situation, the driver of the self-owned vehicle can visually recognize representation of a visible light pattern projected onto a road surface by visible light beams radiated from another vehicle more easily than representation of a visible light pattern of the self-owned vehicle.

Figure 17:
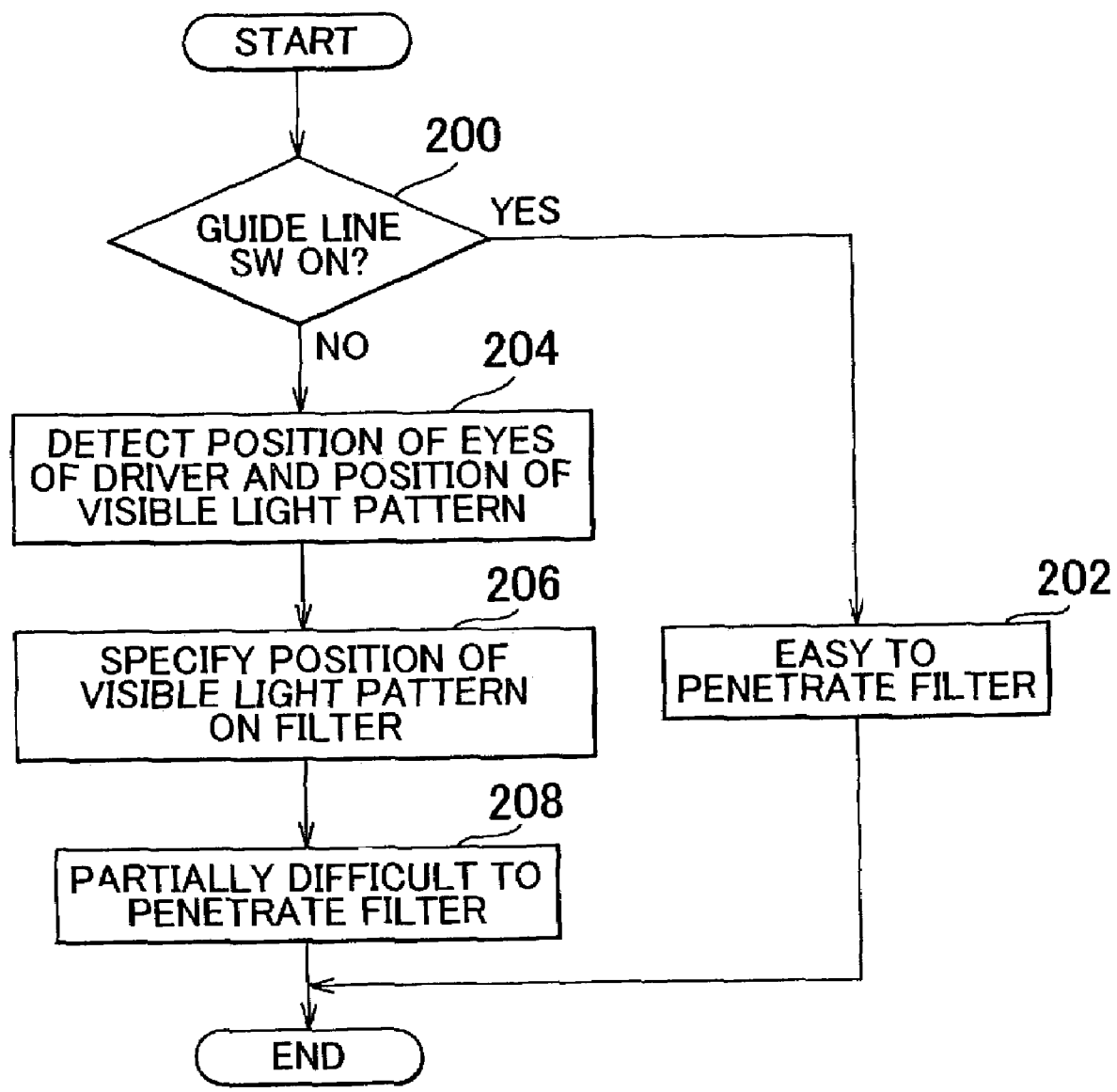
FIG. 17 is a flowchart of a control routine that is executed to change a characteristic of the filter depending on areas in the third embodiment.

FIG. 17 is a flowchart of an exemplary control routine that is executed by the beam ECU 32 in the third embodiment to perform the above-mentioned function. The routine shown in FIG. 17 is repeatedly activated at intervals of a predetermined period. If the routine shown in FIG. 17 is activated, a processing in step 200 is first of all performed.

As in the case of the above-mentioned step 150, it is determined in step 200 whether or not the guide line switch 104 has been turned on. If it is determined as a result that the guide line switch 104 has been turned on, a processing in step 202 is then performed. In step 202, no voltage is applied to the liquid-crystal cells of the filter 102, and a processing of preventing visible light beams radiated from the vehicle 22 from becoming unlikely to penetrate the filter 102 is performed in the entire range of the filter 102. If the processing in step 202 is performed, visible light beams radiated from the vehicle 22 can thereafter penetrate the entire range of the filter 102 easily. If the processing in step 202 is terminated, the present routine is terminated.

On the other hand, if it is determined in the above-mentioned step 200 that the guide line switch 104 has been turned on, a processing in step 204 is then performed. In step 204, the driver position sensor 106 is used to detect a position of the eyes of the driver of the self-owned vehicle relative to the filter 102, and a processing of detecting a position of a visible light pattern resulting from visible light beams radiated from the beam radiators 24 of the self-owned vehicle relative to the filter 102 on the basis of drive positions of the scan actuators 38 is performed.

In step 206, a positional relationship between the eyes of the driver of the self-owned vehicle detected in the above-mentioned step 204 and the visible light pattern of the self-owned vehicle is grasped on the basis of a positional relationship between them, and a processing of specifying a position of a visible light pattern that is projected onto the filter 102 when the driver of the self-owned vehicle looks at the visible light pattern resulting from visible light beams radiated from the self-owned vehicle is performed.

In step 208, a voltage is applied only to the liquid-crystal cells of the filter 102 which are located close to the visible light pattern specified in the above-mentioned step 206, whereby a processing of making it difficult for visible light beams radiated from the vehicle 22 to penetrate the filter 102 in certain ranges is performed. If a processing in step 208 is performed, some of visible light beams radiated from the vehicle 22 are thereafter unlikely to penetrate the filter 102. If the processing in step 208 is terminated, the present routine is terminated.

According to the above-mentioned routine shown in FIG. 17, in the case where a visible light pattern resulting from visible light beams radiated from the self-owned vehicle is not utilized as a traveling path thereof, light beams of the visible light pattern of the self-owned vehicle are unlikely to reach the driver thereof. On the other hand, light beams of a visible light pattern that is produced by another vehicle and that is different from a visible light pattern of the self-owned vehicle do not become unlikely to reach the driver of the self-owned vehicle. That is, light beams of the visible light pattern of another vehicle remain likely to reach the driver of the self-owned vehicle. Thus, according to the system of the third embodiment, the driver of the self-owned vehicle can visually recognize representation of a visible light pattern projected onto a road surface by visible light beams radiated from another vehicle more easily than representation of a visible light pattern of the self-owned vehicle, and it is possible to enhance visual recognizability of the visible light pattern of that vehicle. Hence, according to the system of the third embodiment, a visible light pattern resulting from visible light beams radiated from another vehicle is displayed toward the driver of the self-owned vehicle in an emphasized manner. Therefore, when the self-owned vehicle runs, it is possible to inform the driver thereof of a hazardous situation in which another vehicle is approaching as early as possible.

In the third embodiment, as shown in FIG. 16B, in the case where the range (indicated by diagonal lines) of the filter 102 that does not become unlikely to be penetrated by light beams of a visible light pattern is limited to a certain range, light beams of the visible light pattern are unlikely to penetrate the filter 102 also in a range (plain range) other than a range where the visible light pattern is projected. Because a range located far from the visible light pattern resulting from visible light beams radiated from the self-owned vehicle involves a low risk as to driving of the self-owned vehicle, the driver of the self-owned vehicle has a low degree of necessity to pay attention. Thus, according to this construction, a visible light pattern that results from visible light beams of another vehicle and that requires the driver to pay much attention can be displayed in a further emphasized manner.

It is to be noted in the above-mentioned third embodiment that the filter 102 corresponds to "the dimming portion" in the claims as dimming means, and that the condition in step 200 in the above-mentioned routine shown in FIG. 17 corresponds to "the predetermined condition" in the claims. The beam ECU 32 performs the processings in step 200 and step 202, whereby "the penetration control portion" in the claims as penetration control means is realized.

In the above-mentioned third embodiment, the beam ECU 32 is not required to cause the beam generator 26 to generate visible light beams for a certain period at intervals of a certain period as in the case of the above-mentioned second embodiment. For example, the beam radiators 24 may be designed to continuously radiate visible light beams instead of intermittently radiating visible light beams. In the case where the beam radiators 24 intermittently radiate visible light beams in the above-mentioned third embodiment, an additional effect is achieved if the construction of the second embodiment and the construction of the third embodiment are combined to temporally change the characteristic of the filter 102 according to its ranges.

In the above-mentioned third embodiment as well, if the guide line switch 104 has been turned on, visible light beams radiated from the vehicle 22 are prevented from becoming unlikely to penetrate the filter 102. However, the invention is not limited to this construction. It is also appropriate that visible light beams radiated from the vehicle 22 be prevented from becoming unlikely to penetrate the filter 102 when the vehicle 22 is in a predetermined running state without requiring the driver to perform any operation.

In the above-mentioned first to third embodiments, the filter 82 is stuck on the windshield 80 or disposed along the windshield 80. However, it is appropriate that the filter 82 be disposed inside a cabin between the windshield 80 and the eyes of the driver of the vehicle 22. For example, lens portions of glasses worn by the driver may be designed to perform such a filtering function. It is also appropriate that the filter 82 be disposed on a windshield behind the driver seat or the like instead of being disposed on the windshield 80 in front of the driver seat.

In the above-mentioned first to third embodiments, the filter 82 has a characteristic of being more permeable to light beams having wavelengths close to the wavelength of visible light beams radiated from the beam radiators 24 of the vehicle 22 than to light beams having other wavelengths. However, since visible light beams radiated from the beam radiators 24 have laterally polarized components that are parallel to a road surface and that have been damped. Therefore, the filter may have a characteristic of being more permeable to longitudinally polarized components that are perpendicular to the road surface and being less permeable to laterally polarized components.

In the above-mentioned first to third embodiments, the filter 82 or 102 disposed on the windshield 80 is used to make it easy or difficult to visually recognize a visible light pattern resulting from visible light beams radiated from the vehicle 22 when the driver of the self-owned vehicle directly looks at an outside area through the windshield 80. However, the invention is not limited to this construction. In a construction wherein an image-capturing device captures a visible light pattern of the vehicle 22 and wherein the captured image is projected onto a monitor installed inside the vehicle, it is appropriate that the visible light pattern on the image be made easy or difficult to visually recognize when the driver of the self-owned vehicle looks at the image on the monitor.

Furthermore, in the above-mentioned first to third embodiments, the beam radiators 24 radiate light beams having wavelengths in a visible light range. However, it is also appropriate that the beam radiators 24 radiate light beams having wavelengths in an invisible light range. In this case, a filter is used to suitably make it easy for the driver of the self-owned vehicle to visually recognize light beams of a pattern that is formed on a road surface by light beams radiated from the self-owned vehicle or another vehicle.

Figure 18:
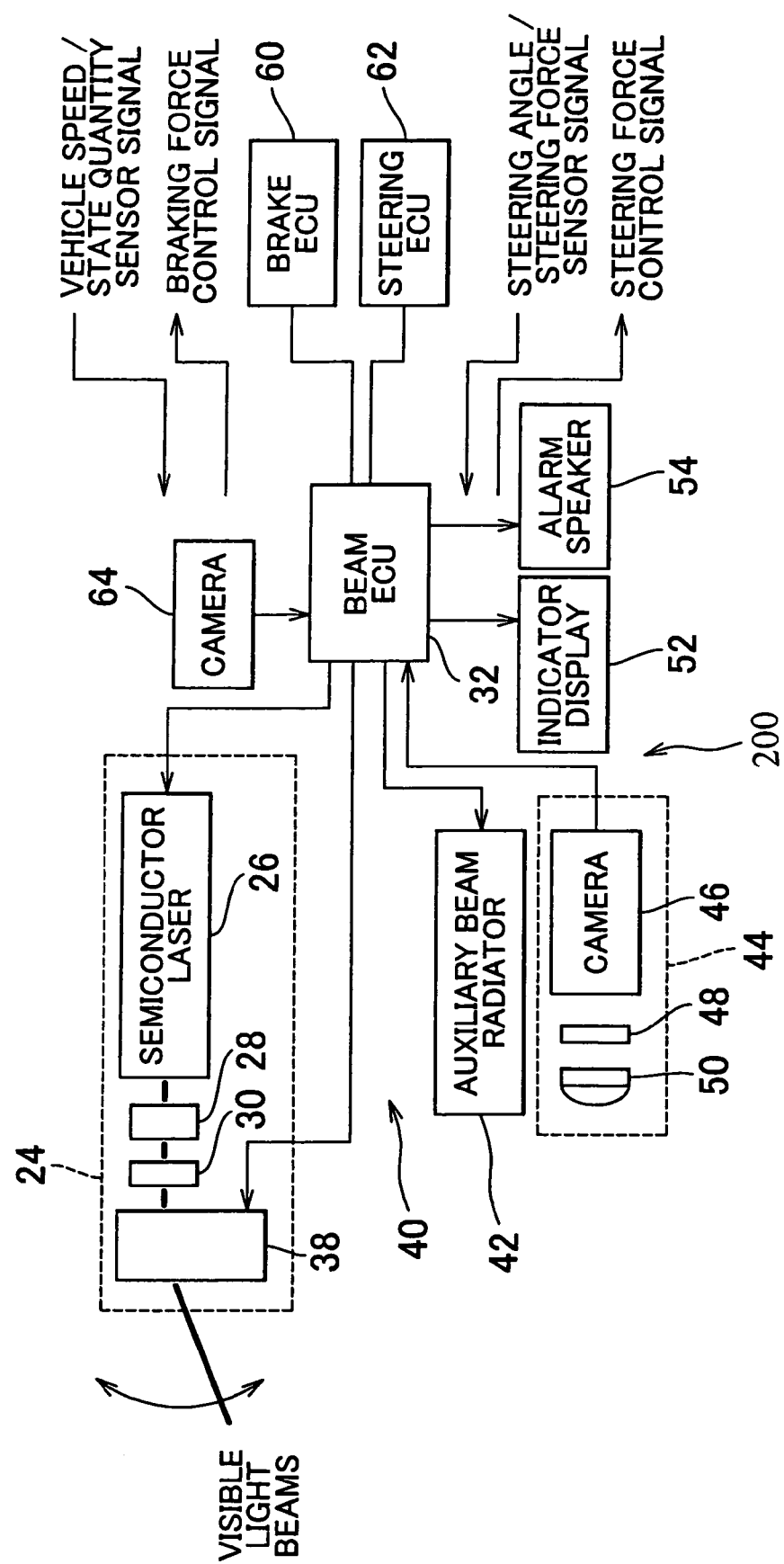
FIG. 18 is a block diagram of a vehicle operation supporting device in accordance with a fourth embodiment as another aspect of the invention.
Figure 19:
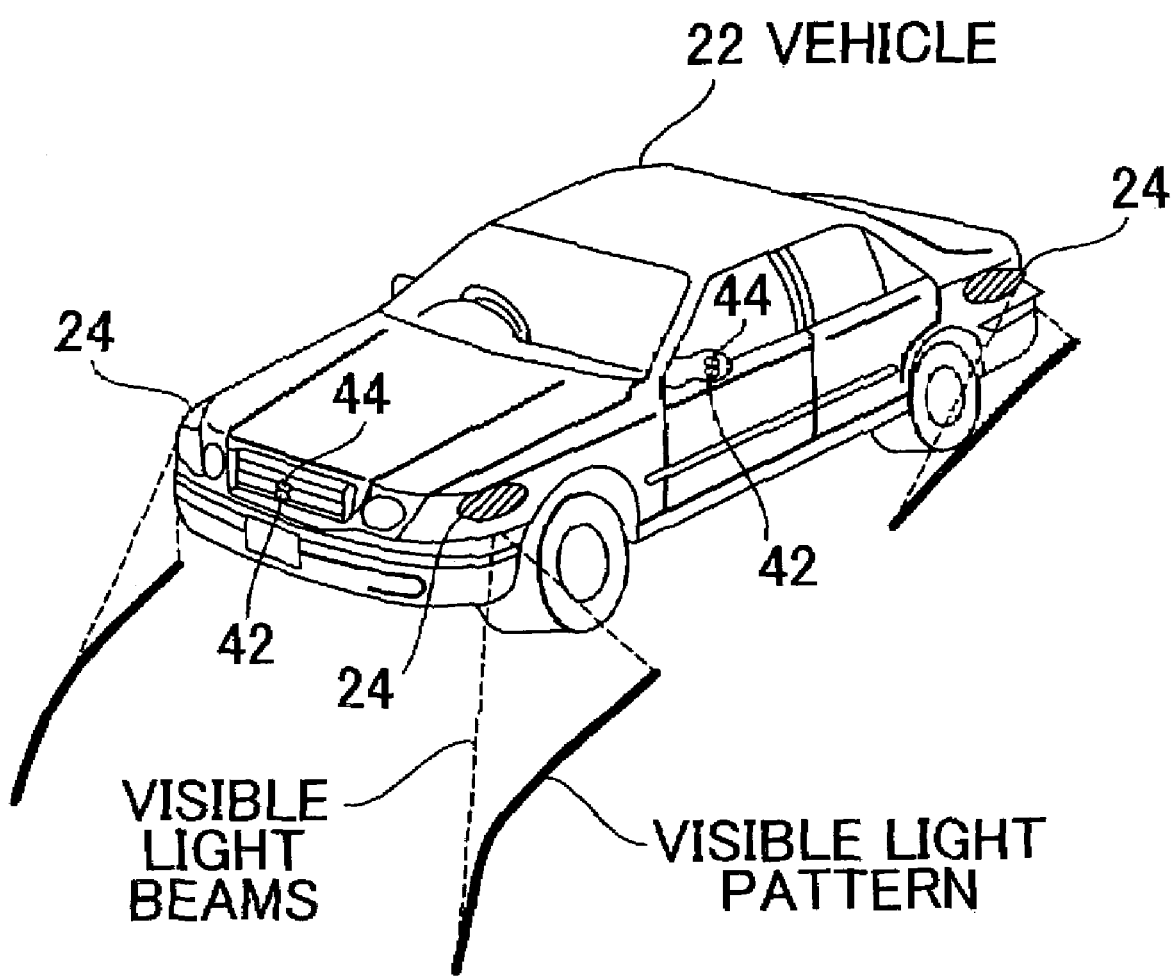
FIG. 19 is an explanatory view showing where in a vehicle components constituting the vehicle operation supporting device of the fourth embodiment are installed.

FIG. 18 is a block diagram of a vehicle operation supporting device 200 in accordance with the fourth embodiment of the invention. FIG. 19 is an explanatory view showing where in the vehicle 22 components constituting the vehicle operation supporting device of the fourth embodiment are installed. In FIGS. 18 and 19, components identical to those shown in FIGS. 1 and 2 are denoted by the same reference numerals, and description thereof will be omitted or simplified.

While the beam ECU 32 forms a pattern of an encircling shape on a road surface by means of visible light beams in the construction of the first embodiment, the beam ECU 32 forms a pattern of a linear shape in the vehicle operation supporting device 200.

The vehicle operation supporting device 200 is further provided with an attention-requiring object detecting device 40. The attention-requiring object detecting device 40 is composed of the above-mentioned four beam radiators 24, four auxiliary beam radiators 42, and four image-capturing devices 44. The auxiliary beam radiators 42 and the image-capturing devices 44 are disposed at the center of a grill in the front portion of the vehicle body, at the center of a bumper in the rear portion of the vehicle body, at a left mirror stay at the center of a lateral portion of the vehicle body, and at a right mirror stay at the center of a lateral portion of the vehicle body, respectively. The auxiliary beam radiator 42 in the front portion of the vehicle body radiates light beams onto a road surface in front of the vehicle. The auxiliary beam radiator 42 in the rear portion of the vehicle body radiates light beams onto a road surface behind the vehicle. The auxiliary beam radiator 42 in the left portion of the vehicle body radiates light beams onto a road surface to the left of the vehicle. The auxiliary beam radiator 42 in the right portion of the vehicle body radiates light beams onto a road surface to the right of the vehicle. The auxiliary beam radiators 42 radiate light beams according to a rule that will be described later in detail. The image-capturing device 44 in the front portion of the vehicle body captures an image of a road surface in front of the vehicle. The image-capturing device 44 in the rear portion of the vehicle body captures an image of a road surface behind the vehicle. The image-capturing device 44 in the left portion of the vehicle body captures an image of a road surface to the left of the vehicle. The image-capturing device 44 in the right portion of the vehicle body captures an image of a road surface to the right of the vehicle.

The attention-requiring object detecting device 40 detects obstacles such as people or objects that exist in a range including a road surface onto which visible light beams are radiated from the beam radiators 24, using the beam radiators 24, the auxiliary beam radiators 42, and the image-capturing devices 44. At the same time, the attention-requiring object detecting device 40 detects a visible or invisible light pattern that is produced by a later-described infrastructure or another vehicle entering the range.

Each of the auxiliary beam radiators 42 has a beam generator, a beam shaping lens, and a scan actuator. The beam generator is constructed of a semiconductor laser that generates light beams having a wavelength in an infrared range, for example, a wavelength of approximately 1.0 to 1.4 µm. The beam shaping lens shapes light beams generated by the beam generator. The scan actuator scans light beams output from the beam shaping lens. Hereinafter, light beams radiated from the beam radiators 42 will be referred to as invisible light beams. The above-mentioned beam ECU 32 is connected to the scan actuator of each of the auxiliary beam radiators 42. The beam ECU 32 drives the scan actuator such that a lattice pattern is formed on a road surface by invisible light beams. This scan actuator scans invisible light beams generated by the beam shaping lens in accordance with a command from the beam ECU 32. Each of the beam radiators 42 radiates invisible light beams of a lattice pattern onto a road surface that is in a predetermined divided area around the vehicle.

Each of the image-capturing devices 44 has a camera 46 that captures images of all the road surfaces in a predetermined divided range as a radiation range of a corresponding one of the auxiliary beam radiators 42, a frequency filter 48 that also allows penetration of components of a frequency band of invisible light beams radiated from a corresponding one of the auxiliary beam radiators 42, and a wide-angle lens 50 having a predetermined angle of divergence. Each of the image-capturing devices 44 captures an image of a display projected onto a road surface by visible light beams radiated from a corresponding one of the beam radiators 24. At the same time, each of the image-capturing devices 44 captures an image by converting a pattern that is formed on a road surface by invisible light beams radiated from a corresponding one of the auxiliary beam radiators 42 into a pattern having a frequency band in a visible light range.

Figure 20A:
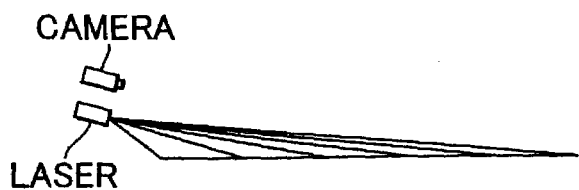
FIGS. 20A-20C are explanatory views of an image that is captured by an image-capturing device in the case where there is no pattern of visible light beams or invisible light beams projected onto a road surface by an obstacle, another vehicle, or the like in the fourth embodiment.
Figure 20B:
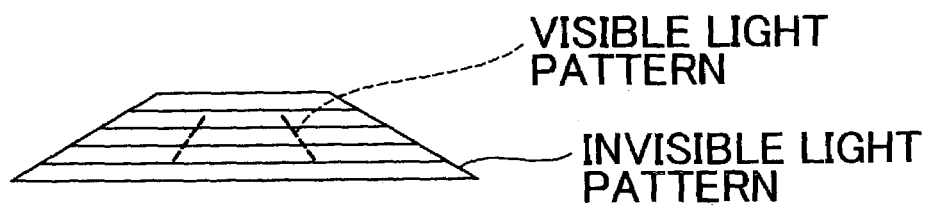
Figure 20C:
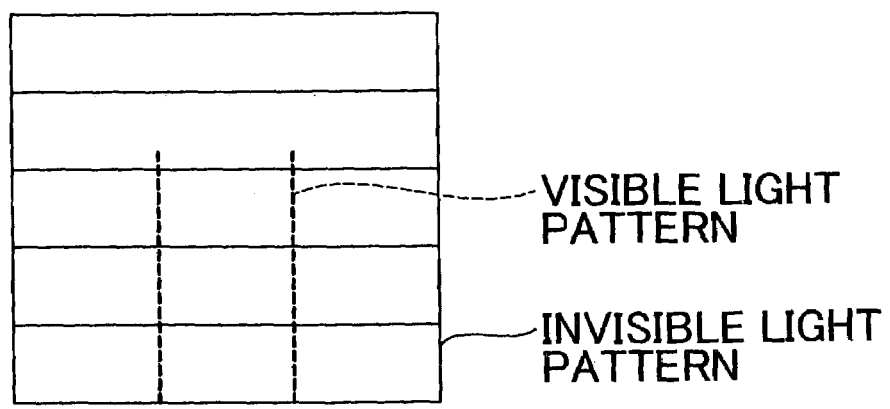

FIG. 20 is an explanatory view of an image captured by each of the image-capturing devices 44 in the case where there is no pattern of visible light beams or invisible light beams radiated from an obstacle, another vehicle, or the like on a road surface onto which visible light beams are to be radiated from a corresponding one of the beam radiators 24 or on a road surface onto which invisible light beams are to be radiated from a corresponding one of the auxiliary beam radiators 42. FIG. 20A is a side view of beams radiated from the beam radiators 24, 42 in a direction perpendicular to a propagating direction of the beams. FIG. 20B is a bird's eye view of a pattern formed on a road surface by beams radiated from the beam radiators 24, 42 when viewed from an angle of a camera of the image-capturing devices 44. FIG. 20C is a plan view of a pattern formed on a road surface by beams radiated from the beam radiators 24, 42 when viewed from above. In FIGS. 20A to 20C, the pattern resulting from visible light beams is indicated by broken lines, and the pattern resulting from invisible light beams (hereinafter referred to as an invisible light pattern) is indicated by solid lines.

In the case where there is no pattern of visible light beams or invisible light beams radiated from an obstacle, another vehicle, or the like on a road surface, patterns formed on the road surface by visible light beams and invisible light beams assume as usual a linear shape and a lattice shape respectively, as shown in FIG. 20 (especially B and C). Thus, these patterns projected in an image captured by the image-capturing devices 44 also coincide with the linear shape and the lattice shape on the road surface respectively.

On the other hand, in the case where there is an obstacle between a beam radiating position on the vehicle 22 and a road surface onto which beams are to be radiated, beams hit the obstacle. Thus, a pattern formed on the road surface by visible light beams or invisible light beams does not assume a desired shape. In this case, a pattern projected in an image captured by the image-capturing devices 44 does not coincide with a desired linear shape or a desired lattice shape on the road surface either. In the case where a pattern resulting from visible light beams or invisible light beams radiated from another vehicle or the like coexists on a road surface with a pattern of beams radiated from the vehicle 22 concerned, a pattern formed on the road surface by beams radiated from the vehicle 22 concerned coincides with a desired shape. However, patterns formed on the road surface by all the beams radiated from other vehicles and the like do not completely coincide with a desired shape in the vehicle 22 concerned. In this case, a pattern projected in an image captured by the image-capturing devices 44 does not completely coincide with a desired linear shape or a desired lattice shape in the vehicle 22 concerned on the road surface either.

As shown in FIG. 18, the beam ECU 32 is connected to each of the image-capturing devices 44. An image captured by the image-capturing devices 44 is supplied to the beam ECU 32. By processing the image supplied from the image-capturing devices 44, the beam ECU 32 extracts a pattern resulting from visible light beams and a pattern resulting from invisible light beams. It is then determined whether or not positions of the extracted patterns in the captured image substantially coincides with a position of a pattern that is realized in the case where there is no obstacle or the like on a road surface onto which visible light beams and invisible light beams are radiated.

If it is determined as a result that both the patterns do not coincide with each other, it is determined that there is an obstacle at a position corresponding to a non-coincident portion of the patterns. On the other hand, in the case where there is another pattern in the captured image although both the patterns coincide with each other in position, it is determined that the vehicle 22 concerned and another vehicle or the like are becoming close to each other. Then, that pattern in the captured image is grasped as an attention-requiring object such as another vehicle or the like. An indicator display 52 disposed at a position visually recognizable from a driver in the cabin and an alarm speaker 54 for outputting sound to the inside of the cabin are connected to the beam ECU 32.

Figure 21:
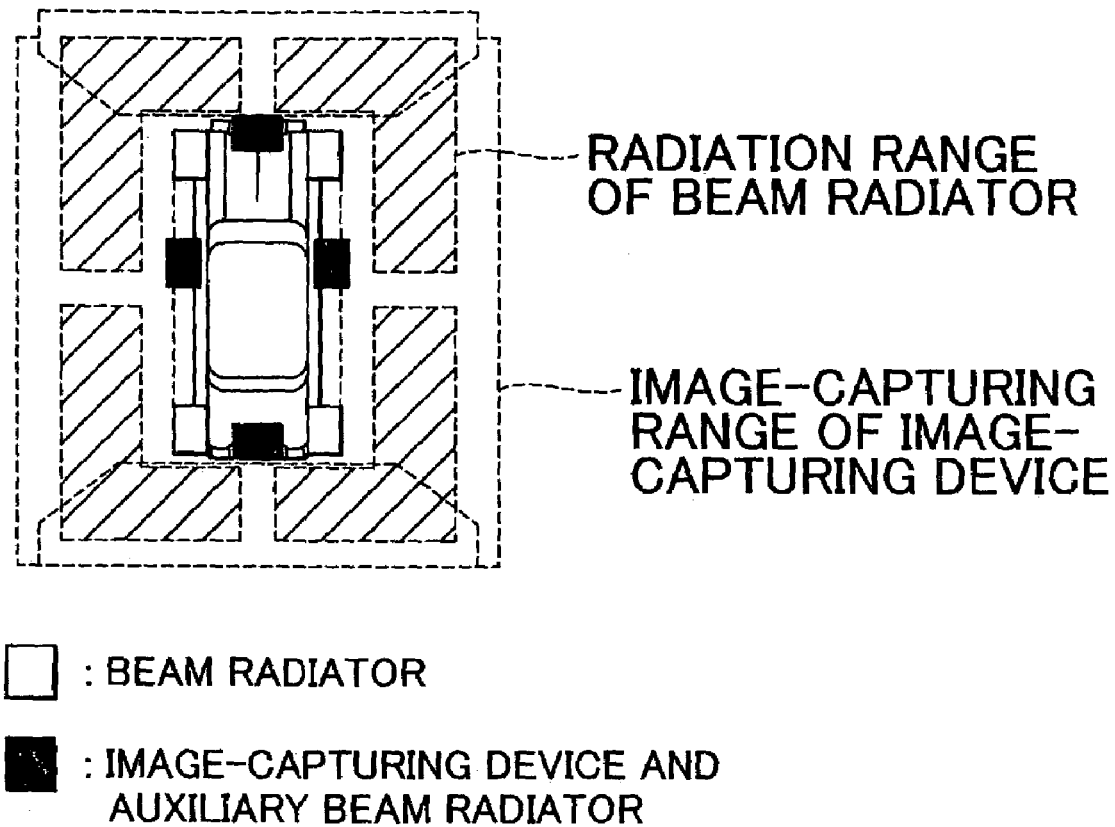
FIG. 21 shows a screen of an indicator display of the vehicle operation supporting device of the fourth embodiment.

FIG. 21 shows an exemplary screen of the indicator display 52 of the fourth embodiment. In the fourth embodiment, radiation ranges of the beam radiators 24, 42 and image-capturing ranges of the image-capturing devices 44 are schematically displayed by the indicator display 52 together with positions of installation of the auxiliary beam radiators 42, the image-capturing devices 44, and the beam radiators 24 in the case where the vehicle 22 is viewed from above. In FIG. 21, the radiation ranges of the beam radiators 24 are indicated by diagonal lines. The image-capturing range of each of the image-capturing devices 44 includes the radiation range of a corresponding one of the beam radiators 24, is encircled by dotted lines, and is slightly larger than the radiation range of a corresponding one of the auxiliary beam radiators 42.

If the above-mentioned unconformable state of patterns resulting from beams is detected on the basis of an image captured by the image-capturing devices 44, the beam ECU 32 causes the indicator display 52 to display a position of an obstacle corresponding to the unconformable position or a position of a pattern produced by another vehicle or the like. At the same time, the beam ECU 32 causes the alarm speaker 54 to output an audible message that there is an obstacle or the like in a predetermined range. In this case, the position of the obstacle or the like is schematically displayed by the indicator display 52, and audible guidance is issued from the alarm speaker 54.

The brake ECU 60 and the steering ECU 62 are connected to the beam ECU 32. The brake ECU 60 controls a braking force applied to the vehicle 22 by means of a brake actuator. The steering ECU 62 controls a steering force required in steering the vehicle 22 by means of a steering actuator. If it is determined on the basis of an image captured by the image-capturing devices 44 that positions of an actual pattern and an ideal pattern do not coincide with each other, the beam ECU 32 drives the indicator display 52 and the alarm speaker 54. At the same time, the beam ECU 32 supplies a braking force control signal to the brake ECU 60 to perform braking in such a manner as to prevent the vehicle 22 from colliding with the obstacle, or supplies a steering force control signal to the steering ECU 62 to perform steering in such a manner as to prevent the vehicle 22 from colliding with the obstacle. In this case, the brake ECU 60 and the steering ECU 62 generate a braking force and a steering force respectively so as to prevent the vehicle 22 from colliding with the obstacle, in accordance with a command from the beam ECU 32.

A camera 64 disposed in an upper portion in front of the driver seat in the cabin is further connected to the beam ECU 32. The camera 64 is oriented toward the face of the driver and captures an image thereof. The image captured by the camera 64 is supplied to the beam ECU 32. The beam ECU 32 detects a degree of concentration of the driver on driving on the basis of the image captured by the camera 64.

In the case where the driver concentrates on driving, the driver continues to drive with his or her face being directed toward an area in front of the vehicle. On the other hand, in the case where the driver does not concentrate on driving, the driver often drives with his or her face not being directed toward an area in front of the vehicle. In the case where the driver drives with his or her face being directed toward an area in front of the vehicle, the face of the driver laterally symmetrically appears in an image captured by the camera 64. On the other hand, in the case where the driver drives with his or her face not being directed toward an area in front of the vehicle, the face of the driver asymmetrically appears in an image captured by the camera 64. Accordingly, the beam ECU 32 performs an edge processing so as to detect a portion corresponding to the face of the driver as to an image captured by the camera 64. The beam ECU 32 determines on the basis of a state of distribution of the edge whether the driver looks ahead or aside, and detects a degree of concentration on driving on the basis of a duration time in which the driver looks ahead.

The vehicle operation supporting device 200 of the fourth embodiment is identical to that of the first embodiment except that detection of a degree of concentration of the driver on driving as proposed in the first embodiment is realized by the camera 64 as to a range on a road surface onto which visible light beams are to be radiated from the beam radiators 24. Therefore, detailed description of the vehicle operation supporting device 200 of the fourth embodiment will be omitted.

Invisible light beams are radiated from the auxiliary beam radiators 42 such that an invisible light pattern having a length corresponding to a degree of concentration of the driver on driving detected in the fourth embodiment in a traveling direction of the vehicle is formed on a road surface. More specifically, invisible light beams are radiated from the auxiliary beam radiators 42 according to an invisible light pattern having a short length in the case where the degree of concentration on driving is relatively high. In the case where the degree of concentration on driving is relatively low, invisible light beams are radiated from the auxiliary beam radiators 42 such that an invisible light pattern extended toward the traveling direction of the vehicle is formed on a road surface. That is, an invisible light pattern resulting from invisible light beams radiated from the auxiliary beam radiators 42 is increased or reduced in length in a traveling direction of the vehicle in accordance with a degree of concentration of the driver on driving.

Thus, in the fourth embodiment, an invisible light pattern having a length corresponding to a degree of concentration of the driver on driving in a traveling direction of the vehicle is formed on a road surface. Therefore, if the degree of concentration on driving is low, a range extending relatively far from the vehicle 22 can be set as a monitoring range where it is determined whether or not there is an attention-requiring object to which the vehicle 22 concerned must pay attention. Thus, a suitable range corresponding to a degree of concentration of the driver on driving can be applied as a road surface to which the vehicle 22 concerned must pay attention.

Furthermore, in the fourth embodiment, the auxiliary beam radiators 42 radiate invisible light beams such that an invisible light pattern having a lattice interval corresponding to a speed of the vehicle 22 is formed on a road surface. More specifically, the auxiliary beam radiators 42 radiate invisible light beams such that an invisible light pattern having a lattice interval that increases in proportion to an increase in vehicle speed and that decreases in proportion to a decrease in vehicle speed is formed on a road surface. That is, an invisible light pattern resulting from invisible light beams radiated from the auxiliary beam radiators 42 is changed in lattice interval in accordance with a vehicle speed.

Thus, in the fourth embodiment, an invisible light pattern having a lattice interval corresponding to a vehicle speed is formed on a road surface. Therefore, a range of a road surface to which the self-owned vehicle must pay attention can be monitored with high density as to whether or not there is an attention-requiring object such as an obstacle in the case of a low vehicle speed. Thus, a range of a road surface to which the self-owned vehicle must pay attention can be monitored with a density corresponding to a vehicle speed.

Next, operation of the vehicle operation supporting device 200 of the fourth embodiment will be described.

In the fourth embodiment, under a situation wherein visible light beams are radiated from the beam radiators 24 and wherein invisible light beams are radiated from the auxiliary beam radiators 42, the beam ECU 32 extracts a pattern resulting from the visible light beams and a pattern resulting from the invisible light beams by processing an image captured by the image-capturing devices 44. The beam ECU 32 then determines whether or not positions of the extracted patterns substantially coincide with desired positions respectively. If it is determined as a result that the positions of both the patterns substantially coincide with the desired positions respectively, it can be determined that there is no obstacle between a beam radiating position on the vehicle 22 and a road surface onto which beams are to be radiated. Thus, the beam ECU 32 does not issue a brake command and a steering command to the brake ECU 60 and the steering ECU 62 respectively.

On the other hand, if it is determined that the positions of both the extracted patterns do not substantially coincide with the desired positions, the beam ECU 32 can determine that there is an obstacle between a beam radiating position on the vehicle 22 and a road surface onto which beams are to be radiated. Thus, the beam ECU 32 determines that there is an obstacle on this point of discordance, drives the indicator display 52 and the alarm speaker 54, and supplies a braking force control signal and a steering force control signal to the brake ECU 60 and the steering ECU 62 respectively so as to perform braking and steering in such a manner as to prevent the vehicle 22 from colliding with the obstacle.

In this case, the indicator display 52 schematically displays a position of the obstacle, and the alarm speaker 54 issues audible guidance indicating that there is an obstacle on the point. The brake ECU 60 and the steering ECU 62 generate a braking force and a steering force in accordance with a command from the beam ECU 32. Thus, the fourth embodiment makes it possible to determine whether or not there is an obstacle to be avoided when the vehicle 22 concerned runs. Therefore, the driver can be urged to pay attention to the obstacle. At the same time, it is possible to prevent the vehicle 22 from colliding with the obstacle without requiring the driver to operate the vehicle. Thus, driving safety of the vehicle is ensured.

The beam ECU 32 also determines whether or not the positions of both the extracted patterns completely coincide with desired positions as a whole. If it is determined as a result that the positions of both the patterns substantially coincide with the desired positions but do not completely coincide with the desired positions, it is possible to determine that a pattern resulting from beams radiated from the self-owned vehicle and a pattern resulting from beams radiated from another vehicle or the like coexist on a road surface. Therefore, the beam ECU 32 determines that there is another vehicle or the like that is becoming relatively close to the vehicle 22 concerned, and drives the indicator display 52 and the alarm speaker 54.

In this case, the indicator display 52 schematically displays a pattern resulting from beams radiated from another vehicle in a visually recognizable manner, and the alarm speaker 54 issues audible guidance indicating that the pattern has been displayed by the indicator display 52. Thus, the fourth embodiment makes it possible to determine that an obstacle to which attention must be paid when the vehicle 22 concerned runs is becoming relatively close thereto. Therefore, the driver can be urged to pay attention to the obstacle. Thus, driving safety of the vehicle is ensured.

Figure 22:
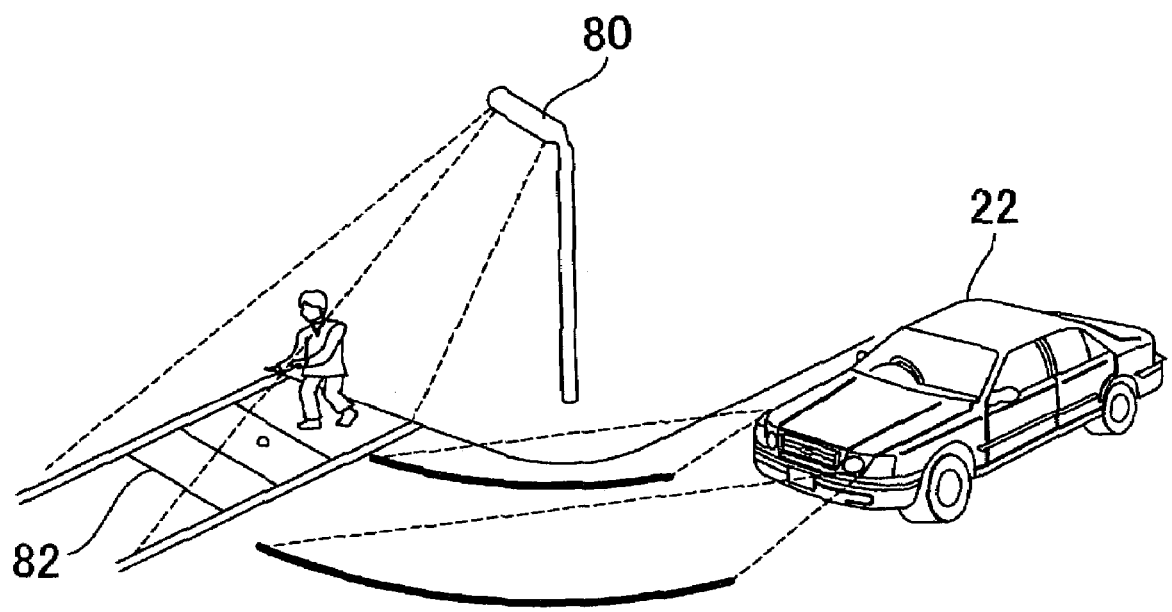
FIG. 22 is an explanatory view of an infrastructure in the fourth embodiment.
Figure 23:
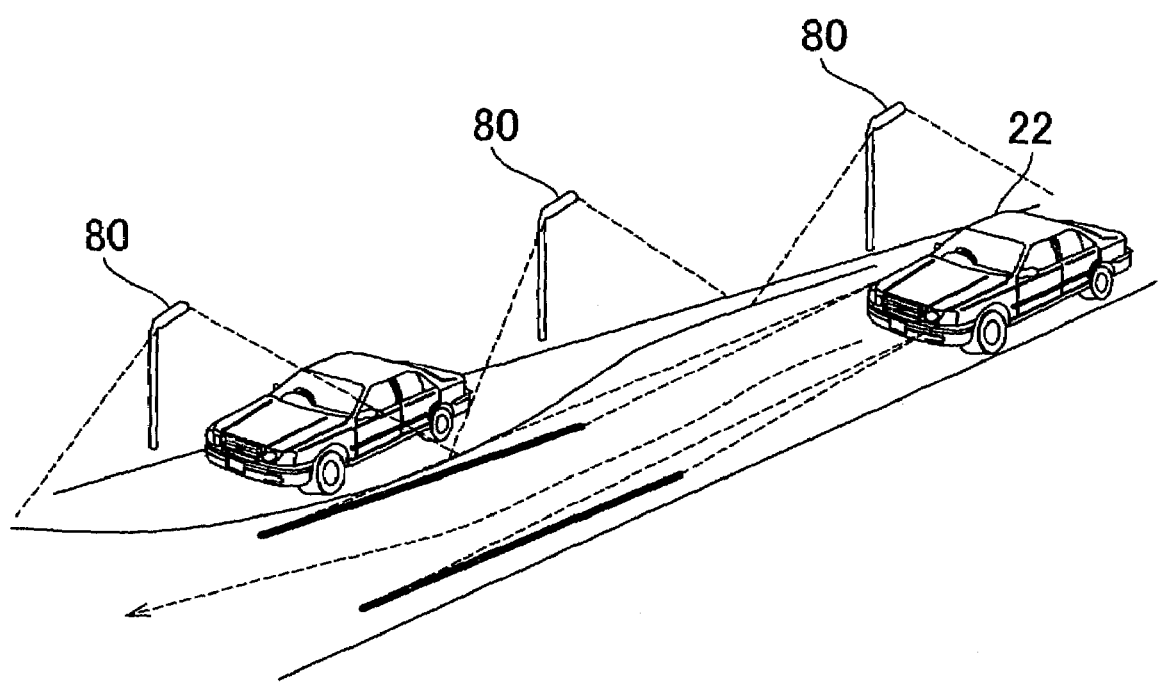
FIG. 23 is an explanatory view of an infrastructure in the fourth embodiment.

FIGS. 22 and 23 are explanatory views of an infrastructure in the fourth embodiment. In the fourth embodiment, the infrastructure has a large number of beam radiators 80 disposed along a road. As in the case of the above-mentioned auxiliary beam radiators 42, each of the beam radiators 80 has a beam generator constructed of a semiconductor laser that generates invisible light beams having a wavelength in an infrared range. The infrastructure has a traffic sign such as a zebra crossing 82 that is painted in white on a road surface for pedestrians crossing an intersection. As shown in FIG. 22, the beam radiator 80 provided at the intersection radiates invisible light beams onto the road surface according to such a pattern as to encircle an outer edge of the zebra crossing 82.

The beam radiators 80 provided along the road usually radiate invisible light beams such that a line is formed according to a pattern extending along a shoulder of the road. The infrastructure has obstacle detecting sensors (not shown) that are disposed beside the road at intervals of a certain distance. These obstacle detecting sensors are designed to detect an obstacle such as a vehicle parked on the road. If the infrastructure detects by means of the obstacle detecting sensors that there is an obstacle such as a vehicle parked on the road, the beam radiators 80 disposed along the road radiate invisible light beams such that a line is formed according to a pattern avoiding the obstacle, as shown in FIG. 23.

In the case where a pattern is thus formed on a road surface by the infrastructure as in the case of the vehicle, if the image-capturing devices 44 of the vehicle 22 are sensitive to a frequency band range of invisible light beams radiated from the side of the infrastructure, it is possible to determine on the basis of an image captured by the image-capturing devices 44 in the vehicle 22 that the vehicle 22 concerned is approaching the zebra crossing 82, a shoulder, or the like. In this case, it is possible to urge the driver to pay attention correspondingly by means of the indicator display 42 or the alarm lamp 54 on the basis of a state of approach of the vehicle 22 to the infrastructure without requiring the driver to perform any operation. It is also possible to perform vehicle running control based on brake or steering.

Thus, the vehicle operation supporting device 200 of the fourth embodiment makes it possible to determine by means of the attention-requiring object detecting devices 40 that there is an object to which attention must be paid when the vehicle 22 concerned runs, for example, an infrastructure such as a zebra crossing, a pedestrian, or an obstacle such as another vehicle, and to perform running control of the vehicle 22 or urge the driver to pay attention by using a result of the determination. Hence, the vehicle operation supporting device 200 of the fourth embodiment makes it possible to enhance safety in driving the vehicle 22.

A frequency band of invisible light beams radiated from the side of the infrastructure may be different from a frequency band of invisible light beams radiated from the vehicle. According to this construction, in the case where a pattern produced by the self-owned vehicle coexists with another pattern in a captured image, it can be determined whether this pattern results from the side of the infrastructure or from another vehicle. Therefore, vehicle control can be finely performed. A frequency band of invisible light beams radiated from the side of the infrastructure may differ depending on a degree of danger in driving the vehicle. In this case, a traffic sign such as a zebra crossing that is usually passed by the vehicle and a shoulder where the vehicle is not allowed to enter can be distinguished from each other. Thus, vehicle control can be finely controlled.

In the fourth embodiment, visible light beams having a wavelength of 0.55 μm are radiated from the beam radiators 24 onto a road surface. If visible light beams having this wavelength stream into the eyes of someone, this person is dazzled. As a result, it becomes difficult to suitably let others recognize the existence of the vehicle 22 concerned. At the same time, if visible light beams having this wavelength stream into the eyes of someone, this person is damaged. Thus, it is necessary to prevent visible light beams radiated from the beam radiators 24 from streaming into human eyes.

Figure 24A:
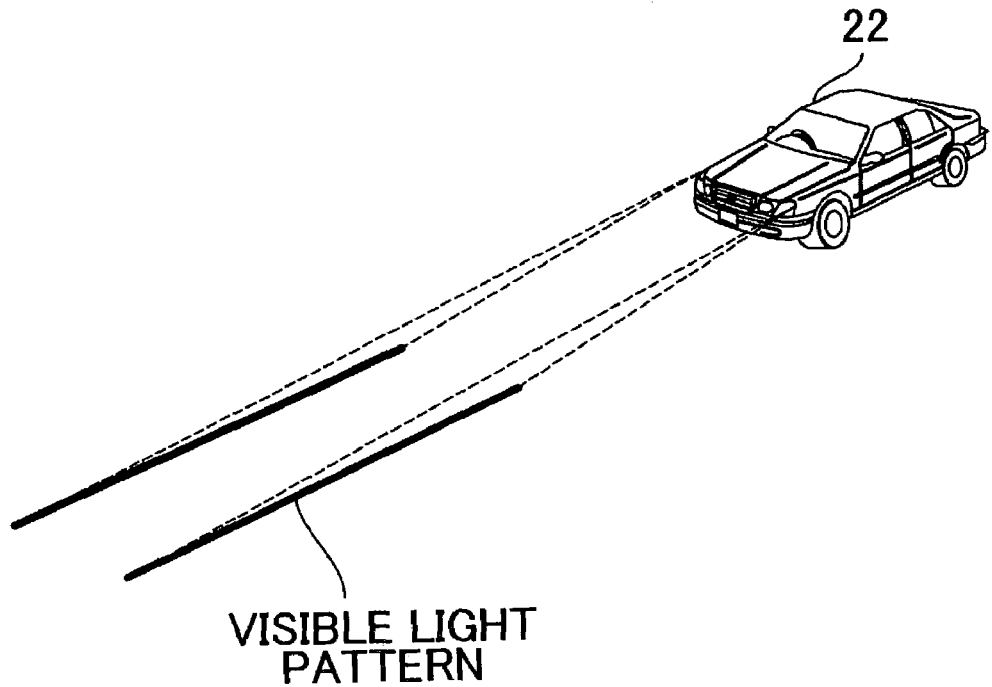
FIGS. 24A-24B are comparison views in which a radiation area on a road surface irradiated with visible light beams in the case where there is somebody between a beam radiating position of the vehicle and a position on the road surface to be irradiated with visible light beams and a radiation area on the road surface irradiated with visible light beams in the case where there is nobody between the beam radiating position of the vehicle and the position on the road surface to be irradiated with visible light beams are compared with each other in the fourth embodiment.
Figure 24B:
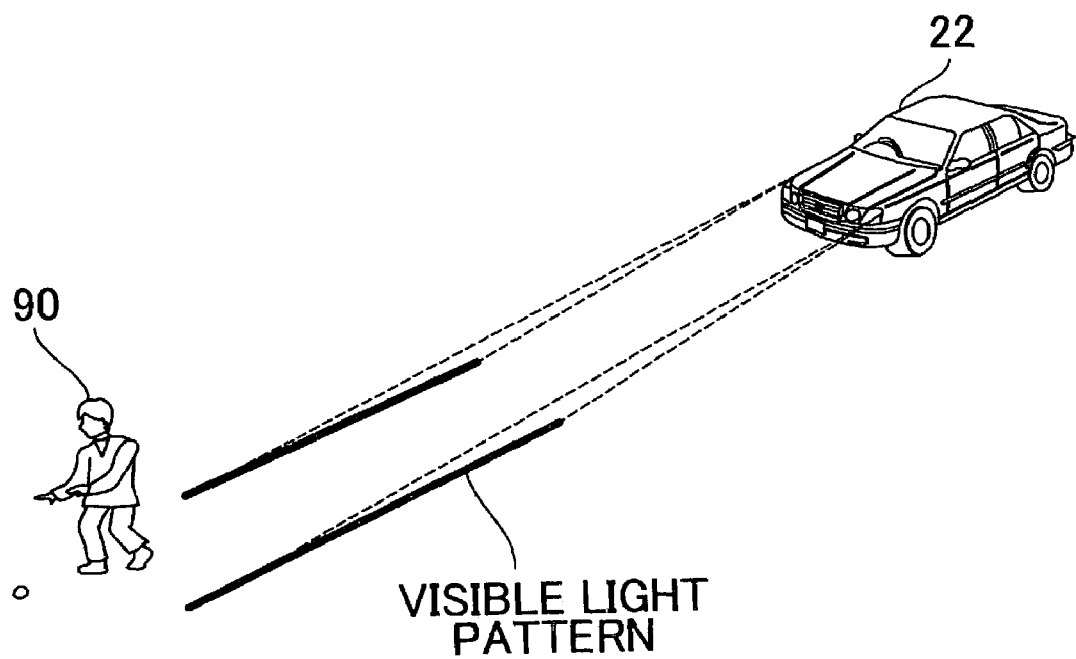

FIG. 24 is a comparison view in which a radiation area on a road surface irradiated with visible light beams in the case where there is a person 90 between a beam radiating position on the vehicle 22 and a position on the road surface to be irradiated with visible light beams and a radiation area on the road surface irradiated with visible light beams in the case where there is nobody between the beam radiating position of the vehicle 22 and the position on the road surface to be irradiated with visible light beams are compared with each other in the fourth embodiment. In the case shown in FIG. 24A, there is nobody between the positions. In the case shown in FIG. 24B, the person 90 stands between the positions. FIG. 25 is an explanatory view showing how to set a radiation area on the road surface to be irradiated with visible light beams in the case where the person 90 stands between the beam radiating position of the vehicle 22 and the position of the road surface to be irradiated with visible light beams in the fourth embodiment.

Figure 25A:
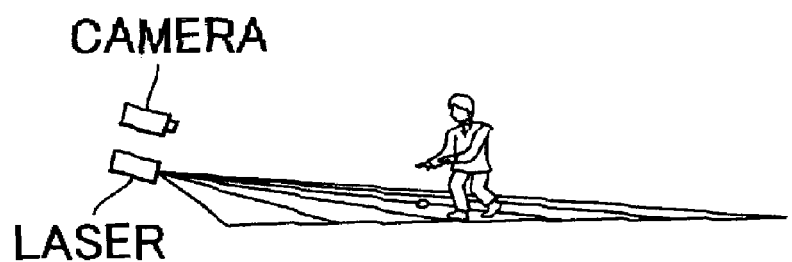
FIGS. 25A-25D are explanatory views showing how to set a radiation area on the road surface to be irradiated with visible light beams in the case where somebody stands between the beam radiating position of the vehicle and the position of the road surface to be irradiated with visible light beams in the fourth embodiment.
Figure 25B:
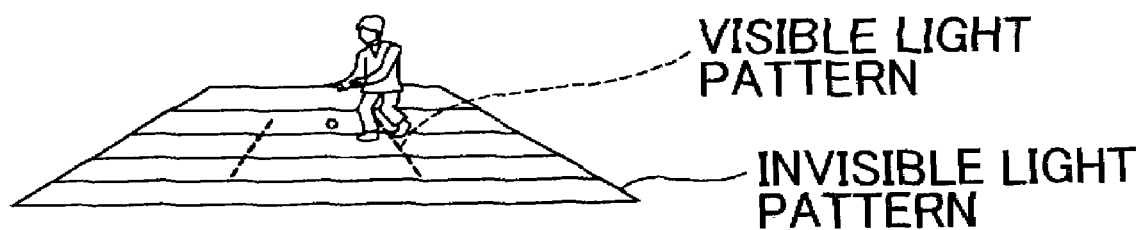
Figure 25C:
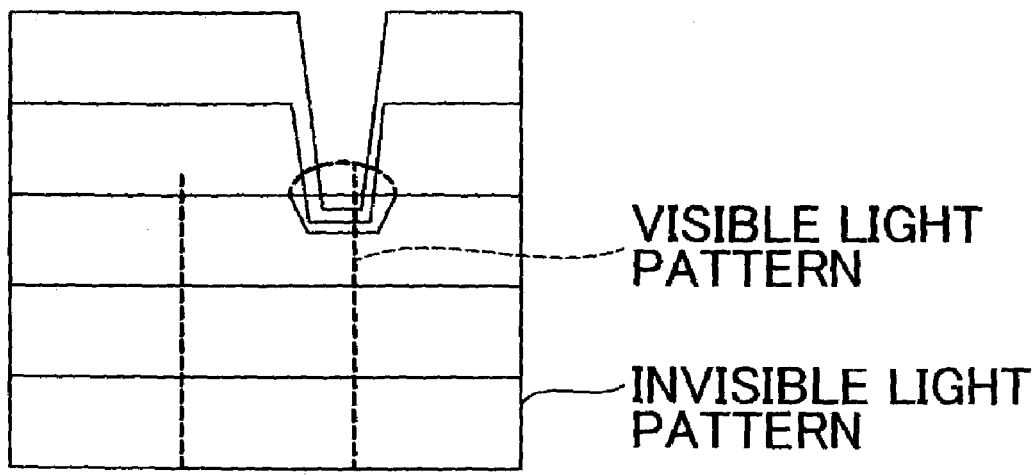
Figure 25D:
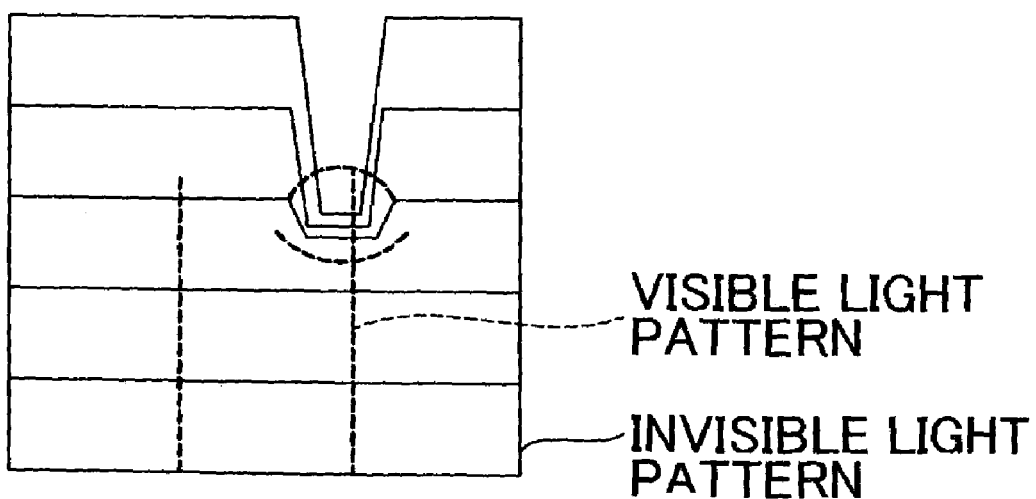

FIG. 25A is a side view of beams radiated from the beam radiators 24, 42 in a direction perpendicular to a propagating direction of the beams. FIG. 25B is a bird's eye view of a pattern formed on a road surface by beams radiated from the beam radiators 24, 42 when viewed from an angle of a camera of the image-capturing devices 44. FIG. 25C is a plan view of a pattern formed on a road surface by beams radiated from the beam radiators 24, 42 when viewed from above. FIG. 25D is a plan view of a situation in which a visible light pattern formed on a road surface by visible light beams in the fourth embodiment has been changed, when viewed from above. In FIGS. 25A to 25D, the visible light pattern resulting from visible light beams is indicated by broken lines, and the invisible light pattern resulting from invisible light beams is indicated by solid lines.

As shown in FIG. 24A, in the case where the person 90 does not stand between the beam radiating position of the vehicle 22 and the road surface onto which visible light beams are to be radiated according to a desired pattern, a pattern projected onto the road surface by visible light beams radiated from the beam radiators 24 of the vehicle 22 and a pattern formed on the road surface by invisible light beams radiated from the auxiliary beam radiators 42 are desired patterns as usual. On the other hand, if the person 90 stands between the beam radiating position of the vehicle 22 and the position on the road surface onto which visible light beams are to be radiated according to a predetermined pattern, the visible light beams and the invisible light beams hit the person 90 as shown in FIG. 25B and do not propagate any further. This leads to a circumstance in which the pattern formed on the road surface does not coincide with the desired pattern as shown in FIG. 25C.

In the fourth embodiment, the beam ECU 32 suitably specifies a position on a road surface to be irradiated with visible light beams (i.e., a position of a visible light pattern) and then drives the scan actuators 38. Thus, the beam ECU 32 suitably grasps a positional relationship between a visible light pattern resulting from visible light beams and an invisible light pattern resulting from invisible light beams. Thus, in the fourth embodiment, under a situation in which an invisible light pattern resulting from invisible light beams obtained as a result of the processing of an image captured by the image-capturing devices 44 does not coincide with a desired pattern, it is determined whether or not the position of the visible light pattern where visible light beams are to be radiated is included in a portion of discordance. If it is determined that the position of the visible light pattern to be radiated is included in that portion, a visible light pattern extending to that position is set by avoiding that position as shown in FIGS. 24B and 25D. Visible light beams are then radiated such that the visible light pattern is projected onto the road surface.

In this construction, in the case where a person stands between the beam radiating position on the vehicle 22 and a position on a road surface onto which visible light beams are to be radiated according to a desired pattern, the visible light beams do not hit the person, and a visible light pattern resulting from the visible light beams is projected onto the road surface. Accordingly, visible light beams are prevented from streaming into the eyes of a person who stands between the beam radiating position on the vehicle 22 and a position on a road surface onto which visible light beams are to be radiated according to a desired pattern. Thus, the person is protected from being dazzled by visible light beams.

In the case where visible light beams hit a person who stands between the beam radiating position on the vehicle 22 and a position on a road surface onto which visible light beams are to be radiated according to a desired pattern, the pattern of the visible light beams themselves does not coincide with a desired pattern. Thus, in the fourth embodiment, in addition to the above-mentioned processing of an invisible light pattern resulting from invisible light beams, the following processings are performed in the case where a visible light pattern resulting from visible light beams does not coincide with a desired pattern as a result of the processing of an image captured by the image-capturing devices 44. That is, a visible light pattern avoiding a portion of discordance is set, and visible light beams are radiated such that the visible light pattern is projected onto a road surface. In this construction, the pattern is changed in such a manner as to prevent visible light beams from hitting a person who stands between the beam radiating position on the vehicle 22 and a position on a road surface onto which visible light beams are to be radiated according to a desired pattern. Thus, visible light beams are prevented from streaming into the eyes of the person. Thus, in this method as well, it is possible to achieve an effect that is substantially the same as in the above-mentioned case of invisible light beams.

Figure 26:
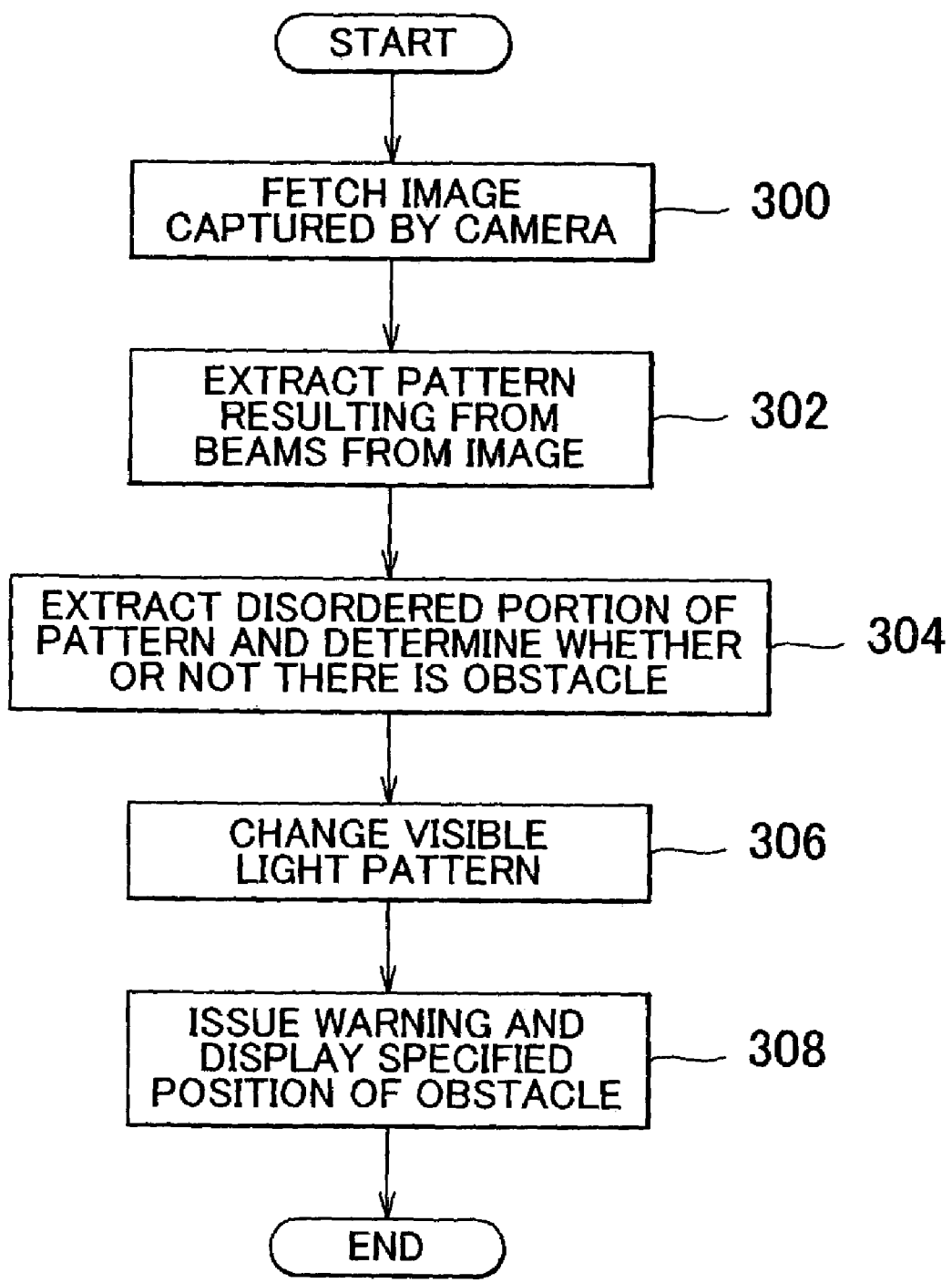
FIG. 26 is a flowchart of a control routine that is executed to change a pattern resulting from visible light beams in the fourth embodiment.

FIG. 26 is a flowchart of an exemplary control routine that is executed by the beam ECU 32 in the fourth embodiment so as to perform the above-mentioned function. The routine shown in FIG. 26 is repeatedly activated at intervals of a predetermined period. If the routine shown in FIG. 26 is activated, a processing in step 300 is first of all performed.

In step 300, a processing of fetching an image captured by the image-capturing devices 44 is performed. In step 302, the image fetched in the above-mentioned step 300 is processed, whereby a processing of extracting a visible light pattern resulting from visible light beams and an invisible light pattern resulting from invisible light beams respectively is performed.

In step 304, it is determined whether or not a position of the pattern extracted in the above-mentioned step 302 substantially coincides with a desired position, whereby a processing of extracting a disordered portion of the pattern (=a portion of discordance of the pattern) is performed. A processing of determining whether or not there is an obstacle such as a person between the beam radiating position on the vehicle 22 and a position on a road surface onto which beams are to be radiated according to a desired pattern is then performed.

In step 306, in the case where the disordered portion of the pattern has been extracted in the above-mentioned step 304 and where the portion is a position of a desired visible light pattern where visible light beams are to be radiated, a processing of changing the visible light pattern resulting from the visible light beams into a pattern avoiding that position is performed. If the processing in step 306 is performed, a scanning range of the scan actuators 38 is thereafter changed, whereby the beam radiators 24 radiate visible light beams according to a pattern avoiding an obstacle. As a result, the pattern avoiding the obstacle is projected onto the road surface.

In step 308, the alarm speaker 54 issues audible guidance indicating that the obstacle exists within a predetermined range from the vehicle 20. A processing of causing the indicator display 52 to display the position of the obstacle is then performed. If the processing in step 308 is terminated, the present routine is terminated.

According to the above-mentioned routine shown in FIG. 26, under a situation in which one of an invisible light pattern resulting from invisible light beams and a visible light pattern resulting from visible light beams as a result of the processing of an image captured by the image-capturing devices 44 does not coincide with a desired pattern, if a disordered portion of the pattern is a position of a desired visible light pattern where visible light beams are to be radiated, the visible light pattern resulting from the visible light beams can be changed into a pattern avoiding that position.

According to this construction, even if the disorder in the pattern results from the existence of a person, that is, even if there is a person in a radiation range of visible light beams, a visible light pattern resulting from visible light beams can be projected onto a road surface within such an extent that visible light beams do not hit the person. In this case, visible light beams are prevented from streaming into the eyes of the person. At the same time, pedestrians and the like can recognize the existence of the self-owned vehicle, and the driver of the self-owned vehicle can grasp a traveling path thereof. Thus, even if the obstacle that exists in a radiation range of visible light beams is a person, the vehicle operation supporting device 200 of the fourth embodiment makes it possible to suitably let others recognize the existence of the self-owned vehicle without dazzling the person, and to let the driver of the self-owned vehicle grasp a traveling path thereof.

Even in the case where there is nobody in the radiation range of visible light beams, if visible light beams are radiated onto a road surface that is wet with rain or the like, incident light thereof is likely to be reflected. Thus, there is an apprehension that high-level reflective waves will stream into the eyes of pedestrians, drivers of other vehicles, and the like who are on a plane of incidence. Thus, in this case as well, it is necessary to prevent high-level reflective waves of visible light beams from streaming into human eyes. It is to be noted herein that reflected light of visible light beams contains a large number of laterally polarized components that are perpendicular to a plane of incidence (i.e., parallel to a road surface) and has an optical characteristic in which the laterally polarized components are likely to be reflected.

Figure 27A:
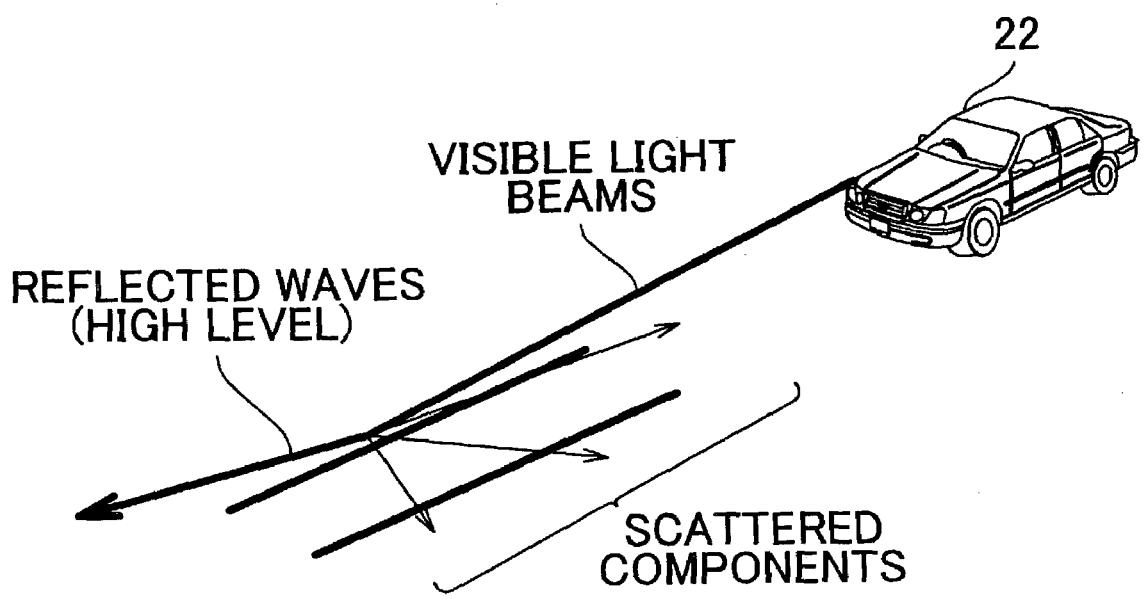
FIGS. 27A-27B are explanatory views of a state of visible light beams that are radiated in the fourth embodiment.
Figure 27B:
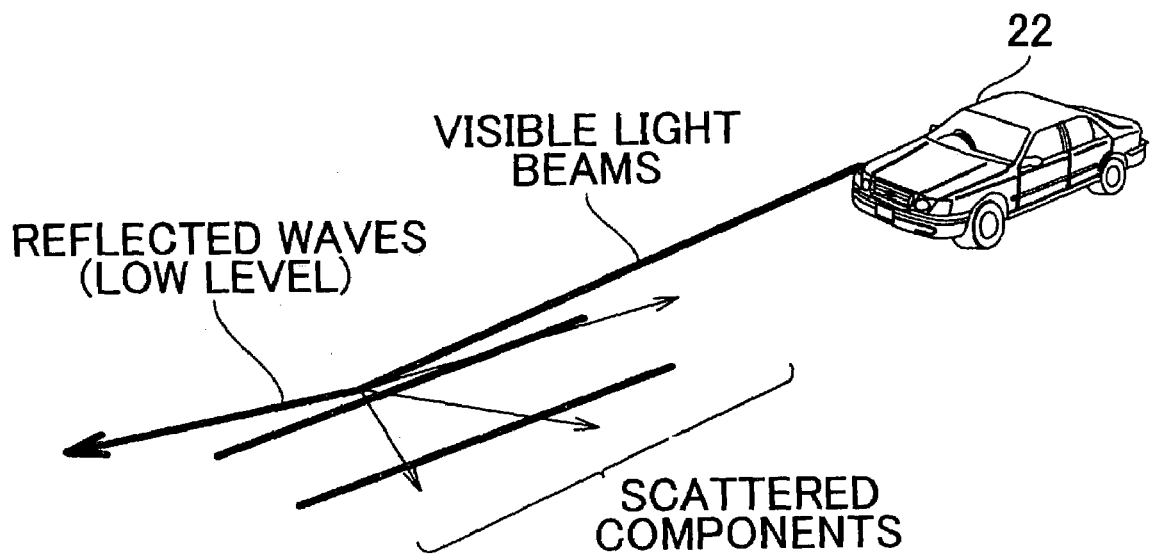

FIG. 27 is an explanatory view of a state of visible light beams radiated from the beam radiators 24 in the fourth embodiment. FIG. 27A shows a state of reflected waves of visible light beams in the case of a confronting device that does not have the polarizing shaper 30. FIG. 27B shows a state of reflected waves of visible light beams in the case of the fourth embodiment.

In the fourth embodiment, as described above, each of the beam radiators 24 has the polarizing shaper 30 for polarizing visible light beams output from the beam shaping lens 28. The polarizing shaper 30 is constructed of a glass plate 34.

The glass plate 34 is disposed such that a normal of a glass surface thereof and an optical axis form a Brewster angle. In this construction, some of laterally polarized components of visible light beams that are parallel to a road surface are reflected by the glass plate 34. Thus, as shown in FIG. 27, laterally polarized components propagating in a traveling direction of visible light beams are damped.

As described above, reflected light of visible light beams contains a large number of laterally polarized components that are parallel to the road surface. Hence, even if visible light beams whose laterally polarized components have been damped are reflected by the road surface, the intensity of reflected waves thereof is reduced to a low level. Hence, the reflected waves do not reach a high level, and an event in which a person is dazzled by high-level reflected waves streaming into his or her eyes is inhibited from occurring. Thus, in the fourth embodiment, even in the case where there is a person in a traveling direction of visible light beams, it is possible to suitably inform others of the existence of the vehicle 22 concerned without dazzling the person.

Furthermore, even if visible light beams are radiated onto a road surface, representation of a visible light pattern projected onto the road surface may become difficult to visually recognize due to a chromatic relationship with the road surface. If this state is produced, pedestrians and the like have difficulty in visually recognizing representation of the visible light beams on the road surface, and it is difficult for others to suitably recognize the existence of the vehicle. Accordingly, in this case, it is necessary to make representation of the pattern easy to visually recognize.

Figure 28:
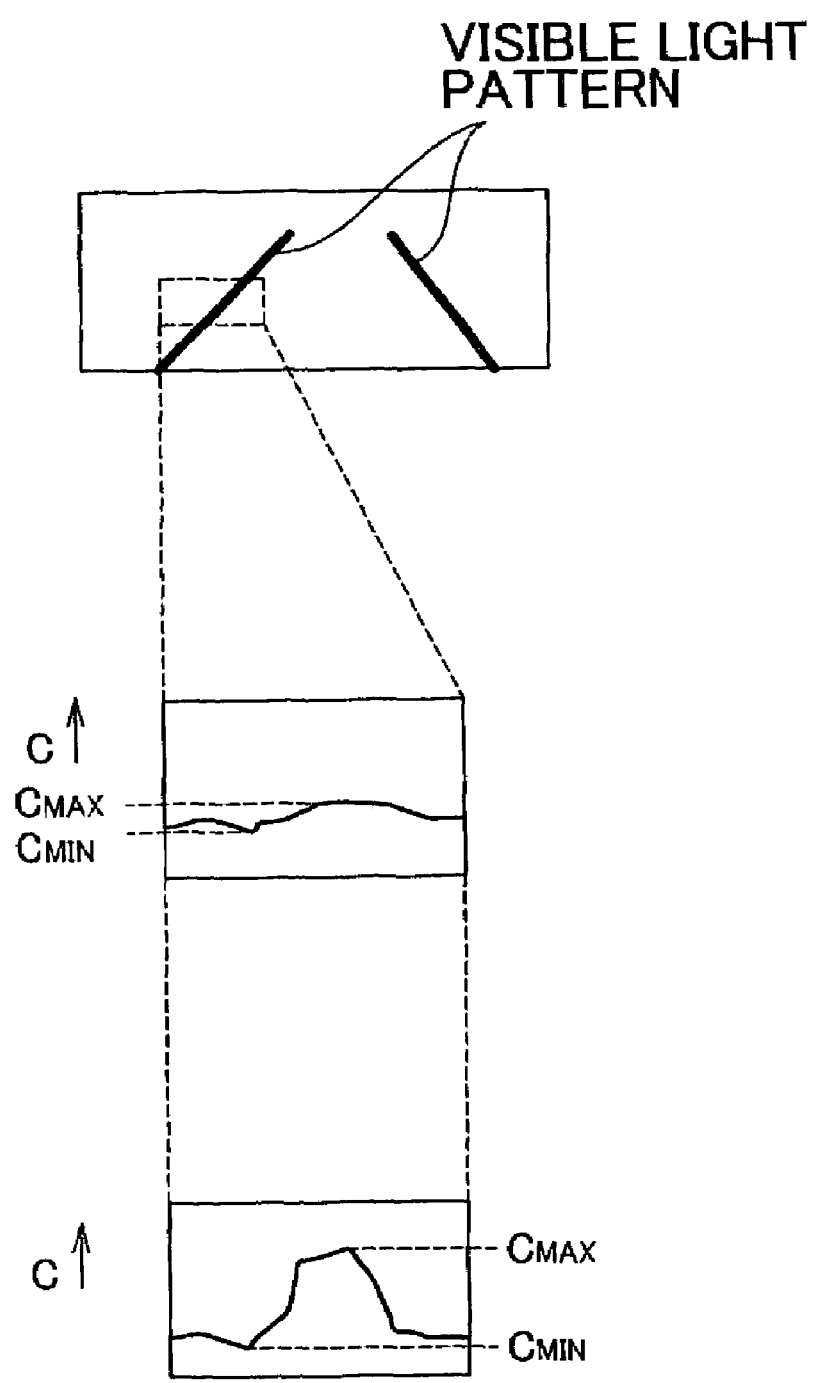
FIG. 28 is an explanatory view showing how to convert a visible light pattern that is projected onto a road surface and that is difficult to visually recognize into a visible light pattern that is easy to visually recognize.

FIG. 28 is an explanatory view showing how to make a visible light pattern that is projected onto a road surface and that is difficult to visually recognize easy to visually recognize in the fourth embodiment. An upper chart in FIG. 28 shows an image that is captured by the image-capturing devices 44 and that represents a road surface on which a visible light pattern is projected. A middle chart in FIG. 28 shows a graph of an area encircled by dotted lines in the captured image shown in the upper chart in FIG. 28, with the axis of abscissa and the axis of ordinate representing position and contrast C respectively. A lower chart in FIG. 28 shows a graph obtained by making a correction of contrast in the fourth embodiment as to the area encircled by the dotted lines in the captured image shown in the upper chart in FIG. 28.

In the fourth embodiment, the beam ECU 32 specifies a position on a road surface onto which visible light beams are to be radiated, and drives the scan actuators 38. Thus, the beam ECU 32 can grasp a position of a visible light pattern in an image captured by the image-capturing devices 44. Thus, on the basis of the image captured by the image-capturing devices 44, the beam ECU 32 detects a contrast around the position of the visible light pattern in the image, more specifically, a contrast in the image between a portion where the visible light pattern is displayed and a portion where the visible light pattern is not displayed. It is to be noted in the fourth embodiment that the contrast is an indicator that indicates discriminability in the image and that is calculated from a characteristic of the image-capturing devices 44.

If a contrast around a visible light pattern is conspicuous as to an image captured by the image-capturing devices 44, the beam ECU 32 maintains an illuminance and a hue of visible light beams generated by the beam generator 26. On the other hand, if there is almost no contrast as shown in the middle chart in FIG. 28, the beam ECU 32 changes an illuminance and a hue of visible light beams generated by the beam generator 26 in such a manner as to make a contrast on a road surface conspicuous (see the lower chart in FIG. 28). More specifically, if the road surface is light, the beam ECU 32 adjusts an output such that visible light beams of higher intensity are radiated in comparison with a case where the road surface is dark, or changes a frequency of visible light beams to be generated in such a manner as to make a contrast conspicuous.

According to this construction, as for a road surface onto which visible light beams are radiated, if a portion where a visible light pattern is displayed and the other portion are difficult to visually recognize due to a chromatic relationship, an optical characteristic is changed in such a manner as to make a contrast between the portions conspicuous. Therefore, pedestrians and the like can easily recognize representation of the visible light pattern resulting from the visible light beams radiated from the vehicle 22 onto the road surface.

Figure 29:
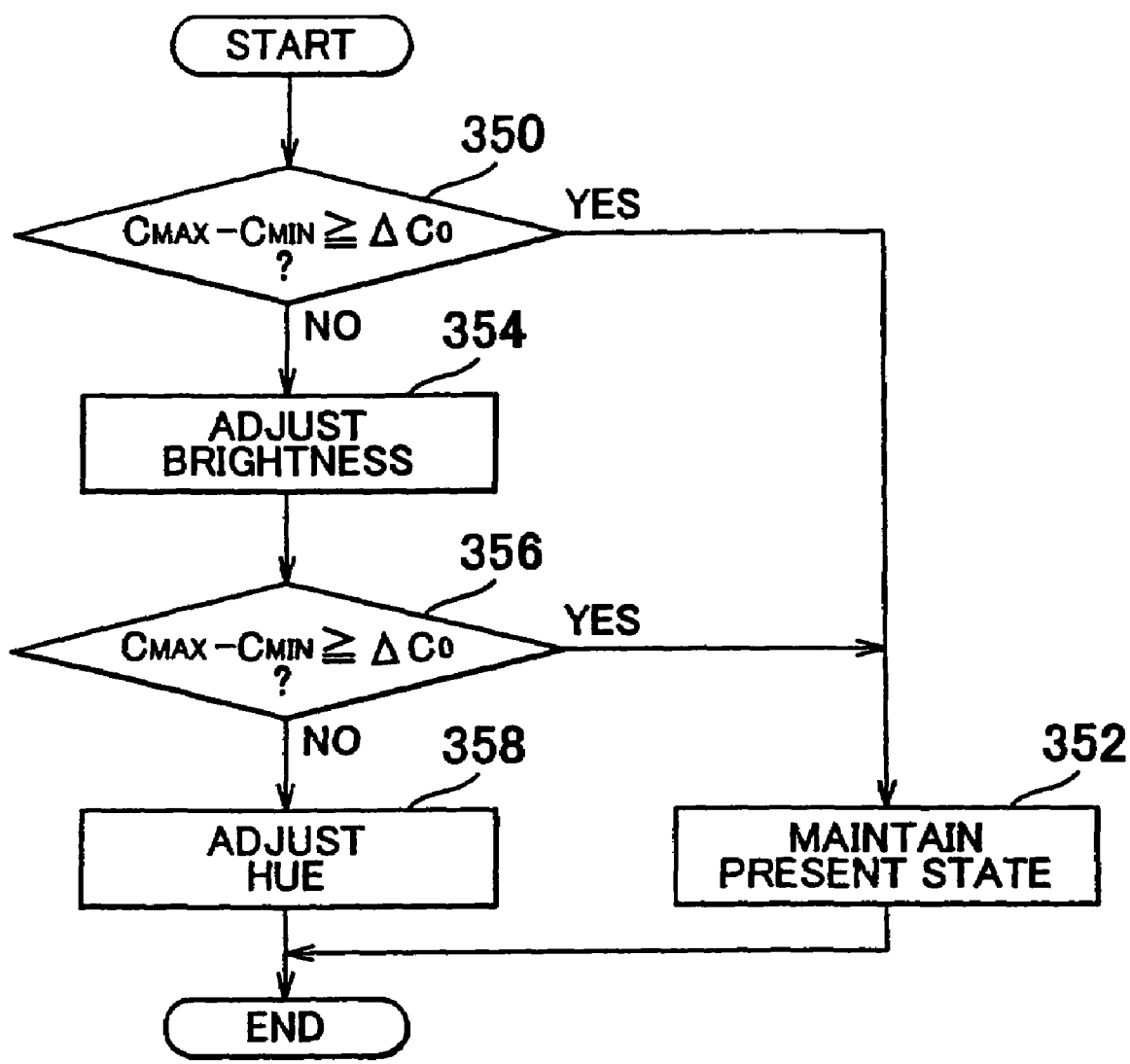
FIG. 29 is a flowchart of a control routine that is executed to adjust contrast of a captured image in the fourth embodiment.

FIG. 29 is a flowchart of an exemplary control routine that is executed by the beam ECU 32 in the fourth embodiment to perform the above-mentioned function. The routine shown in FIG. 29 is repeatedly activated at intervals of a predetermined period. If the routine shown in FIG. 29 is activated, a processing in step 350 is first of all performed.

In step 350, it is determined whether or not a contrast ($=C_{MAX}-C_{MIN}$) around a position of a visible light pattern in an image captured by the image-capturing devices 44 is conspicuous to the extent of exceeding a predetermined criterion ($=\Delta Co$). If it is determined as a result that a relationship: $C_{MAX}-C_{MIN} \geq \Delta Co$ is established, namely, that the contrast is conspicuous, a processing in step 352 is then performed. That is, a processing of maintaining an optical characteristic of visible light beams to be generated by the beam generator 26 is performed. On the other hand, if it is determined that the relationship: $C_{MAX}-C_{MIN} \geq \Delta Co$ is not established, namely, that there is almost no contrast, a processing in step 354 is then performed.

In step 354, a processing of issuing a command to the beam generator 26 to adjust an illuminance of visible light beams in such a manner as to make the contrast on the road surface conspicuous is performed. If the processing in step 354 is performed, the beam generator 26 adjusts an output of visible light beams to be generated and thereby adjusts an illuminance thereof. As a result, the illuminance of visible light beams radiated onto the road surface is changed, and the contrast on the road surface becomes conspicuous.

In step 356, it is determined whether or not a contrast around the position of the visible light pattern in the image captured by the image-capturing devices 44 has become conspicuous to the extent of exceeding the predetermined criterion after the illuminance of the visible light beams has been adjusted in the above-mentioned step 354. If it is determined as a result that the contrast has become conspicuous, a processing of maintaining an optical characteristic of visible light beams to be generated in the above-mentioned step 352 is then performed. On the other hand, if it is determined that the contrast has not become conspicuous, a processing in step 358 is then performed.

In step 358, a processing of issuing a command to the beam generator 26 to adjust a hue of visible light beams in such a manner as to make the contrast on the road surface conspicuous is performed. If the processing in step 358 is performed, the beam generator 26 adjusts a frequency of visible light beams to be generated and thereby adjusts a hue thereof. Therefore, the hue of visible light beams radiated onto the road surface is changed, and the contrast on the road surface becomes conspicuous. If the processing in step 358 is performed, the present routine is terminated.

According to the above-mentioned routine shown in FIG. 29, it is possible to change an illuminance and a hue of visible light beams to be generated in accordance with a contrast that has been detected on the basis of an image captured by the image-capturing devices 44 and that appears on a road surface irradiated with visible light beams. More specifically, if there is almost no contrast on the road surface, it is possible to change an illuminance and a hue of visible light beams to be generated in such a manner as to make a contrast conspicuous.

If the illuminance and the hue of the visible light beams are thus changed, it becomes easy for people to visually recognize a visible light pattern that results from the visible light beams and that is projected onto the road surface. Thus, according to the fourth embodiment, even if people have difficulty in visually recognizing representation of a visible light pattern on a road surface onto which visible light beams are radiated, an optical characteristic of visible light beams to be radiated is changed. Therefore, it is possible to suitably and reliably let others recognize the existence of the vehicle 22 concerned without dazzling anybody.

It is to be noted in the above-mentioned fourth embodiment that the beam radiators 24 correspond to "a beam radiating portion" in the claims as beam radiating means, that the image-capturing devices 44 correspond to "the image-capturing portion" in the claims as image-capturing means, that the auxiliary beam radiators 42 correspond to "an auxiliary beam radiating portion" in the claims as auxiliary beam radiating means, that the desired visible light pattern corresponds to "the predetermined pattern" in the claims, that the desired invisible light pattern corresponds to "a predetermined auxiliary pattern" in the claims, and that the invisible light beams radiated from the auxiliary beam radiators 42 correspond to "auxiliary light beams" in the claims.

In the above-mentioned fourth embodiment, the beam ECU 32 detects an obstacle that exists within a predetermined range from the vehicle 22 on the basis of an image captured by the image-capturing devices 44, whereby "an obstacle detecting portion" in the claims as obstacle detecting means is realized.

Furthermore, the beam ECU 32 detects a contrast of an image that is captured by the image-capturing devices 44 and that represents a road surface onto which visible light beams are radiated, whereby "an environmental state detecting portion" in the claims as environmental state detecting means is realized. The processings in step 354 and step 358 in the above-mentioned routine shown in FIG. 29 are performed, whereby "a beam characteristic correcting portion" in the claims as beam characteristic correcting means is realized. An object to which attention must be paid in driving the vehicle 22 is detected on the basis of an image captured by the image-capturing devices 44, whereby "an attention-requiring object determining portion" and "an attention-requiring traffic sign determining portion" in the claims as attention-requiring object determining means and attention-requiring traffic sign determining means are realized.

In addition, the beam ECU 32 supplies a braking force control signal and a steering force control signal to the brake ECU 60 and the steering ECU 62 respectively, whereby "an operation auxiliary control portion" in the claims as driving auxiliary control means is realized. A degree of concentration of the driver on driving is detected on the basis of an image captured by the camera 64, whereby "a degree-of-concentration detecting portion" in the claims as degree-of-concentration detecting means is realized. A length of a visible light pattern in a traveling direction of the vehicle is changed in accordance with a degree of concentration on driving, whereby "a pattern changing portion" in the claims as pattern changing means is realized. A length of an invisible light pattern in a traveling direction of the vehicle is changed in accordance with a degree of concentration on driving, whereby "an auxiliary pattern changing portion" in the claims as auxiliary pattern changing means is realized. A vehicle speed signal supplied from the brake ECU 60 is detected, whereby "a vehicle speed detecting portion" in the claims as vehicle speed detecting means is realized. A lattice interval of an invisible light pattern is changed in accordance with a vehicle speed, whereby "an auxiliary lattice interval changing portion" in the claims as auxiliary lattice interval changing means is realized.

In the above-mentioned fourth embodiment, a pattern that is projected onto a road surface by visible light beams radiated from the beam radiators 24 is formed in a linear shape. However, the invention is not limited to this construction. That is, it is also appropriate that the pattern be formed in a lattice shape, an encircling shape, or the like. If the pattern produced by the beam radiators 24 assumes a lattice shape, a lattice interval thereof may be changed in accordance with a vehicle speed. In this construction, the beam radiators 24 project a visible light pattern having a lattice interval corresponding to a vehicle speed onto a road surface. Thus, it is possible to inform others of the existence of the self-owned vehicle and the speed thereof. As a result, safety in driving the vehicle is enhanced. In this case, the beam ECU 32 changes a lattice interval of a visible light pattern in accordance with a vehicle speed, whereby "the lattice interval changing portion" in the claims as the lattice interval changing means is realized.

In the above-mentioned fourth embodiment, a pattern projected onto a road surface by visible light beams radiated from the beam radiators 24 is a vehicle-body circumscribed line of a traveling locus along which the vehicle 22 is estimated to run on the basis of a kinetic state of the vehicle 22. However, the invention is not limited to this construction. When the pattern is projected, it may be a margin line of an area where the vehicle 22 can suitably make a left or right turn. In this construction, since visible light beams are displayed on a road surface according to a pattern corresponding to the margin line of the turn, it is possible to inform others of the existence of the vehicle 22 concerned, and to inform the driver of the vehicle 22 concerned of an area where the vehicle 22 can stably make a turn. As a result, security in driving the vehicle is improved.

In the above-mentioned fourth embodiment, a visible light pattern projected onto a road surface by visible light beams radiated from the beam radiators 24 is changed in position in accordance with a kinetic state of the vehicle. However, it is also appropriate that the visible light pattern be changed in position in conformity with a turn signal switch operated by the driver when making a left or right turn or the like or be changed in position in accordance with a route determined in advance on the basis of route information obtained from a navigation device.

In the above-mentioned fourth embodiment, a visible light pattern is changed in the case where an invisible light pattern is in a state of discordance or in the case where the visible light pattern is in a state of discordance. However, it is also appropriate that a visible light pattern be changed only in the case where both an invisible light pattern and the visible light pattern are in a state of discordance. It is also appropriate that a visible light pattern be changed only in the case where the visible light pattern is in a state of discordance. Alternatively, it is also appropriate that a visible light pattern be changed only in the case where an invisible light pattern is in a state of discordance.

In the above-mentioned fourth embodiment, a length of a visible light pattern produced by the beam radiators 24 in a traveling direction of the vehicle and a length of an invisible light pattern produced by the auxiliary beam radiators 42 in a traveling direction of the vehicle are increased or reduced in accordance with a degree of concentration of the driver on driving. However, the invention is not limited to this construction. It is also appropriate that lengths of those patterns in a width direction of the vehicle be increased or reduced in accordance with a degree of concentration of the driver on driving. Alternatively, it is also appropriate that both a length in a traveling direction of the vehicle and a length in the width direction of the vehicle be increased or reduced. In this case, a pattern formed on a road surface has a relatively short length in the width direction of the vehicle if the degree of concentration on driving is relatively high, and has a relatively long length if the degree of concentration on driving is relatively low.

Next, the fifth embodiment of the invention will be described with reference to FIG. 30 as well as FIG. 18.

In the above-mentioned fourth embodiment, light beams that are radiated onto a road surface to inform others of the existence of the self-owned vehicle and to let the driver of the self-owned vehicle grasp a traveling path thereof have a wavelength in a visible light range. On the other hand, in the fifth embodiment, light beams radiated onto a road surface have a wavelength in an infrared range. That is, in the fifth embodiment, a vehicle operation supporting device 400 is realized by replacing the beam radiators 24 with beam radiators 202 in the above-mentioned construction shown in FIG. 18.

Figure 30:
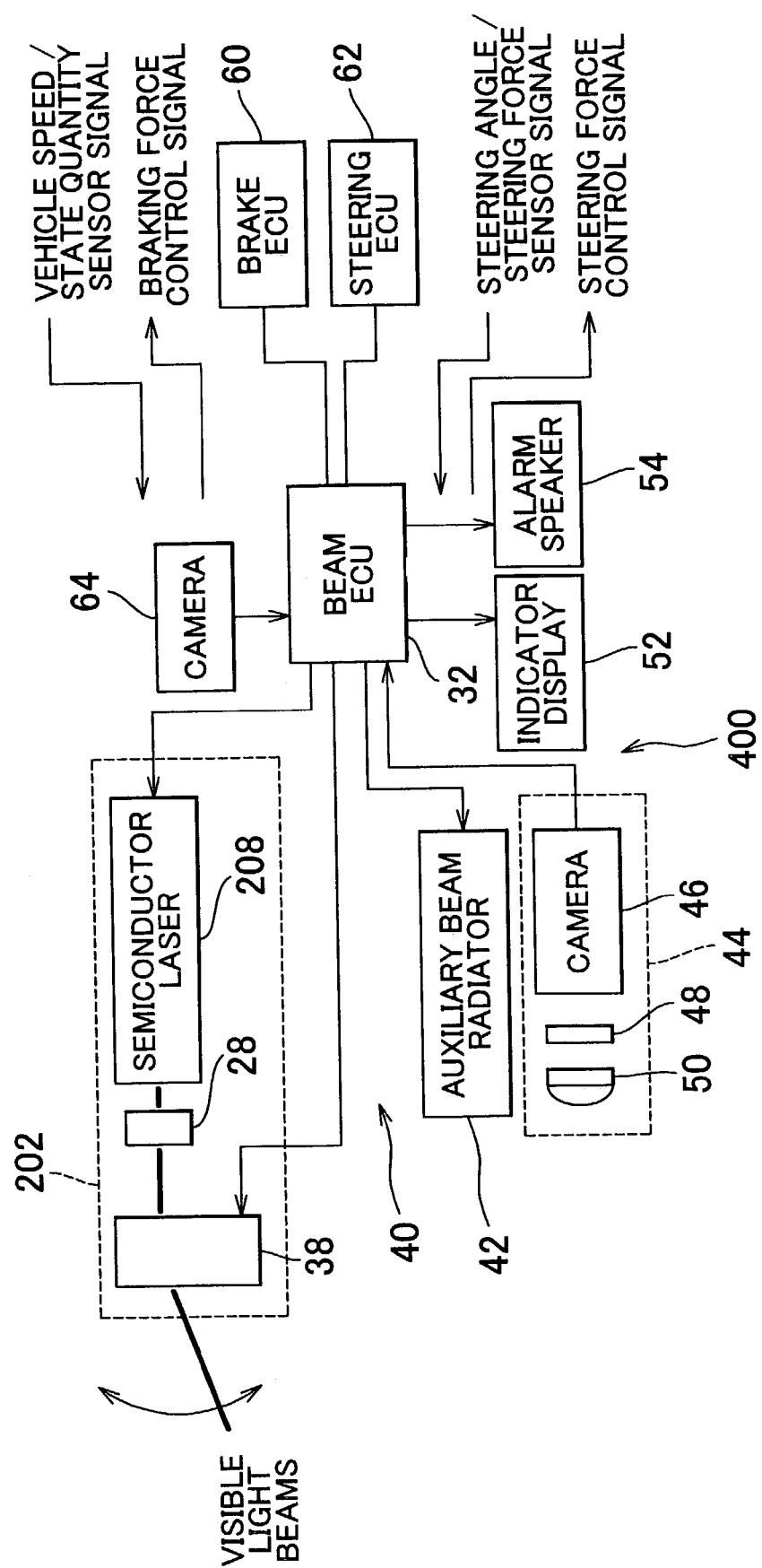
FIG. 30 is a block diagram of a vehicle operation supporting device in accordance with a fifth embodiment as another aspect of the invention.

FIG. 30 is a block diagram of the vehicle operation supporting device 400 of the fifth embodiment. In FIG. 30, components identical to those shown in FIG. 18 are denoted by the same reference numerals, and description thereof will be omitted or simplified. As shown in FIG. 30, the vehicle operation supporting device 400 has the four beam radiators 202 that are installed in respective portions of the vehicle body. Each of the beam radiators 202 has a beam generator 208, the beam shaping lens 28, and the scan actuator 38. The beam generator 208 is constructed of a semiconductor laser that generates light beams having a wavelength in an infrared range, for example, a wavelength of 1.0 to 1.4 μm. The beam shaping lens 28 shapes light beams generated by the beam generator. The scan actuator 38 scans light beams output from the beam shaping lens.

The scan actuator 38 scans invisible light beams generated by the beam shaping lens in accordance with a command from the beam ECU 32. As in the case of the beam radiators 24 mentioned above, each of the beam radiators 202 radiates invisible light beams onto a road surface according to a linear pattern. If invisible light beams are radiated from the beam radiators 202 onto a road surface around the vehicle, a pattern resulting from the invisible light beams is formed on the road surface.

The vehicle operation supporting device 400 of the fifth embodiment has the image-capturing devices 44 each of which has the frequency filter 48 that also allows penetration of components in a frequency band of invisible light beams radiated from the beam radiators 202. Each of the image-capturing devices 44 captures an image by converting a pattern formed on a road surface by invisible light beams radiated from a corresponding one of the beam radiators 202 into a pattern having a frequency band in a visible light range. If there is an invisible light pattern that results not from the self-owned vehicle but from another vehicle in the image captured by the image-capturing devices 44, the beam ECU 32 determines that another vehicle or the like is becoming relatively close to the vehicle 22 concerned, and grasps the invisible light pattern as an attention-requiring object such as another vehicle or the like.

Thus, according to the system of the fifth embodiment, in the case where there are a plurality of vehicles 22 equipped with the vehicle operation supporting device 400, even if people cannot directly recognize patterns resulting from invisible light beams radiated from the vehicles 22 on a road surface, the vehicle operation supporting device 400 of each of the vehicles 22 can recognize patterns resulting from invisible light beams radiated from the other vehicles 22.

After having grasped an invisible light pattern that exists in an image captured by the image-capturing devices 44 and that does not result from the self-owned vehicle as an attention-requiring object such as another vehicle or the like, the beam ECU 32 causes the indicator display 52 to display a position of the invisible light pattern. Hence, in the system of the fifth embodiment, even in the case where a passenger in the vehicle 22 concerned cannot see the other vehicles 22 or patterns resulting from beams radiated therefrom with his or her own eyes, the passenger can be informed of the existence of the other vehicles 22 if the vehicle operation supporting device 400 recognizes patterns resulting from invisible light beams radiated from the other vehicles 22 and if the passenger looks at the indicator display 52 indicating those patterns.

In this construction, the vehicle 22 concerned is not required to radiate light beams in a visible light range so as to inform others (passengers of the other vehicles 22) of the existence of the vehicle 22 concerned. It is sufficient that the vehicle 22 concerned radiate light beams in an infrared range. Light beams in an infrared range are relatively safe for human eyes. Thus, according to the system of the fifth embodiment, even in the case where invisible light beams radiated from the vehicle 22 stream into the eyes of a person, it is possible to suitably let other passengers recognize the existence of the vehicle 22 through the indicator display 52 without dazzling the person.

It is to be noted in the above-mentioned fifth embodiment that invisible light beams radiated from the vehicle 22 correspond to "visually less recognizable beams" in the claims, and that the vehicle operation supporting device 400 installed in the vehicle 22 corresponds to "a converter" in the claims.

In the above-mentioned fifth embodiment, the vehicle operation supporting device 400 installed in the vehicle is used as a converter that is sensitive to a frequency band of invisible light beams radiated from the vehicle 22, that converts a pattern resulting from the invisible light beams into a pattern having a frequency band in a visible light range, and that displays the converted pattern. However, the invention is not limited to this construction. It is also appropriate that an apparatus performing such a function, for example, a pair of glasses for infrared rays or a camera equipped with an indicator display be simply employed as the converter.

Next, the sixth embodiment of the invention will be described with reference to FIG. 31 as well as FIG. 30.

In the above-mentioned fifth embodiment, the vehicle operation supporting device 400 equipped with the image-capturing devices 44 and the indicator display 52 are used to convert a pattern resulting from invisible light beams that are radiated from another vehicle to inform others of the existence thereof into a pattern having a frequency band in a visible light range and to cause the indicator display 52 to display the pattern, whereby a passenger is allowed to recognize the existence of that vehicle. On the other hand, in the sixth embodiment, people are allowed to directly recognize the existence of the vehicle 22 without using a display medium such as the indicator display 52 and without being dazzled.

FIG. 31 is an explanatory view of a vehicle operation supporting system of the sixth embodiment. As shown in FIG. 31, the system of the sixth embodiment has the vehicle 22 equipped with the vehicle operation supporting device 400 and a road 300 on which the vehicle 22 runs. Light-emitting elements 302 are disposed all over a surface of the road 300. More specifically, the light-emitting elements 302 are mixed into an asphalt material as a road-paving material or are compressed and held after having been scattered onto the surface of the road 300 during paving thereof, and thereby are disposed all over the surface of the road 300. Given that invisible light beams that are in an infrared range and that are radiated from the vehicle 22 are incident light beams, the light-emitting elements 302 are made, for example, from a nonlinear optical material that generates optical harmonics (visible light) whose frequency is twice as much as a frequency of the incident light beams (i.e., whose wavelength is half as much as a wavelength of the incident light beams).

In this construction, if the vehicle operation supporting device 400 is used to radiate invisible light beams in an infrared range onto a road surface when the vehicle 22 runs, the light-emitting elements 302 disposed in the road 300 subject the invisible light beams as incident light beams to frequency (wavelength) conversion and generate visible light beams. In this case, while pedestrians and drivers of other vehicles cannot see the invisible light beams radiated from the vehicle 22, they can see the visible light beams emitted from the road 300. Thus, even if they cannot actually see the vehicle 22 radiating the invisible light beams with their own eyes, they can be informed that the vehicle 22 exists. That is, according to the system of the sixth embodiment, invisible light beams radiated from the vehicle 22 are converted into visually recognizable light beams on the side of the road 300, whereby it becomes possible to let others recognize the existence of the vehicle 22.

In this construction, the vehicle 22 is not required to radiate light beams in a visible light range so as to inform others that the vehicle 22 exists. The vehicle 22 is required only to radiate light beams in an infrared range. Because visible light beams emitted from the road 300 propagate all over, they have low luminous intensity and are safe for human eyes. Thus, the system of the sixth embodiment makes it possible to suitably let others recognize the existence of the vehicle without using a display medium and without dazzling anybody.

It is to be noted in the above-mentioned sixth embodiment that invisible light beams radiated from the vehicle 22 correspond to "the visually less recognizable beams" in the claims, and that the light-emitting elements 302 correspond to "a material" in the claims.

As described hitherto, in the invention, if light beams having a predetermined optical characteristic are radiated onto a road surface around a vehicle, a pattern resulting from the light beams is formed on the road surface. In this case, this pattern has the same optical characteristic as the light beams. In the invention, the dimming portion is more permeable to light having the same optical characteristic as the light beams than to light having other optical characteristics. Hence, the intervention of the dimming portion makes it easy for people to visually recognize representation of the pattern formed on the road surface by the light beams.

In the invention, light beams having a predetermined optical characteristic are intermittently radiated onto a road surface around a vehicle. If optical beams are radiated onto the road surface, a pattern resulting from the light beams is formed on the road surface. In this case, this pattern has the same optical characteristic as the light beams. In the invention, in synchronization with radiation of light beams from the self-owned vehicle, the dimming portion intermittently becomes less permeable to light having the same optical characteristic as the light beams than to light having other optical characteristics. Hence, while the intervention of the dimming portion makes it difficult to visually recognize representation of the pattern formed on the road surface by the light beams radiated from the self-owned vehicle, the intervention of the dimming portion does not make it difficult to visually recognize a pattern that is formed on the road surface by light beams radiated from another vehicle at a timing when light beams are not radiated from the self-owned vehicle. Accordingly, the invention makes it easier to visually recognize representation of a pattern resulting from light beams radiated from another vehicle than representation of a pattern resulting from light beams radiated from the self-owned vehicle.

In the invention, the adverb "intermittently" indicates that light beams are not always radiated but are radiated, for example, on a regular basis or only in the case where the vehicle assumes a predetermined state such as a high-speed running state.

In the invention, if light beams having a predetermined optical characteristic are radiated onto a road surface around the vehicle, a pattern resulting from the light beams is formed on the road surface. In this case, this pattern has the same optical characteristic as the light beams. In the invention, only in a range corresponding to a pattern resulting from light beams radiated from the self-owned vehicle, the dimming portion is less permeable to light having the same optical characteristic as the light beams than to light having other optical characteristics. Hence, while the intervention of the dimming portion makes it difficult to visually recognize representation of a pattern formed on a road surface by light beams radiated from the self-owned vehicle, the intervention of the dimming portion does not make it difficult to visually recognize representation of a pattern formed on a road surface by light beams radiated from another vehicle in a range that is not irradiated with the light beams radiated from the self-owned vehicle. Thus, the invention can make it easier to visually recognize representation of a pattern resulting from light beams radiated from another vehicle than representation of a pattern resulting from light beams radiated from the self-owned vehicle.

If representation of a pattern resulting from light beams radiated from the self-owned vehicle is utilized in the self-owned vehicle, for example, by informing a driver of the self-owned vehicle of a traveling path thereof, it is not appropriate that representation of the pattern be made difficult to visually recognize.

The operation supporting system has a penetration control portion that stops the dimming portion from becoming less permeable to light having a predetermined optical characteristic upon fulfillment of a predetermined condition. Thus, when the predetermined condition is fulfilled, representation of a pattern resulting from light beams radiated from the self-owned vehicle can be prevented from becoming difficult to visually recognize.

In the invention, in the case where an obstacle that exists between the vehicle and a road surface onto which visible light beams are to be radiated is detected, if visible light beams are radiated onto the road surface according to a pattern avoiding the obstacle, the visible light beams do not hit the obstacle, and representation resulting from the visible light beams appears on the road surface. Thus, according to the invention, if the obstacle is a person, visible light beams are radiated without dazzling the person. Thus, it is possible to suitably let others recognize the existence of the self-owned vehicle or to let the driver of the self-owned vehicle grasp a traveling path thereof.

In the invention, visible light beams radiated onto a road surface have a predetermined polarization characteristic. Incident light is likely to be reflected by a road surface wet with rain or the like. Especially, this road surface has an optical characteristic in which components parallel to a boundary surface (i.e., the road surface) are likely to be reflected. Thus, by reducing the number of light beam components parallel to the road surface as to the above-mentioned polarization characteristic, the intensity of reflected light is reduced to a low level, and people are prevented from being dazzled by high-level reflected light of visible light beams. Hence, the invention makes it possible to suitably let others recognize the existence of the self-owned vehicle without dazzling anybody by light reflected by a road surface or to let the driver of the self-owned vehicle grasp a traveling path thereof.

In the invention, an optical characteristic of visible light beams is corrected on the basis of an environmental state on a road surface irradiated with visible light beams such that representation projected onto the road surface by the visible light beams becomes easy to visually recognize. In this case, representation resulting from the visible light beams appears on the road surface in a visually easily recognizable manner. Thus, the invention makes it possible to suitably and reliably let others recognize the existence of the self-owned vehicle without dazzling anybody or to let the driver of the self-owned vehicle of a traveling path thereof.

If a desired pattern according to which visible light beams are to be radiated onto a road surface does not match an actual pattern according to which visible light beams are radiated onto the road surface, it can be determined that the visible light beams are radiated onto an obstacle that exists between the vehicle and the road surface onto which the desired pattern is to be projected or that the actual pattern is mixed with another pattern resulting from visible light beams radiated from another vehicle or an infrastructure on the road surface. In this case, it is possible to determine that there is an object requiring attention in driving the self-owned vehicle.

Thus, the vehicle operation supporting system has the image-capturing portion and the attention-requiring object determining portion, whereby it becomes possible for the side of the device to determine that there is an object requiring attention in driving the self-owned vehicle. As a result, it is possible to ensure driving safety of the vehicle.

In a construction wherein visible or invisible auxiliary light beams that are different from the above-mentioned visible light beams are radiated onto a road surface according to a predetermined pattern as well, if a desired pattern according to which the auxiliary light beams are to be radiated does not match an actual pattern according to which the auxiliary light beams are radiated, it is possible to determine that there is an object requiring attention in driving the self-owned vehicle.

Thus, the vehicle operation supporting system has the auxiliary beam radiating portion, the image-capturing portion, and the attention-requiring object determining portion, whereby it becomes possible for the side of the device to determine that there is an object requiring attention in driving the self-owned vehicle. Therefore, it is possible to ensure driving safety of the vehicle.

The vehicle operation supporting system has the operation auxiliary control portion that controls driving of the vehicle in such a direction as to avoid an obstacle if the attention-requiring object detecting portion detects the obstacle which obstructs driving of the vehicle. Thereby, the vehicle runs in a circumventing manner without requiring the driver to operate the vehicle in the case where the object requiring attention in driving the self-owned vehicle is an obstacle that obstructs driving of the self-owned vehicle. Therefore, it is possible to reliably ensure driving safety of the vehicle.

If the degree of concentration of the driver on driving is high, it is possible to swiftly perform a circumventing operation. Thus, it is sufficient that the range on a road surface to which the self-owned vehicle must pay attention be small, and it is also appropriate that the range in which others are informed of the existence of the self-owned vehicle be small. On the other hand, if the degree of concentration on driving falls, the circumventing operation may be performed with delay. Therefore, it is appropriate that the above-mentioned range be large, and that the range in which others are informed of the existence of the self-owned vehicle be large as well. It is appropriate that others be informed of the existence of the self-owned vehicle at an early stage.

Thus, the vehicle operation supporting system has the degree-of-concentration detecting portion that detects a degree of concentration of the driver on driving and the pattern changing portion that enlarges or shrinks a range of the predetermined pattern in accordance with a degree of concentration on driving detected by the degree-of-concentration detecting portion, whereby it becomes possible to let others recognize the existence of the self-owned vehicle at a suitable timing corresponding to a degree of concentration of the driver on driving.

If the vehicle operation supporting system has the degree-of-concentration detecting portion that detects a degree of concentration of the driver on driving and the auxiliary pattern changing portion that enlarges or shrinks a range of the predetermined auxiliary pattern in accordance with a degree of concentration on driving detected by the degree-of-concentration detecting portion, it becomes possible to set a suitable range corresponding to a degree of concentration of the driver on driving as a road surface to which the self-owned vehicle must pay attention.

If the vehicle operation supporting system is designed such that the predetermined pattern assumes a lattice shape, and has the vehicle speed detecting portion that detects a vehicle speed and the lattice interval changing portion that changes a lattice interval of the predetermined pattern or the predetermined auxiliary pattern in accordance with a vehicle speed detected by the vehicle speed detecting portion, a pattern having a lattice interval corresponding to a vehicle speed is projected onto a road surface. Thus, it is possible to inform others of the existence of the self-owned vehicle and the speed thereof.

If the vehicle operation supporting system is designed such that the predetermined auxiliary pattern assumes a lattice shape, and has the vehicle speed detecting portion that detects a vehicle speed and the auxiliary lattice interval changing portion that changes a lattice interval of the predetermined auxiliary pattern in accordance with a vehicle speed detected by the vehicle speed detecting portion, the range of a road surface to which the self-owned vehicle must pay attention can be monitored with a density corresponding to a vehicle speed.

Furthermore, if the vehicle operation supporting system has the attention-requiring traffic sign determining portion that determines that there is a traffic sign requiring attention in driving the self-owned vehicle by detecting light beams that are in a predetermined frequency range and that are radiated in correspondence with a traffic sign depicted on a road surface, it is possible for the side of the device to determine that there is a traffic sign requiring attention in driving the self-owned vehicle in the case where an infrastructure designed to radiate light beams of a predetermined frequency band in correspondence with a traffic sign depicted on a road surface is provided. Therefore, it is possible to ensure driving safety of the vehicle.

In the vehicle operation supporting system, if the predetermined pattern is a vehicle-body circumscribed line that is estimated on the basis of a kinetic state of the vehicle, visible light beams are represented according to a pattern corresponding to the behavior of the vehicle, for example, even in the case where the vehicle slips. Others can be informed of the existence of the self-owned vehicle and the behavior thereof, or the driver of the self-owned vehicle can confirm the behavior thereof.

In the vehicle operation supporting system, if the predetermined pattern is a margin line along which the vehicle can make a turn, visible light beams are represented according to a pattern corresponding to the margin line of the turn of the vehicle even in the case where the vehicle actually does not behave in such a manner as to cause slip or the like. Therefore, it is possible to confirm a range in which the driver can drive the vehicle safely.

In the invention, the vehicle radiates visually less recognizable light beams of a predetermined frequency band onto a road surface according to a predetermined pattern. The converter is sensitive to the predetermined frequency range of the visually less recognizable light beams radiated from the vehicle, converts a pattern formed on the road surface by the visually less recognizable light beams into a pattern of a visually more recognizable range, and displays the converted pattern. In this system, the vehicle radiates visually less recognizable light beams. Thereby pedestrians, drivers of other vehicles, and the like can be informed of the existence of the vehicle through the screen of the converter, and the driver of the self-owned vehicle can grasp a traveling path thereof. Thus, the invention does not require the vehicle to radiate visually highly recognizable light beams. Therefore, it is possible to suitably let others recognize the existence of the self-owned vehicle through the converter without dazzling anybody, and to let the driver of the self-owned vehicle grasp a traveling path thereof.

In the invention, "the visually less recognizable light beams" are light beams themselves which have a frequency range that is difficult for people to visually recognize. The concept of "the visually less recognizable light beams" covers invisible light beams such as infrared rays and even visible light beams that are difficult for people to visually recognize. "The visually more recognizable frequency band" means a frequency band that is easier for people to visually recognize than the above-mentioned visually less recognizable frequency band.

In the invention, the vehicle radiates visually less recognizable light beams of a predetermined frequency band onto a road surface according to a predetermined pattern. Further, the material that is sensitive to the predetermined frequency band of the visually less recognizable light beams radiated from the vehicle and that emits light by converting the radiated visually less recognizable light beams into light beams having a visually more recognizable frequency band is disposed on the road surface. In this system, the vehicle radiates visually less recognizable light beams, whereby the material on the road surface emits light. Thus, pedestrians, drivers of other vehicles, and the like can be informed of the vehicle. Thus, the invention does not require the vehicle to radiate visually highly recognizable light beams. Therefore, it is possible to suitably let others recognize the existence of the self-owned vehicle without dazzling anybody.

What is claimed is:

1. A vehicle operation supporting device comprising:
   a beam radiating portion that intermittently radiates light beams having a predetermined optical characteristic onto a road surface around a vehicle, the light beams being laser beams; and
   a dimming portion that intermittently becomes less permeable to light having the predetermined optical characteristic than to light having optical characteristics other than the predetermined optical characteristic in synchronization with radiation of the light beams from the beam radiating portion.

2. The vehicle operation supporting device according to claim 1, further comprising:
   a penetration control portion that stops the dimming portion from becoming less permeable to light having the predetermined optical characteristic if a predetermined condition is fulfilled.

3. The vehicle operation supporting device according to claim 1, wherein
   the predetermined optical characteristic is a predetermined wavelength.

4. The vehicle operation supporting device according to claim 1, wherein
   the dimming portion is a member that is disposed on a windshield in front of the eyes of a driver of the vehicle.

5. The vehicle operation supporting device according to claim 1,
   wherein the light beams have wavelengths within a visible light range and are radiated on a road on which the vehicle is estimated to run,
   a light pattern of the light beams is projected on the road, and
   the dimming portion becomes less permeable to the projected light pattern within a period of time when the light beams are being radiated.

6. A vehicle operation supporting device comprising:
   a beam radiating portion that intermittently radiates light beams having a predetermined optical characteristic onto a road surface around a vehicle, the predetermined optical characteristic being a predetermined polarization characteristic, the light beams being laser beams; and
   a dimming portion that intermittently becomes less permeable to light having the predetermined optical characteristic than to light having optical characteristics other than the predetermined optical characteristic in synchronization with radiation of the light beams from the beam radiating portion.

7. The vehicle operation supporting device according to claim 6,
wherein the light beams have wavelengths within a visible light range and are radiated on a road on which the vehicle is estimated to run,
a light pattern of the light beams is projected on the road, and
the dimming portion becomes less permeable to the projected light pattern within a period of time when the light beams are being radiated.

8. A vehicle operation supporting device comprising:
a beam radiating portion that intermittently radiates light beams having a predetermined optical characteristic onto a road surface around a vehicle, the light beams being laser beams; and
a dimming portion that intermittently becomes less permeable to light having the predetermined optical characteristic than to light having optical characteristics other than the predetermined optical characteristic in synchronization with radiation of the light beams from the beam radiating portion, the dimming portion being a member that is worn by a driver of the vehicle and disposed in front of the eyes of the driver.

9. The vehicle operation supporting device according to claim 8,
wherein the light beams have wavelengths within a visible light range and are radiated on a road on which the vehicle is estimated to run,
a light pattern of the light beams is projected on the road, and
the dimming portion becomes less permeable to the projected light pattern within a period of time when the light beams are being radiated.

10. A vehicle operation supporting device comprising:
a beam radiating portion that radiates light beams having a predetermined optical characteristic onto a road surface around a vehicle, the light beams being laser beams and forming a visual pattern on the road surface; and
a dimming portion that is less permeable to light having the predetermined optical characteristic than to light having optical characteristics other than the predetermined optical characteristic only in a range of vision corresponding to the visual pattern that is formed on the road surface by the light beams radiated from the beam radiating portion.

11. The vehicle operation supporting device according to claim 10, further comprising:
a penetration control portion that stops the dimming portion from becoming less permeable to light having the predetermined optical characteristic if a predetermined condition is fulfilled.

12. The vehicle operation supporting device according to claim 10, wherein
the predetermined optical characteristic is a predetermined wavelength.

13. The vehicle operation supporting device according to claim 10, wherein
the predetermined optical characteristic is a predetermined polarization characteristic.

14. The vehicle operation supporting device according to claim 10, wherein
the dimming portion is a member that is disposed on a windshield in front of the eyes of a driver of the vehicle.

15. The vehicle operation supporting device according to claim 10, wherein
the dimming portion is a member that is worn by a driver of the vehicle and disposed in front of the eyes of the driver.

16. The vehicle operation supporting device according to claim 10,
wherein the light beams have wavelengths within a visible light range and are radiated on a road on which the vehicle is estimated to run,
a light pattern of the light beams is projected on the road, and
the dimming portion becomes less permeable to the projected light pattern within a period of time when the light beams are being radiated.

* * * * *